United States Patent
Paine et al.

(10) Patent No.: US 10,340,697 B2
(45) Date of Patent: Jul. 2, 2019

(54) MODULAR POWER GENERATION FACILITIES USING SHIPPING CONTAINER-BASED MODULES

(71) Applicant: PowerSecure, Inc., Wake Forest, NC (US)

(72) Inventors: Miles Paine, Santa Barbara, CA (US); Will Dickinson, High Point, NC (US); John Saunders, Franklin, NC (US); Bill Brown, Raleigh, NC (US); Bobby Ferrick, Raleigh, NC (US); Jeff Courliss, Cary, NC (US); Justin Moore, Fuquay Varina, NC (US)

(73) Assignee: PowerSecure, Inc., Wake Forest, NC (US)

( * ) Notice: Subject to any disclaimer, the term of this patent is extended or adjusted under 35 U.S.C. 154(b) by 111 days.

(21) Appl. No.: 15/788,521

(22) Filed: Oct. 19, 2017

(65) Prior Publication Data

US 2018/0109163 A1   Apr. 19, 2018

Related U.S. Application Data

(63) Continuation of application No. 15/788,324, filed on Oct. 19, 2017.

(Continued)

(51) Int. Cl.
*H02J 3/38* (2006.01)
*B65D 88/02* (2006.01)
(Continued)

(52) U.S. Cl.
CPC ............ *H02J 3/381* (2013.01); *B65D 88/022* (2013.01); *B65D 88/121* (2013.01);
(Continued)

(58) Field of Classification Search
CPC ................ B65D 88/022; B65D 88/121; B65D 90/0013; B65D 90/0026; H02K 7/1815;
(Continued)

(56) References Cited

U.S. PATENT DOCUMENTS

| | | |
|---|---|---|
| 5,731,688 A | 3/1998 | Thomson |
| 5,734,255 A | 3/1998 | Thompson et al. |

(Continued)

FOREIGN PATENT DOCUMENTS

| | | |
|---|---|---|
| WO | 2002086294 A1 | 10/2002 |
| WO | 2016102703 A1 | 6/2016 |
| WO | 2018075718 A1 | 4/2018 |

OTHER PUBLICATIONS

Generac Power Systems, Inc., Generac Power Systems Product Paper, 12 pages; printed 2003, revised 2004.

(Continued)

*Primary Examiner* — Robert L Deberadinis
(74) *Attorney, Agent, or Firm* — Tillman Wright, PLLC; James D. Wright; David R. Higgins

(57) ABSTRACT

Systems, methods, and building block modules for modular power generation facilities are disclosed. A multi-stack modular power generation facility includes first and second pluralities of primary modules and first and second control systems. The first modules are positioned in a first stack to form a first vertical enclosure; the second modules are positioned in a second stack to form a second vertical enclosure; and the first and second modules each include gen-set modules, each with an engine-generator, and a switchgear module ganged to the gen-set modules. Each control system communicates with the respective gen-set modules to coordinate the engine-generators as a unit and to control the loading of each of the generators in response to a power load demand. The second plurality of primary modules are disposed immediately adjacent the first plurality (Continued)

of primary modules such that the second vertical enclosure abuts the first vertical enclosure.

20 Claims, 65 Drawing Sheets

Related U.S. Application Data

(60) Provisional application No. 62/409,901, filed on Oct. 19, 2016.

(51) Int. Cl.
| | | |
|---|---|---|
| *B65D 88/12* | (2006.01) | |
| *B65D 90/00* | (2006.01) | |
| *H02K 7/18* | (2006.01) | |
| *F01N 3/20* | (2006.01) | |
| *F01N 3/28* | (2006.01) | |
| *F01N 13/18* | (2010.01) | |
| *F01N 13/00* | (2010.01) | |

(52) U.S. Cl.
CPC ..... *B65D 90/0013* (2013.01); *B65D 90/0026* (2013.01); *F01N 3/206* (2013.01); *F01N 3/2066* (2013.01); *F01N 3/2842* (2013.01); *F01N 13/017* (2014.06); *F01N 13/18* (2013.01); *H02K 7/1815* (2013.01); *F01N 2450/30* (2013.01); *F01N 2590/10* (2013.01); *Y02T 10/24* (2013.01)

(58) Field of Classification Search
CPC ........ Y02T 10/24; H02J 3/381; F01N 13/017; F01N 3/206; F01N 3/2066; F01N 3/2842; F01N 13/18; F01N 2450/30; F01N 2590/10
See application file for complete search history.

(56) References Cited

U.S. PATENT DOCUMENTS

| | | |
|---|---|---|
| 6,021,401 A | 2/2000 | Oravetz et al. |
| 6,067,030 A | 5/2000 | Burnett et al. |
| 6,624,532 B1 | 9/2003 | Davidow et al. |
| 6,633,823 B2 | 10/2003 | Bartone et al. |
| 6,819,098 B2 | 11/2004 | Villicana et al. |
| 6,862,498 B2 | 3/2005 | Davis et al. |
| 6,877,581 B2 | 4/2005 | Badr et al. |
| 6,891,478 B2 | 5/2005 | Gardner |
| 7,010,363 B2 | 3/2006 | Donnelly et al. |
| 7,069,117 B2 | 6/2006 | Wilson et al. |
| 7,072,195 B2 | 7/2006 | Xu |
| 7,222,111 B1 | 5/2007 | Budike, Jr. |
| 7,795,745 B2 | 9/2010 | Mellon et al. |
| 8,427,005 B1 | 4/2013 | Kisner et al. |
| 8,495,869 B2 | 7/2013 | Beissler et al. |
| 2003/0036810 A1 | 2/2003 | Petite |
| 2003/0102716 A1 | 6/2003 | Schultz |
| 2004/0084965 A1 | 5/2004 | Welches et al. |
| 2007/0152126 A1 | 7/2007 | Graham et al. |
| 2008/0058997 A1 | 3/2008 | Timblin |
| 2010/0302744 A1 | 12/2010 | Englert et al. |
| 2014/0210213 A1 | 7/2014 | Campion et al. |
| 2015/0303770 A1 | 10/2015 | Beissler et al. |
| 2018/0109112 A1 | 4/2018 | Paine et al. |
| 2018/0109162 A1 | 4/2018 | Paine et al. |

OTHER PUBLICATIONS

Generac Power Systems, Inc., On the Job, Modular Protection Around the Clock; 2 pages; printed 2003, revised 2005.
Generac Power Systems, Inc., The Superior Solution for Standby Power, 4 pages, printed 2003, revised 2005.
Generac Power Systems, Inc., Technical Perspective, 4 pages, printed 2003, revised 2006.
"International Search Report" and "Written Opinion of the International Searching Authority" (ISA/US) in Powersecure, Inc., International Patent Application Serial No. PCT/US2017/057300, dated Mar. 5, 2018 (13 pages).

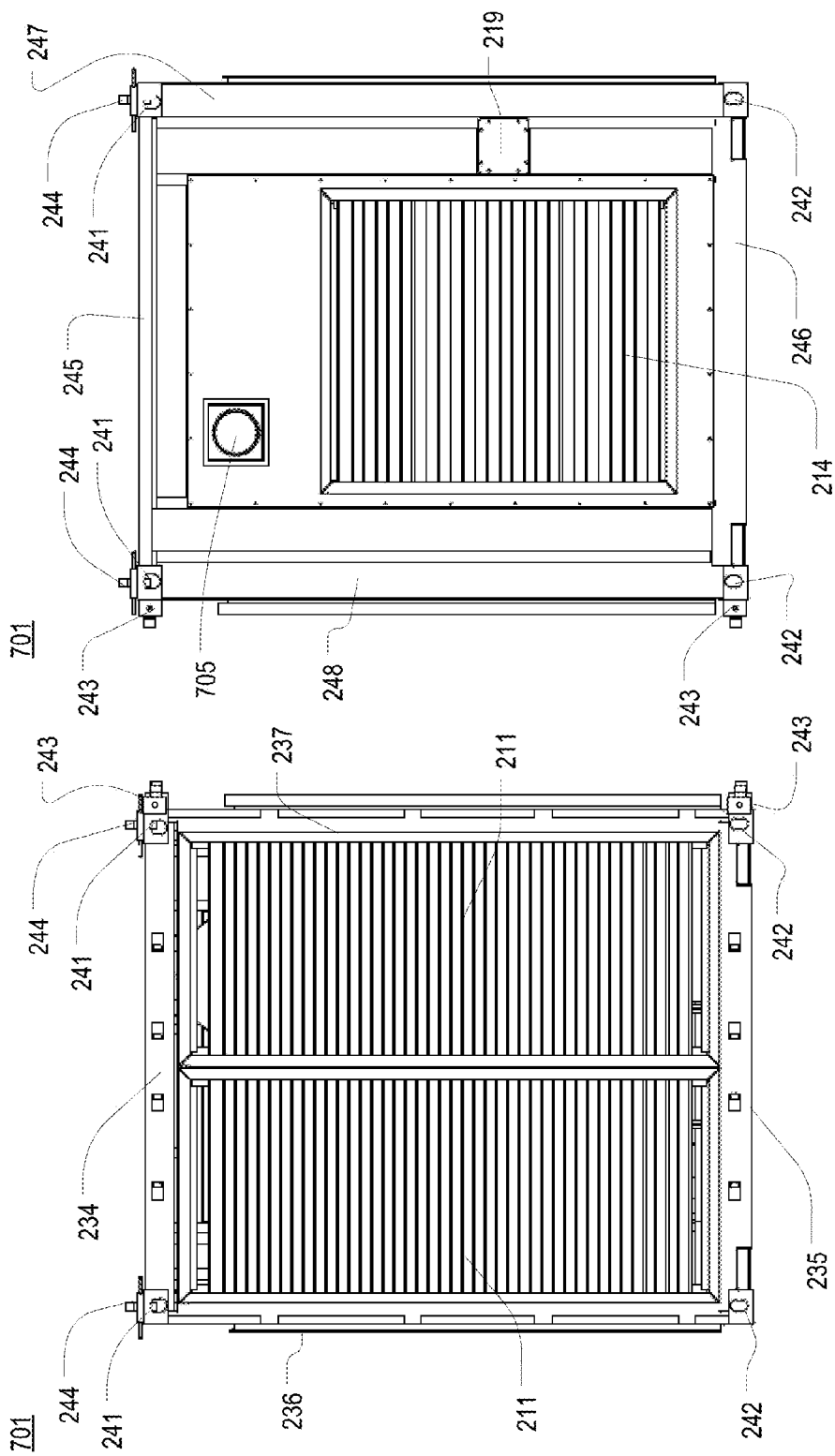

MODULAR POWER GENERATION FACILITIES USING SHIPPING CONTAINER-BASED MODULES

CROSS-REFERENCE TO RELATED APPLICATION

The present application:
(a) is a U.S. continuation patent application of, and claims priority under 35 U.S.C. § 120 to, U.S. nonprovisional patent application Ser. No. 15/788,324, filed Oct. 19, 2017, which nonprovisional patent application published as U.S. patent application publication no. 2018/0109112, and which application is a U.S. nonprovisional patent application of, and claims priority under 35 U.S.C. § 119(e) to, U.S. provisional patent application Ser. No. 62/409,901 filed Oct. 19, 2016; and
(b) is a U.S. nonprovisional patent application of, and claims priority under 35 U.S.C. § 119(e) to, U.S. provisional patent application Ser. No. 62/409,901 filed Oct. 19, 2016.

All of the foregoing patent applications and publication thereof are incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to non-utility localized power supply systems, and, more particularly, to modular power generation facilities built using interchangeable ISO intermodal shipping container-based modules of various types that may be arranged into multiple levels to enable incremental capacity to be added to a power supply system, to provide back-up power generation, to supplement utility power for peak-shaving purposes, and the like.

Background

Power production from a generator through the conversion of mechanical energy to electrical energy is well known and well utilized to meet a variety of power load demands. The adaptability and minimalistic infrastructure features of generators are particularly beneficial for both commercial and residential power supply. Conventionally, an engine-generator combination (often referred to as a "gen-set") is mounted into a self-contained housing and installed and transported to a point of use. Often, these single generators are sized to handle a desired full power load, but if a larger power load is required, multiple generators are necessary. The use of multiple gen-sets connected in a parallel manner can be used to provide a range of power generation by cycling on and off one or more of the installed gen-sets as load varies.

Running multiple redundant large and inefficient generators, particularly in spatially-confined areas, present efficiency limitations, safety concerns and/or unwanted questionable performance during an individual generator failure event. For example, transporting and packaging large generators present shipping and installation concerns. Often, the total generator packages are too large or too heavy to ship via truck. Similarly, the footprint required for multiple oversized generators add design and installation concerns, especially for high power-demand users.

For certain users of electrical power, the required quantity of power may be difficult to determine at the time of construction of the facility. In some instances, it is known that power demand will increase over time, but the rate of increase and the timing of the increase are impossible to determine. In other instances, varying fuel costs as well as environmental regulations make it difficult to design an ideal generation plant.

One example of such a user of electric power is a computer data center. A typical computer data center requires large quantities of electrically clean (constant voltage without electrical noise), uninterrupted electric power, in quantities that can vary based on time of day and time of year. Generating such power on-site is often preferable to buying utility power as the facility interconnect to the power grid is not always adequate for large increases in demand. Unlike many other users of electric power, computer data centers can take advantage of increasingly denser computer processors, which allows them to add processing power without increasing the size of the server room(s). As processing power increases, the need for electrical power increases. Therefore, one problem to be solved by the present invention is to be able to provide higher quantities of electric power without the need to increase the physical space required to generate such power. However, it is very difficult to predict the expected growth of the data center size (physically as well as electrically) throughout the life cycle of a data center design and construction.

The lead times necessary to procure the necessary major equipment associated with electric power generation requires advanced commitment to purchase this equipment well before final design needs are known. This has the potential for stranded assets, increased operating costs, and other capital expenditures beyond the revenue generating capacity of the facility. It would thus be useful to have some degree of standardization in electric power generation capacity that will allow for tighter supply chain management and reduced queue and manufacturing lead times for generating equipment. Such electric power users are looking for a solution that will allow for an increase in generated power while reducing the overall physical footprint necessary to generate this power. This new power density paradigm must be delivered on a schedule that allow for a balance in power needs with the ultimate build-out of a given data center.

There are existing power generation means that utilize multiple gen-sets and the related switchgear and transformers that allow for increased power generation density in a given footprint. However, there are structural limitations that necessitate complex structural assemblies, reliance on large bore diesel engine-based gen-sets, and the related limit on the ability to reduce equipment lead-times and installation efficiency. The need to comply with exhaust emission requirements also complicates the use of prior art means of providing incremental units of generation capacity. Furthermore, the current use of large bore diesel engine-based gen-sets has limits in terms of optimizing the power generation footprint and supply chain management due to the size, weight and cost of the major equipment.

Still further, the use of the large bore diesel engine-based gen-sets requires commitment to a particular facility design that cannot easily be changed. Unfortunately, fluctuations in the cost of diesel fuel can make it prohibitively expensive to continue operation of the facility, and changing fuels is very difficult. Similar issues arise with other types of gen-sets. Thus, it would be useful for a user to be able to dynamically determine the mix of fuel sources from which to generate power.

Another problem associated with conventional back-up and utility grid support generators is the noise they produce when operating.

One known modular power generation system is disclosed in U.S. Pat. No. 8,427,005. However, such system suffers from many drawbacks. For example, different module types in the system use footprints of different widths; the modules have a complicated mounting system; the modules cannot be stacked on top of each other; multi-level facilities cannot be created; the system generally requires a common fuel tank rather than using modules with their own fuel tanks and/or makes no provision for the use of additional modules providing dedicated external fuel tanks; and the system makes no provision for the use of additional modules that provide supplemental sound attenuation functionality.

Accordingly, a need exists for improvements in the field of incremental electric power generation for certain localized users of electric power. These, and other needs, are addressed by one or more aspects of the present invention.

SUMMARY OF THE PRESENT INVENTION

Broadly defined, the present invention according to one aspect is a modular power generation facility, including: a plurality of primary modules, wherein each primary module includes eight primary corners and an interior space at least partially enclosed by a top wall, a side wall, and an end wall, wherein the primary modules are positioned side by side in a row of modules and are attached together to form a substantially modular enclosure for the generation of electricity, wherein the primary modules include one or more gen-set modules, each having an engine-generator and a dedicated fuel tank disposed in the interior thereof, wherein the fuel tank provides fuel to the engine-generator, and wherein the primary modules include a switchgear module having switchgear disposed in the interior thereof, wherein the switchgear is ganged to at least one of the one or more gen-set modules; and a control system in communication with each of the gen-set modules to coordinate the engine-generators of the one or more gen-set modules as a unit and to control the loading of each of the generators in response to a power load demand, wherein the control system is disposed in one or more of the primary modules with at least part of the control system being disposed in the switchgear module.

In a feature of this aspect, all of the primary modules may have a common height.

In another feature of this aspect, the switchgear module may be a transformer/switchgear module, the transformer/switchgear module has a transformer disposed in the interior thereof, and the transformer is connected to the switchgear. In further features, the primary modules further may include a workroom module, and the control system is jointly disposed in the workroom module and the transformer/switchgear module; the workroom module may be disposed adjacent a first side of the transformer/switchgear module, and one of the one or more gen-set modules is disposed on an opposite side of the transformer/switchgear module from the workroom module; the adjacency of the workroom module to the transformer/switchgear module defines an interface, and the interface is open to provide clearance around the transformer or switchgear and improve access; and/or the workroom module may be attached via the respective primary corners to the transformer/switchgear module.

In another feature of this aspect, the primary modules may be mounted on, and attached to, a base frame or foundation. In further features, the base frame or foundation may include a plurality of modular base structures, and each primary module is mounted on, and attached to, a respective modular base structure; each primary module is attached, via its primary corners, to the base frame or foundation; the primary corners of each primary module of each type includes four bottom corners, each of the bottom corners of each of the primary modules may utilize a standardized connection structure, and the base frame or foundation may include corresponding structures that couple to, and hold in place, the various bottom corners to hold the various primary modules in place on the base frame or foundation; and/or the standardized connection structures may be corner castings from an intermodal shipping container, and the corresponding structures of the base frame or foundation may be twist lock fasteners.

In another feature of this aspect, the modular power generation facility may further include one or more secondary modules, wherein each secondary module is disposed at an end of, but on the same level as, a respective primary module of the row of side-by-side primary modules. In further features, each secondary module may have a height equal to the common height of the primary modules; the one or more secondary modules may include a fuel tank module, each fuel tank module is disposed at the end of a respective gen-set module, and each fuel tank module houses a fuel tank, in an interior thereof, that provides auxiliary fuel to the engine-generator in the respective gen-set module; each fuel tank module may include sound baffles, disposed in the interior thereof, to muffle sounds of combustion and flow of air in or out of the respective gen-set module; and/or the one or more secondary modules may include a sound baffle module, each sound baffle module is disposed at the end of a respective gen-set module, and each sound baffle module houses sound baffles, in an interior thereof, to muffle sounds of combustion and flow of air in or out of the respective gen-set module.

In another feature of this aspect, the modular power generation facility may further include a staircase module having eight primary corners, and the staircase module is disposed alongside, and attached via the respective primary corners to, at least one primary module in the row of side-by-side primary modules. In a further feature, each staircase module may have a height, as measured from a top of a top primary corner to a bottom of a bottom primary corner directly beneath, equal to the common height of the primary modules.

In another feature of this aspect, all of the primary modules may have a common length.

In another feature of this aspect, each primary module may be adapted from an intermodal shipping container having four posts, a pair of top side rails, a pair of bottom side rails, a front sill, a rear sill, a top front rail, and a top rear rail, all of which are connected together by shipping container corner castings, and the shipping container corner castings form the eight primary corners. In further features, each primary module may be attached to a body above or below it via the corner castings and corresponding twist lock fasteners; the primary modules that are positioned side by side in a row of modules may be attached together via side attachment fittings that are each connected to one corner casting on a first primary module and a corresponding corner casting on a second primary module; and/or portions of at least two of the walls of each primary module may be corrugated shipping container walls.

In another feature of this aspect, each primary module may include at least one walk-through opening accessing the interior thereof, and the at least one walk-through opening of each primary module is aligned with the at least one walk-through opening of the primary module immediately adjacent thereto, thereby providing access from the interior of each primary module to the interior of the immediately adjacent primary module.

In another feature of this aspect, each primary module may be attached via the respective primary corners to the primary module immediately adjacent thereto.

In another feature of this aspect, each of one or more of the plurality of primary modules may include a respective superstructure, extending outwardly from the end wall, that supports one or more operational component. In further features, at least one of the one or more gen-set modules may include the superstructure; a respective fluid tank may be disposed on each of at least one superstructure, external to the interior space of the primary module; each respective fluid tank may be a diesel exhaust fluid (DEF) tank; each respective fluid tank may be a fuel tank; the switchgear module may include the superstructure; cables routed to/from an adjacent primary module may be supported on each superstructure; each superstructure may include a horizontal ladder structure, the respective horizontal ladder structures of horizontally adjacent primary modules may be aligned with each other, and cables are routed to/from the adjacent primary modules via the aligned horizontal ladder structures; and/or each superstructure may include a vertical ladder structure, the respective vertical ladder structures of vertically adjacent primary modules are aligned with each other, and cables are routed to/from the adjacent primary modules via the aligned vertical ladder structures.

Broadly defined, the present invention according to another aspect is a modular power generation facility, including: a plurality of primary modules, wherein all of the primary modules may have a common width, wherein each primary module includes eight primary corners and an interior space at least partially enclosed by a top wall, a side wall, and an end wall, wherein the primary modules are positioned side by side in a row of modules and are attached together to form a substantially modular enclosure for the generation of electricity, wherein the primary modules include one or more gen-set modules, each having an engine-generator disposed in the interior thereof, and wherein the primary modules include a switchgear module having switchgear disposed in the interior thereof, wherein the switchgear is ganged to at least one of the one or more gen-set modules; and a control system in communication with each of the gen-set modules to coordinate the engine-generators of the one or more gen-set modules as a unit and to control the loading of each of the generators in response to a power load demand, wherein the control system is disposed in one or more of the primary modules with at least part of the control system being disposed in the transformer/switchgear module; wherein the various primary modules are interchangeable, due to their common width, such that at a subsequent time a primary module may be removed from the row of modules and replaced by another primary module of the same or different type.

In a feature of this aspect, all of the primary modules may have a common height.

In another feature of this aspect, the switchgear module may be a transformer/switchgear module, the transformer/switchgear module has a transformer disposed in the interior thereof, and the transformer is connected to the switchgear. In further features, the primary modules further may include a workroom module, and the control system is jointly disposed in the workroom module and the transformer/switchgear module; the workroom module may be disposed adjacent a first side of the transformer/switchgear module, and one of the one or more gen-set modules is disposed on an opposite side of the transformer/switchgear module from the workroom module; the adjacency of the workroom module to the transformer/switchgear module defines an interface, and wherein the interface is open to provide clearance around the transformer or switchgear and improve access; and/or the workroom module may be attached via the respective primary corners to the transformer/switchgear module.

In another feature of this aspect, the primary modules may be mounted on, and attached to, a base frame or foundation. In further features, the base frame or foundation may include a plurality of modular base structures having a width equal to the common width of the primary modules, and each primary module is mounted on, and attached to, a respective modular base structure; each primary module may be attached, via its primary corners, to the base frame or foundation; the primary corners of each primary module of each type includes four bottom corners, each of the bottom corners of each of the primary modules may utilize a standardized connection structure, and the base frame or foundation may include corresponding structures that couple to, and hold in place, the various bottom corners to hold the various primary modules in place on the base frame or foundation; and/or the standardized connection structures may be corner castings from an intermodal shipping container, and the corresponding structures of the base frame or foundation may be twist lock fasteners.

In another feature of this aspect, each gen-set module may further include a dedicated fuel tank disposed in the interior thereof.

In another feature of this aspect, the modular power generation facility may further include one or more secondary modules, each having a width equal to the common width of the primary modules, and each secondary module is disposed at an end of, but on the same level as, a respective primary module of the row of side-by-side primary modules. In further features, each secondary module may have a height equal to the common height of the primary modules; the one or more secondary modules may include a fuel tank module, each fuel tank module is disposed at the end of a respective gen-set module, and each fuel tank module houses a fuel tank, in an interior thereof, that provides fuel to the engine-generator in the respective gen-set module; each fuel tank module may include sound baffles, disposed in the interior thereof, to muffle sounds of combustion and flow of air in or out of the respective gen-set module; and/or the one or more secondary modules may include a sound baffle module, each sound baffle module is disposed at the end of a respective gen-set module, and each sound baffle module houses sound baffles, in an interior thereof, to muffle sounds of combustion and flow of air in or out of the respective gen-set module.

In another feature of this aspect, the modular power generation facility may further include a staircase module having a width equal to the common width of the primary modules and eight primary corners, and the staircase module is disposed alongside, and attached via the respective primary corners to, at least one primary module in the row of side-by-side primary modules. In further features, each staircase module may have a height, as measured from a top of a top primary corner to a bottom of a bottom primary corner directly beneath, equal to the common height of the primary modules; and/or the staircase module is interchangeable with the various primary modules due to their common width, such that at a subsequent time a primary module or staircase module may be removed from the row of modules and replaced by a staircase module or another primary module of the same or different type.

In another feature of this aspect, all of the primary modules may have a common length.

In another feature of this aspect, each primary module may be adapted from an intermodal shipping container having four posts, a pair of top side rails, a pair of bottom side rails, a front sill, a rear sill, a top front rail, and a top rear rail, all of which are connected together by shipping container corner castings, and the shipping container corner castings form the eight primary corners. In further features, each primary module may be attached to a body above or below it via the corner castings and corresponding twist lock fasteners; the primary modules that are positioned side by side in a row of modules may be attached together via side attachment fittings that are each connected to one corner casting on a first primary module and a corresponding corner casting on a second primary module; and/or portions of at least two of the walls of each primary module may be corrugated shipping container walls.

In another feature of this aspect, each primary module may include at least one walk-through opening accessing the interior thereof, and the at least one walk-through opening of each primary module is aligned with the at least one walk-through opening of the primary module immediately adjacent thereto, thereby providing access from the interior of each primary module to the interior of the immediately adjacent primary module.

In another feature of this aspect, each primary module is attached via the respective primary corners to the primary module immediately adjacent thereto.

In another feature of this aspect, each of one or more of the plurality of primary modules may include a respective superstructure, extending outwardly from the end wall, that supports one or more operational component. In further features, at least one of the one or more gen-set modules may include the superstructure; a respective fluid tank may be disposed on each of at least one superstructure, external to the interior space of the primary module; each respective fluid tank may be a diesel exhaust fluid (DEF) tank; each respective fluid tank may be a fuel tank; the switchgear module may include the superstructure; cables routed to/from an adjacent primary module may be supported on each superstructure; each superstructure may include a horizontal ladder structure, the respective horizontal ladder structures of horizontally adjacent primary modules are aligned with each other, and cables are routed to/from the adjacent primary modules via the aligned horizontal ladder structures; and/or each superstructure may include a vertical ladder structure, the respective vertical ladder structures of vertically adjacent primary modules are aligned with each other, and cables are routed to/from the adjacent primary modules via the aligned vertical ladder structures.

Broadly defined, the present invention according to another aspect is a modular power generation facility, including: a plurality of primary modules, wherein each primary module includes eight primary corners and an interior space at least partially enclosed by a top wall, a side wall, and an end wall, wherein each primary module is adapted from an intermodal shipping container having four posts, a pair of top side rails, a pair of bottom side rails, a front sill, a rear sill, a top front rail, and a top rear rail, all of which are connected together at the eight primary corners by shipping container corner castings, wherein the primary modules are positioned side by side in a row of modules and are attached together to form a substantially modular enclosure for the generation of electricity, wherein the primary modules include one or more gen-set modules, each having an engine-generator disposed in the interior thereof, and wherein the primary modules include a switchgear module having switchgear disposed in the interior thereof, wherein the switchgear is ganged to at least one of the one or more gen-set modules; and a control system in communication with each of the gen-set modules to coordinate the engine-generators of the one or more gen-set modules as a unit and to control the loading of each of the generators in response to a power load demand, wherein the control system is disposed in one or more of the primary modules with at least part of the control system being disposed in the switchgear module.

In a feature of this aspect, the primary modules may be attached together via their respective corner castings.

In another feature of this aspect, the switchgear module may be a transformer/switchgear module, the transformer/switchgear module has a transformer disposed in the interior thereof, and the transformer is connected to the switchgear. In further features, the primary modules may further include a workroom module, and the control system is jointly disposed in the workroom module and the transformer/switchgear module; the workroom module may be disposed adjacent a first side of the transformer/switchgear module, and one of the one or more gen-set modules is disposed on an opposite side of the transformer/switchgear module from the workroom module; the adjacency of the workroom module to the transformer/switchgear module defines an interface, and the interface is open to provide clearance around the transformer or switchgear and improve access; and/or the workroom module may be attached to the transformer/switchgear module via their respective corner castings.

In another feature of this aspect, the primary modules may be mounted on, and attached to, a base frame or foundation. In further features, the base frame or foundation may include a plurality of modular base structures, and each primary module is mounted on, and attached to, a respective modular base structure; and/or each primary module may be attached, via its corner castings, to the base frame or foundation.

In another feature of this aspect, each gen-set module may further include a dedicated fuel tank disposed in the interior thereof.

In another feature of this aspect, the modular power generation facility may further include one or more secondary modules, wherein each secondary module includes eight primary corners and an interior space at least partially enclosed by a top wall, a side wall, and an end wall, wherein each secondary module may be adapted from an intermodal shipping container having four posts, a pair of top side rails, a pair of bottom side rails, a front sill, a rear sill, a top front rail, and a top rear rail, all of which are connected together at the eight primary corners by shipping container corner castings, and wherein each secondary module is disposed at an end of, but on the same level as, a respective primary module of the row of side-by-side primary modules. In further features, the one or more secondary modules may include a fuel tank module, each fuel tank module is disposed at the end of a respective gen-set module, and each fuel tank module houses a fuel tank, in an interior thereof, that provides auxiliary fuel to the engine-generator in the respective gen-set module; each fuel tank module may include sound baffles, disposed in the interior thereof, to muffle sounds of combustion and flow of air in or out of the respective gen-set module; and/or the one or more secondary modules may include a sound baffle module, each sound baffle module is disposed at the end of a respective gen-set module, and each sound baffle module houses sound baffles, in an interior thereof, to muffle sounds of combustion and flow of air in or out of the respective gen-set module.

In another feature of this aspect, the modular power generation facility may further include a staircase module having eight primary corners, wherein each primary corner of the staircase module is a shipping container corner casting, wherein the staircase module is disposed alongside, and attached via the respective corner castings to, at least one primary module in the row of side-by-side primary modules. In further features, the primary modules may have a common height, and each staircase module has a height, as measured from a top of a top corner casting to a bottom of a bottom corner casting directly beneath, equal to the common height of the primary modules; and/or the primary modules may have a common width, and each staircase module has a width equal to the common width of the primary modules.

In another feature of this aspect, the primary modules may have a common length.

In another feature of this aspect, the primary modules that are positioned side by side in a row of modules may be attached together via side attachment fittings that are each connected to one corner casting on a first primary module and a corresponding corner casting on a second primary module.

In another feature of this aspect, each primary module may include at least one walk-through opening accessing the interior thereof, wherein the at least one walk-through opening of each primary module is aligned with the at least one walk-through opening of the primary module immediately adjacent thereto, thereby providing access from the interior of each primary module to the interior of the immediately adjacent primary module.

In another feature of this aspect, adjacent primary modules may be attached together via side attachment fittings coupled between their respective corner castings.

In another feature of this aspect, portions of at least two of the walls of each primary module may be corrugated shipping container walls.

In another feature of this aspect, each of one or more of the plurality of primary modules may include a respective superstructure, extending outwardly from the end wall, that supports one or more operational component. In further features, at least one of the one or more gen-set modules may include the superstructure; a respective fluid tank may be disposed on each of at least one superstructure, external to the interior space of the primary module; each respective fluid tank may be a diesel exhaust fluid (DEF) tank; each respective fluid tank may be a fuel tank; the switchgear module may include the superstructure; cables routed to/from an adjacent primary module may be supported on each superstructure; each superstructure may include a horizontal ladder structure, the respective horizontal ladder structures of horizontally adjacent primary modules are aligned with each other, and cables are routed to/from the adjacent primary modules via the aligned horizontal ladder structures; and/or each superstructure may include a vertical ladder structure, the respective vertical ladder structures of vertically adjacent primary modules are aligned with each other, and cables are routed to/from the adjacent primary modules via the aligned vertical ladder structures.

Broadly defined, the present invention according to another aspect is a multi-level modular power generation facility, including: a first plurality of primary modules, wherein the first plurality of primary modules are positioned side by side in a row of modules, on a first level, and are attached together to form a substantially modular first level enclosure for the generation of electricity, wherein each primary module includes eight primary corners and an interior space at least partially enclosed by a top wall, a floor, a side wall, and an end wall, wherein the primary modules include one or more gen-set modules, each having an engine-generator disposed in the interior thereof, and wherein the primary modules include a first switchgear module having first switchgear disposed in the interior thereof, wherein the first switchgear is ganged to at least one of the one or more gen-set modules on the first level; a first control system in communication with each of the gen-set modules in the first level to coordinate the engine-generators of the one or more gen-set modules as a unit and to control the loading of each of the generators in response to a power load demand, wherein the first control system is disposed in one or more of the primary modules of the first level with at least part of the first control system being disposed in the first switchgear module; a second plurality of primary modules, wherein the second plurality of primary modules are positioned side by side in a row of modules, on a second level, and are attached together to form a substantially modular second level enclosure for the generation of electricity, wherein each primary module includes eight primary corners and an interior space at least partially enclosed by a top wall, a floor, a side wall, and an end wall, and wherein the primary modules include one or more gen-set modules, each having an engine-generator disposed in the interior thereof, and wherein the primary modules include a second switchgear module having switchgear disposed in the interior thereof, wherein the second switchgear is ganged to at least one of the one or more gen-set modules on the second level; and a second control system in communication with each of the gen-set modules in the second level to coordinate the engine-generators of the one or more gen-set modules as a unit and to control the loading of each of the generators in response to a power load demand, wherein the second control system is disposed in one or more of the primary modules of the second level with at least part of the second control system being disposed in the second switchgear module; wherein the second plurality of primary modules are stacked on top of the first plurality of primary modules such that the second level enclosure is disposed on top of the first level enclosure.

In a feature of this aspect, in each level, all of the primary modules may have a common height.

In another feature of this aspect, in each level, the switchgear module may be a transformer/switchgear module, the respective transformer/switchgear module has a transformer disposed in the interior thereof, and the respective transformer is connected to the respective switchgear. In further features, in each level, the primary modules further include a workroom module, and the respective control system is jointly disposed in the workroom module and the transformer/switchgear module; in each level, the workroom module may be disposed adjacent a first side of the respective transformer/switchgear module, and one of the one or more gen-set modules is disposed on an opposite side of the transformer/switchgear module from the workroom module; in each level, the adjacency of the workroom module to the transformer/switchgear module defines an interface, and the interface is open to provide clearance around the transformer or switchgear and improve access; and/or, in each level, the workroom module may be attached via the respective primary corners to the transformer/switchgear module.

In another feature of this aspect, the primary modules in the first level may be mounted on, and attached to, a base frame or foundation. In further features, the base frame or foundation may include a plurality of modular base structures, and each primary module in the first level is mounted on, and attached to, a respective modular base structure; each primary module in the first level may be attached, via its primary corners, to the base frame or foundation; in the first level, the primary corners of each primary module of each type includes four bottom corners, each of the bottom corners of each of the primary modules may utilize a standardized connection structure, and the base frame or foundation may include corresponding structures that couple to, and hold in place, the various bottom corners to hold the various primary modules in place on the base frame or foundation; and/or the standardized connection structures may be corner castings from an intermodal shipping container, and the corresponding structures of the base frame or foundation may be twist lock fasteners.

In another feature of this aspect, in each level, each gen-set module may further include a dedicated fuel tank disposed in the interior thereof.

In another feature of this aspect, the multi-level modular power generation facility may further include, in at least the first level, one or more secondary modules, wherein each secondary module is disposed at an end of as a respective primary module. In further features, in at least the first level, each secondary module may have a height equal to the common height of the primary modules; the one or more secondary modules may include a fuel tank module, each fuel tank module is disposed at the end of a respective gen-set module, and each fuel tank module houses a fuel tank, in an interior thereof, that provides fuel to the engine-generator in the respective gen-set module; each fuel tank module may include sound baffles, disposed in the interior thereof, to muffle sounds of combustion and flow of air in or out of the respective gen-set module; and/or the one or more secondary modules may include a sound baffle module, each sound baffle module is disposed at the end of a respective gen-set module, and each sound baffle module houses sound baffles, in an interior thereof, to muffle sounds of combustion and flow of air in or out of the respective gen-set module.

In another feature of this aspect, the multi-level modular power generation facility may further include, in at least the first level, a staircase module having eight primary corners, wherein the staircase module is disposed alongside, and attached via the respective primary corners to, at least one primary module in the same level as the staircase module. In a further feature, each staircase module may have a height, as measured from a top of a top primary corner to a bottom of a bottom primary corner directly beneath, equal to the common height of the primary modules in the same level.

In another feature of this aspect, in each level, all of the primary modules may have a common length.

In another feature of this aspect, in each level, each primary module may be adapted from an intermodal shipping container having four posts, a pair of top side rails, a pair of bottom side rails, a front sill, a rear sill, a top front rail, and a top rear rail, all of which are connected together by shipping container corner castings, wherein the shipping container corner castings form the eight primary corners. In further features, in each level, each primary module may be attached to a body above or below it via the corner castings and corresponding twist lock fasteners; in each level, the primary modules that are positioned side by side in a row of modules may be attached together via side attachment fittings that are each connected to one corner casting on a first primary module and a corresponding corner casting on a second primary module; and/or portions of at least two of the walls of each primary module may be corrugated shipping container walls.

In another feature of this aspect, in each level, each primary module may include at least one walk-through opening accessing the interior thereof, and the at least one walk-through opening of each primary module is aligned with the at least one walk-through opening of the primary module immediately adjacent thereto, thereby providing access from the interior of each primary module to the interior of the immediately adjacent primary module.

In another feature of this aspect, in each level, each primary module may be attached via the respective primary corners to the primary module immediately adjacent thereto.

In another feature of this aspect, the switchgear in the first switchgear module may be operatively connected to the switchgear in the second switchgear module. In further features, the top wall of the first switchgear module may include a vertical cable chase through which interconnect cables are routed from the switchgear in the first switchgear module to the switchgear in the second switchgear module; and/or the floor of the second switchgear module may include a vertical cable chase through which interconnect cables are routed from the switchgear in the first switchgear module to the switchgear in the second switchgear module.

In another feature of this aspect, the multi-level modular power generation facility may further include: a third plurality of primary modules, wherein the third plurality of primary modules are positioned side by side in a row of modules, on a third level, and may be attached together to form a substantially modular third level enclosure for the generation of electricity, wherein each primary module includes eight primary corners and an interior space at least partially enclosed by a top wall, a side wall, and an end wall, wherein the primary modules include one or more gen-set modules, each having an engine-generator disposed in the interior thereof, and wherein the primary modules include a third switchgear module having switchgear disposed in the interior thereof, wherein the third switchgear is ganged to at least one of the one or more gen-set modules on the third level; and a third control system in communication with each of the gen-set modules in the third level to coordinate the engine-generators of the one or more gen-set modules as a unit and to control the loading of each of the generators in response to a power load demand, wherein the third control system is disposed in one or more of the primary modules of the third level with at least part of the third control system being disposed in the third switchgear module; wherein the third plurality of primary modules are stacked on top of the second plurality of primary modules such that the third level enclosure is disposed on top of the second level enclosure.

In another feature of this aspect, each of one or more of the first and second pluralities of primary modules may include a respective superstructure, extending outwardly from the end wall, that supports one or more operational component. In further features, at least one of the one or more gen-set modules of each of the first and second pluralities of primary modules may include the superstructure; a respective fluid tank may be disposed on each of at least one superstructure, external to the interior space of the primary module; each respective fluid tank may be a diesel exhaust fluid (DEF) tank; each respective fluid tank may be a fuel tank; each of the first and second switchgear modules may include the superstructure; cables routed to/from an adjacent primary module may be supported on each superstructure; each superstructure may include a horizontal ladder structure, the respective horizontal ladder structures of horizontally adjacent primary modules are aligned with each other, and cables are routed to/from the adjacent primary modules via the aligned horizontal ladder structures; and/or each superstructure may include a vertical ladder structure, the respective vertical ladder structures of vertically adjacent primary modules are aligned with each other, and cables are routed to/from the adjacent primary modules via the aligned vertical ladder structures.

Broadly defined, the present invention according to another aspect is a gen-set module for use in a modular power generation facility, including: a housing adapted from an intermodal shipping container having four posts, a pair of top side rails, a pair of bottom side rails, a front sill, a rear sill, a top front rail, and a top rear rail, all of which are connected together at eight primary corners by shipping container corner castings, the housing defining an interior space at least partially enclosed by a top wall, a floor, a side wall, and an end wall; an engine-generator, disposed in the interior of the housing, that generates electricity using a fuel, wherein the module, with the engine-generator operatively installed therein, is adapted to be transported to a use site using the shipping container corner castings as attachment points for such transportation; and a superstructure, extending outwardly from the end wall, that supports one or more operational component.

In a feature of this aspect, the gen-set module may further include a dedicated fuel tank, disposed in the interior of the housing, that is operatively connected to the engine-generator to provide the fuel used by the engine-generator to generate electricity for delivery to a transformer disposed outside the housing, and the module, with the engine-generator and dedicated fuel tank operatively installed therein, is adapted to be transported to a use site using the shipping container corner castings as attachment points for such transportation.

In another feature of this aspect, the gen-set module may further include an exhaust pipe extending from the engine-generator through an exterior wall of the shipping container housing. In a further feature, the exhaust pipe may extend through an end wall of the shipping container housing.

In another feature of this aspect, an exterior wall may be penetrated by a cable slot through which interconnect cables may pass for connection to other components of the modular power generation facility. In further features, the cable slot may penetrate through a side wall of the shipping container housing; the cable slot may penetrate through a left side wall of the shipping container housing, the cable slot is a first cable slot, and a second cable slot may penetrate through a right side wall of the shipping container housing; the first and second cable slots are disposed directly across from each other on opposite sides of the shipping container housing; a cable tray extends, within the interior of the shipping container housing, from the first cable slot to the second cable slot; the side wall that is penetrated by the cable slot may also be penetrated by a doorway that is located immediately adjacent to the cable slot; a frame may surround the cable slot and the doorway, wherein the frame is adapted to be sealed against a complementary structure on a separate module disposed immediately adjacent the respective side of the shipping container housing; the cable slot may penetrate through the top wall of the shipping container housing; the cable slot is a first cable slot, and a second cable slot may penetrate through the floor of the shipping container housing; and/or the second cable slot may be directly beneath the first cable slot.

In another feature of this aspect, a first doorway may be provided in a left side wall of the shipping container housing, and a second doorway may be provided in a right side wall of the shipping container housing. In further features, a passageway extends, within the interior space, from the first doorway to the second doorway; the first doorway may be disposed directly opposite the second doorway; the first doorway is surrounded by a first frame that is disposed on the exterior of the left side wall, the second doorway is surrounded by a second frame that is disposed on the exterior of the right side wall, and wherein each of the first and second frames are adapted to be sealed against a complementary structure on a separate module disposed immediately adjacent the respective side of the shipping container housing; the first and second frames may be complementary relative to one another such that when the shipping container housing is placed immediately adjacent an identical shipping container housing, the first frame of one identical shipping container is sealed against the second frame of the other identical shipping container; one of the first and second frames may be an outer frame and the other of the first and second frames may be an inner frame such that when the shipping container housing is placed immediately adjacent an identical shipping container housing, the outer frame of one identical shipping container overlaps and fits around the inner frame of the other identical shipping container, thereby sealing the doorways against the outside environment.

In another feature of this aspect, an exterior wall may be penetrated by a fuel line access port through fuel may be provided from an external fuel tank module. In further features, the fuel line access port may include an opening that penetrates through an end wall of the shipping container housing; and/or the access port may include a removable cover sealing the opening when not in use.

In another feature of this aspect, an exhaust pipe may extend from the engine-generator through an exterior wall and extends a distance beyond the exterior wall. In further features, the exhaust pipe may penetrate through an end wall of the shipping container housing; the end wall that is penetrated by the exhaust pipe may include at least one ventilation opening; the at least one ventilation opening may occupy at least a quarter of the area of the end wall; and/or the at least one ventilation opening may be covered by louvers.

In another feature of this aspect, the end wall may be penetrated by at least one ventilation opening that occupies substantially all of the area of the end wall. In a further feature, the end wall may include a pair of swinging doors, and the at least one ventilation opening may include at least one ventilation opening penetrating each of the swinging doors.

In another feature of this aspect, the engine-generator is a diesel-fired generator. In further features, the gen-set module may further include a selective catalyst reduction (SCR) system and a diesel exhaust fluid (DEF) tank operatively connected to the engine-generator, wherein the DEF tank is supported on the superstructure external to the interior space; and/or the diesel-fired generator satisfies the EPA Tier 4 Final emissions standards.

In another feature of this aspect, the engine-generator is a natural gas-fired generator.

In another feature of this aspect, the gen-set module may further include a plurality of side attachment fittings, wherein each side attachment fitting is coupled to a respective corner casting and is adapted to couple to a corner casting on an adjacent shipping container housing.

In another feature of this aspect, portions of at least two of the walls of each primary module may be corrugated shipping container walls.

In another feature of this aspect, a fluid tank may be disposed on the superstructure, external to the interior space. In further features, the fluid tank may be a diesel exhaust fluid (DEF) tank; and/or the fluid tank may be a fuel tank.

In another feature of this aspect, the superstructure is adapted to route cables to/from an adjacent module. In further features, the superstructure may include a horizontal ladder structure that is adapted to be aligned with a horizontal ladder structure of a horizontally adjacent gen-set module such that cables may be routed to/from the adjacent gen-set module via the aligned horizontal ladder structures; and/or the superstructure may include a vertical ladder structure that is adapted to be aligned with a vertical ladder structure of a vertically adjacent gen-set module such that cables may be routed to/from the adjacent gen-set module via the aligned vertical ladder structures.

Broadly defined, the present invention according to another aspect is a switchgear module for use in a modular power generation facility, including: a housing adapted from an intermodal shipping container having four posts, a pair of top side rails, a pair of bottom side rails, a front sill, a rear sill, a top front rail, and a top rear rail, all of which are connected together at eight primary corners by shipping container corner castings, the housing defining an interior space at least partially enclosed by a top wall, a floor, a side wall, and an end wall; input switchgear operatively connected to a step-up transformer and adapted to connect to an engine-generator, located outside the housing, such that the engine-generator may be controlled to deliver electricity to the step-up transformer via the input switchgear; and at least a portion of a control system adapted to communicate with the engine-generator so as to control the engine-generator and to control the loading of the engine-generator in response to a power load demand; wherein the module, with the input switchgear operatively installed therein, is adapted to be transported to a use site using the shipping container corner castings as attachment points for such transportation.

In a feature of this aspect, the step-up transformer is disposed in the interior of the housing, the step-up transformer is operatively connected to the input switchgear, and the step-up transformer receives electricity from the engine-generator. In a further feature, the module, with the step-up transformer and the input switchgear operatively installed therein, is adapted to be transported to a use site using the shipping container corner castings as attachment points for such transportation.

In another feature of this aspect, an exterior wall may be penetrated by a cable slot through which interconnect cables may pass for connection to other components of the modular power generation facility. In further features, the cable slot may penetrate through a side wall of the shipping container housing; the side wall that is penetrated by the cable slot may also be penetrated by a doorway that is located immediately adjacent to the cable slot; a frame may surround the cable slot and the doorway, wherein the frame is adapted to be sealed against a complementary structure on a separate module disposed immediately adjacent the respective side of the shipping container housing; the cable slot may penetrate through the top wall of the shipping container housing; the cable slot is a first cable slot, and a second cable slot may penetrate through the floor of the shipping container housing; and/or the second cable slot may be directly beneath the first cable slot.

In another feature of this aspect, a first doorway or opening is provided in a first side wall of the shipping container housing, and a second doorway or opening is provided in a second side wall of the shipping container housing, the second side wall is opposite the first side wall. In further features, a passageway extends, within the interior space, from the first doorway or opening to the second doorway or opening; the first doorway or opening is disposed directly opposite the second doorway or opening; the second doorway or opening is an open interface extending along substantially the entire length of the second side wall; at least one of the first and second doorways or openings is surrounded by a frame that is disposed on the exterior of the respective side wall, and the frame is adapted to be sealed against a complementary structure on a separate shipping container module disposed immediately adjacent the respective side of the shipping container housing; and/or one of the frame and the complementary structure is an outer frame and the other of the frame and the complementary structure is an inner frame such that when the shipping container housing is placed immediately adjacent the separate shipping container module, the outer frame of one module container overlaps and fits around the inner frame of the other shipping container, thereby sealing the doorways against the outside environment.

In another feature of this aspect, the end wall includes a pair of swinging doors.

In another feature of this aspect, the switchgear module may further include a plurality of side attachment fittings, wherein, in use, each side attachment fitting is coupled to a respective corner casting and is adapted to couple to a corner casting on an adjacent shipping container housing.

In another feature of this aspect, the switchgear module may further include output switchgear operatively connected to the step-up transformer and adapted to connect to a power grid such that the engine-generator may be controlled to deliver electricity from the step-up transformer to the power grid via the output switchgear.

In another feature of this aspect, portions of at least two of the walls of each primary module may be corrugated shipping container walls.

In another feature of this aspect, a superstructure extends outwardly from the end wall and supports one or more operational component thereon. In further features, the superstructure is adapted to route cables to/from an adjacent module; the superstructure may include a horizontal ladder structure that is adapted to be aligned with a horizontal ladder structure of a horizontally adjacent gen-set module such that cables may be routed to/from the adjacent gen-set module via the aligned horizontal ladder structures; and/or the superstructure may include a vertical ladder structure that is adapted to be aligned with a vertical ladder structure of a vertically adjacent gen-set module such that cables may be routed to/from the adjacent gen-set module via the aligned vertical ladder structures.

Broadly defined, the present invention according to another aspect is a method of erecting a modular power generation facility, including: producing a plurality of primary modules, wherein each primary module including a housing that is adapted from an intermodal shipping container having four posts, a pair of top side rails, a pair of bottom side rails, a front sill, a rear sill, a top front rail, and a top rear rail, all of which are connected together at the eight primary corners by shipping container corner castings, wherein each primary module includes an interior space at least partially enclosed by a top wall, a side wall, wherein the primary modules include one or more gen-set modules, each having an engine-generator operatively installed in the interior thereof, and wherein the primary modules include a switchgear module having switchgear operatively installed in the interior thereof; shipping the plurality of primary modules, with the respective engine-generator or switchgear operatively installed therein, to an installation location; at the installation location, positioning the primary modules, with the respective engine-generator or switchgear operatively installed therein, side by side in a row; attaching the primary modules, with the respective engine-generator or switchgear operatively installed therein, to one another side by side in a row, thereby forming a substantially modular enclosure; interconnecting the engine-generators of the one or more gen-set modules with the switchgear of the switchgear module; and operating the engine-generators and the switchgear to provide electricity to a transformer connected to the switchgear in response to a power load demand.

In a feature of this aspect, the operating step includes using a control system, arranged in communication with each of the gen-set modules, to coordinate the engine-generators of the one or more gen-set modules as a unit and to control the loading of each of the generators in response to a power load demand.

In another feature of this aspect, the shipping step is carried out by handling and transporting the shipping container-based primary modules, each with a respective engine-generator or switchgear operatively installed therein, using the corner castings of the respective shipping container housings. In a further feature, at least some of the switchgear modules are transformer/switchgear modules, each transformer/switchgear module has a transformer operatively installed in the interior thereof and operatively connected to the respective switchgear, the shipping step is carried out for each transformer/switchgear module with the respective transformer operatively installed therein, and the operating step is carried out for each transformer/switchgear module using the transformer installed therein.

In another feature of this aspect, the positioning step includes maneuvering the shipping container-based primary modules, each with a respective engine-generator or switchgear operatively installed therein, using the corner castings of the respective shipping container housings.

In another feature of this aspect, the positioning step includes attaching the primary modules to a base frame or foundation via twist lock fasteners mounted to the base frame or foundation, thereby holding the modules in place thereon.

In another feature of this aspect, the operating step is carried out for a period of time, the method may further include a subsequent step of terminating the operating step, the method may further include attaching an additional primary module, which is an additional gen-set module, to the row of existing primary modules, the method may further include interconnecting the engine-generator of the additional gen-set module to the switchgear of the switchgear module, and the method may further include reinitiating the operating step. In a further feature, the method may further include a step, prior to the step of attaching an additional primary module and after the terminating step, of removing one of the one or more gen-set modules, and the step of attaching an additional gen-set module includes attaching the additional module as a replacement for the removed module.

In another feature of this aspect, the method may further include a step of producing a staircase module having eight primary corners, wherein each primary corner of the staircase module is a shipping container corner casting, and wherein the method may further include attaching the staircase module to at least one primary module in the row of side-by-side primary modules. In further features, the step of attaching the staircase module to the at least one primary module is carried out via respective corner castings on the staircase module and the at least one primary module; the step of attaching the staircase module to the at least one primary module is carried out via side attachment fittings coupled between the respective corner castings on the staircase module and the at least one primary module; the method may further include a step of shipping the staircase module to the installation location, wherein the shipping step is carried out by handling and transporting the staircase module using the corner castings of the staircase module; the method may further include a step, prior to the step of attaching the staircase module to the at least one primary module, of maneuvering the staircase module into place next to the at least one primary module, and the maneuvering step is carried out using the corner castings of the staircase module; and/or the method may further include a step, prior to the step of attaching the staircase module to the at least one primary module, of attaching the staircase module to a base frame or foundation via twist lock fasteners mounted to the base frame or foundation, thereby holding the staircase module in place thereon.

In another feature of this aspect, the method may further include steps of producing a secondary module that includes a housing adapted from an intermodal shipping container having four posts, a pair of top side rails, a pair of bottom side rails, a front sill, a rear sill, a top front rail, and a top rear rail, all of which are connected together at the eight primary corners by shipping container corner castings, maneuvering the secondary module into place at an end of a first of the at least one primary modules, and attaching the secondary module to the end of the first primary module using the corner castings of the respective shipping container housings. In further features, the first primary module is a gen-set module, the secondary module is a fuel tank module housing a fuel tank, and the method may further include operatively connecting the fuel tank to the engine-generator of the gen-set module in the first primary module such that fuel is provided from the fuel tank to the engine-generator; and/or the first primary module is a gen-set module, the secondary module includes a sound baffle module housing sound baffles, and the method may further include muffling sounds of combustion or flow of air in or out of the first primary module.

In another feature of this aspect, the one or more gen-set modules are a first set of gen-set modules, the switchgear module is a first switchgear module, the first set of gen-set modules and the first switchgear module are positioned side by a side in a row on a first level, the step of producing a plurality of primary modules also includes producing at least a second set of the gen-set modules and at least a second switchgear module, the method may further include a step of positioning the second set of primary modules side by side in a row on a second level, each shipping container housing of the second set of primary modules, each with a respective engine-generator or switchgear operatively installed therein, is placed on a respective shipping container housing of the first set of gen-set modules and first switchgear module, the method may further include interconnecting the engine-generators of the second set of gen-set modules with the switchgear of the second switchgear module, and the operating step includes operating the first and second sets of engine-generators and the first and second switchgear to provide electricity to transformers connected to the respective switchgear in response to a power load demand. In further features, all of the primary modules may have a common height; all of the primary modules may have a common length; and/or the step of positioning the second set of primary modules side by side in a row on the second level includes attaching each of the primary modules in the second level to a respective primary module in the first level via twist lock fasteners.

In another feature of this aspect, the method may further include a step of installing a respective superstructure on each of one or more of the plurality of primary modules, the superstructure extending outwardly from the end wall, and a step of supporting one or more operational component on the superstructure. In further features, at least one of the one or more gen-set modules may include the superstructure; the step of a supporting one more operational component on the superstructure includes supporting a respective fluid tank on each superstructure, external to the interior space of the respective primary module; each respective fluid tank may be a diesel exhaust fluid (DEF) tank; each respective fluid tank may be a fuel tank; the switchgear module may include the superstructure; the step of a supporting one more operational component on the superstructure includes supporting cables that are routed to/from an adjacent primary module; each superstructure may include a horizontal ladder structure, the respective horizontal ladder structures of horizontally adjacent primary modules are aligned with each other, and cables are routed to/from the adjacent primary modules via the aligned horizontal ladder structures; and/or each superstructure may include a vertical ladder structure, the respective vertical ladder structures of vertically adjacent primary modules are aligned with each other, and cables are routed to/from the adjacent primary modules via the aligned vertical ladder structures.

Broadly defined, the present invention according to another aspect is a modular power generation facility, including: a plurality of primary modules, wherein each primary module includes eight primary corners and an interior space at least partially enclosed by a top wall, a side wall, and an end wall, wherein the primary modules are positioned in a vertical stack of modules and are attached together to form a substantially modular enclosure for the generation of electricity, wherein the primary modules include one or more gen-set modules, each having an engine-generator and a dedicated fuel tank disposed in the interior thereof, wherein the fuel tank provides fuel to the engine-generator, and wherein the primary modules include a switchgear module having switchgear disposed in the interior thereof, wherein the switchgear is ganged to at least one of the one or more gen-set modules; and a control system in communication with each of the gen-set modules to coordinate the engine-generators of the one or more gen-set modules as a unit and to control the loading of each of the generators in response to a power load demand, wherein the control system is disposed in one or more of the primary modules with at least part of the control system being disposed in the switchgear module.

In a feature of this aspect, all of the primary modules may have a common width.

In another feature of this aspect, the switchgear module is a transformer/switchgear module, the transformer/switchgear module has a transformer disposed in the interior thereof, and the transformer is connected to the switchgear. In a further feature, the primary modules may further include a workroom module, and the control system is jointly disposed in the workroom module and the transformer/switchgear module.

In another feature of this aspect, a lowermost primary module, of the vertical stack of primary modules, is mounted on, and attached to, a base frame or foundation. In further features, the primary corners of the lowermost primary module includes four bottom corners, wherein each of the bottom corners of the lowermost primary module utilizes a standardized connection structure, and the base frame or foundation includes corresponding structures that couple to, and hold in place, the bottom corners to hold the lowermost primary module in place on the base frame or foundation; and/or the standardized connection structures may be corner castings from an intermodal shipping container, and the corresponding structures of the base frame or foundation may be twist lock fasteners.

In another feature of this aspect, the modular power generation facility may further include one or more secondary modules, wherein each secondary module is disposed at an end of, but on the same level as, a respective primary module of the vertical stack of primary modules. In further features, each secondary module may have a width equal to the common width of the primary modules; the one or more secondary modules may include a fuel tank module, each fuel tank module is disposed at the end of a respective gen-set module, and wherein each fuel tank module houses a fuel tank, in an interior thereof, that provides auxiliary fuel to the engine-generator in the respective gen-set module; each fuel tank module may include sound baffles, disposed in the interior thereof, to muffle sounds of combustion and flow of air in or out of the respective gen-set module; and/or the one or more secondary modules may include a sound baffle module, wherein each sound baffle module is disposed at the end of a respective gen-set module, and wherein each sound baffle module houses sound baffles, in an interior thereof, to muffle sounds of combustion and flow of air in or out of the respective gen-set module.

In another feature of this aspect, the modular power generation facility of may further include a staircase module having eight primary corners, wherein the staircase module is disposed alongside, and attached via the respective primary corners to, at least one primary module in the vertical stack of primary modules. In further features, all of the primary modules may have a common height, and each staircase module may have a height, as measured from a top of a top primary corner to a bottom of a bottom primary corner directly beneath, equal to the common height of the primary modules; and/or the staircase module is one of a plurality of staircase modules positioned in a vertical stack of staircase modules, wherein each staircase module is attached to a primary module beside it via side attachment fittings that are each connected to one corner on the staircase module and a corresponding corner on the primary module beside the staircase module.

In another feature of this aspect, all of the primary modules may have a common length.

In another feature of this aspect, each primary module may be adapted from an intermodal shipping container having four posts, a pair of top side rails, a pair of bottom side rails, a front sill, a rear sill, a top front rail, and a top rear rail, all of which are connected together by shipping container corner castings, wherein the shipping container corner castings form the eight primary corners. In further features, each primary module is attached to a body above or below it via the corner castings and corresponding twist lock fasteners; each primary module may be attached to an additional primary module beside it via side attachment fittings that are each connected to one corner casting on a first primary module and a corresponding corner casting on a second primary module; portions of at least two of the walls of each primary module may be corrugated shipping container walls; the modular power generation facility may further include a vertical stack of staircase modules, each staircase module having eight primary corners, wherein each primary corner of the staircase module is a shipping container corner casting, the vertical stack of staircase modules is disposed alongside the vertical stack of primary modules, and each staircase module is disposed alongside, and attached via the respective corner castings to, a respective primary module in the vertical stack of primary modules.

In another feature of this aspect, the vertical stack of primary modules is a first vertical stack of primary modules, a second vertical stack of primary modules is disposed immediately adjacent the first vertical stack of primary modules, each primary module may include at least one walk-through opening accessing the interior thereof, and the at least one walk-through opening of each primary module in the first vertical stack is aligned with the at least one walk-through opening of the primary module immediately adjacent thereto in the second vertical stack, thereby providing access from the interior of each primary module to the interior of the immediately adjacent primary module.

In another feature of this aspect, each primary module, other than a lowermost primary module, is attached via the respective primary corners to the primary module immediately therebelow.

In another feature of this aspect, the switchgear module is the lowermost primary module in the vertical stack of primary modules. In a further feature, a transformer is disposed at an end of, but exterior to, the switchgear module and is electrically connected to the switchgear in the switchgear module.

In another feature of this aspect, each of one or more of the plurality of primary modules may include a respective superstructure extending outwardly from the end wall that supports one or more operational component. In further features, at least one of the one or more gen-set modules may include the superstructure; a respective fluid tank may be disposed on each of at least one superstructure, external to the interior space of the primary module; each respective fluid tank may be a diesel exhaust fluid (DEF) tank; each respective fluid tank may be a fuel tank; the switchgear module may include the superstructure; cables routed to/from an adjacent primary module may be supported on each superstructure; each superstructure may include a horizontal ladder structure, the respective horizontal ladder structures of horizontally adjacent primary modules are aligned with each other, and cables are routed to/from the adjacent primary modules via the aligned horizontal ladder structures; and/or each superstructure may include a vertical ladder structure, the respective vertical ladder structures of vertically adjacent primary modules are aligned with each other, and cables are routed to/from the adjacent primary modules via the aligned vertical ladder structures.

Broadly defined, the present invention according to another aspect is a modular power generation facility, including: a plurality of primary modules, wherein all of the primary modules may have a common height, wherein each primary module includes eight primary corners and an interior space at least partially enclosed by a top wall, a side wall, and an end wall, wherein the primary modules are positioned in a vertical stack of modules and are attached together to form a substantially modular enclosure for the generation of electricity, wherein the primary modules include one or more gen-set modules, each having an engine-generator disposed in the interior thereof, and wherein the primary modules include a switchgear module having switchgear disposed in the interior thereof, wherein the switchgear is ganged to at least one of the one or more gen-set modules; and a control system in communication with each of the gen-set modules to coordinate the engine-generators of the one or more gen-set modules as a unit and to control the loading of each of the generators in response to a power load demand, wherein the control system is disposed in one or more of the primary modules with at least part of the control system being disposed in the switchgear module; wherein the various primary modules are interchangeable, due to their common height, such that at a subsequent time a primary module may be removed from the row of modules and replaced by another primary module of the same or different type.

In a feature of this aspect, all of the primary modules may have a common width.

In another feature of this aspect, the switchgear module may be a transformer/switchgear module, the transformer/switchgear module has a transformer disposed in the interior thereof, and the transformer is connected to the switchgear. In a further feature, the primary modules may further include a workroom module, and the control system is jointly disposed in the workroom module and the transformer/switchgear module.

In another feature of this aspect, a lowermost primary module, of the vertical stack of primary modules, is mounted on, and attached to, a base frame or foundation. In further features, the primary corners of the lowermost primary module includes four bottom corners, each of the bottom corners of the lowermost primary module utilizes a standardized connection structure, and the base frame or foundation includes corresponding structures that couple to, and hold in place, the various bottom corners to hold the lowermost primary module in place on the base frame or foundation; and/or the standardized connection structures may be corner castings from an intermodal shipping container, and the corresponding structures of the base frame or foundation may be twist lock fasteners.

In another feature of this aspect, each gen-set module may further include a dedicated fuel tank disposed in the interior thereof.

In another feature of this aspect, the modular power generation facility may further include one or more secondary modules, each having a height equal to the common width of the primary modules, wherein each secondary module is disposed at an end of, but on the same level as, a respective primary module of the vertical stack of primary modules. In further features, each secondary module may have a width equal to the common width of the primary modules; the one or more secondary modules may include a fuel tank module, each fuel tank module is disposed at the end of a respective gen-set module, and each fuel tank module houses a fuel tank, in an interior thereof, that provides fuel to the engine-generator in the respective gen-set module; each fuel tank module may include sound baffles, disposed in the interior thereof, to muffle sounds of combustion and flow of air in or out of the respective gen-set module; and/or the one or more secondary modules may include a sound baffle module, wherein each sound baffle module is disposed at the end of a respective gen-set module, and wherein each sound baffle module houses sound baffles, in an interior thereof, to muffle sounds of combustion and flow of air in or out of the respective gen-set module.

In another feature of this aspect, the modular power generation facility may further include a staircase module having eight primary corners, wherein the staircase module is disposed alongside, and attached via the respective primary corners to, at least one primary module in the vertical stack of primary modules. In further features, each staircase module may have a height, as measured from a top of a top primary corner to a bottom of a bottom primary corner directly beneath, equal to the common height of the primary modules; and/or the staircase module is one of a plurality of staircase modules positioned in a vertical stack of staircase modules, wherein each staircase module is attached to a primary module beside it via side attachment fittings that are each connected to one corner on the staircase module and a corresponding corner on the primary module beside the staircase module.

In another feature of this aspect, all of the primary modules may have a common length.

In another feature of this aspect, each primary module may be adapted from an intermodal shipping container having four posts, a pair of top side rails, a pair of bottom side rails, a front sill, a rear sill, a top front rail, and a top rear rail, all of which are connected together by shipping container corner castings, wherein the shipping container corner castings form the eight primary corners. In further features, each primary module is attached to a body above or below it via the corner castings and corresponding twist lock fasteners; each primary module may be attached to an additional primary module beside it via side attachment fittings that are each connected to one corner casting on a first primary module and a corresponding corner casting on a second primary module; portions of at least two of the walls of each primary module may be corrugated shipping container walls; and/or the modular power generation facility may further include a vertical stack of staircase modules, each staircase module having eight primary corners, wherein each primary corner of the staircase module is a shipping container corner casting, wherein the vertical stack of staircase modules is disposed alongside the vertical stack of primary modules, and wherein each staircase module is disposed alongside, and attached via the respective corner castings to, a respective primary module in the vertical stack of primary modules.

In another feature of this aspect, the vertical stack of primary modules is a first vertical stack of primary modules, a second vertical stack of primary modules is disposed immediately adjacent the first vertical stack of primary modules, each primary module may include at least one walk-through opening accessing the interior thereof, and the at least one walk-through opening of each primary module in the first vertical stack is aligned with the at least one walk-through opening of the primary module immediately adjacent thereto in the second vertical stack, thereby providing access from the interior of each primary module to the interior of the immediately adjacent primary module.

In another feature of this aspect, each primary module, other than a lowermost primary module, is attached via the respective primary corners to the primary module immediately therebelow.

In another feature of this aspect, the switchgear module is the lowermost primary module in the vertical stack of modules. In a feature of this aspect, a transformer is disposed at an end of, but exterior to, the switchgear module and is electrically connected to the switchgear in the switchgear module.

In another feature of this aspect, each of one or more of the plurality of primary modules may include a respective superstructure, extending outwardly from the end wall, that supports one or more operational component. In further features, at least one of the one or more gen-set modules may include the superstructure; a respective fluid tank may be disposed on each of at least one superstructure, external to the interior space of the primary module; each respective fluid tank may be a diesel exhaust fluid (DEF) tank; each respective fluid tank may be a fuel tank; the switchgear module may include the superstructure; cables routed to/from an adjacent primary module may be supported on each superstructure; each superstructure may include a horizontal ladder structure, the respective horizontal ladder structures of horizontally adjacent primary modules are aligned with each other, and cables are routed to/from the adjacent primary modules via the aligned horizontal ladder structures; and/or each superstructure may include a vertical ladder structure, the respective vertical ladder structures of vertically adjacent primary modules are aligned with each other, and cables are routed to/from the adjacent primary modules via the aligned vertical ladder structures.

Broadly defined, the present invention according to another aspect is a modular power generation facility, including: a plurality of primary modules, wherein each primary module includes eight primary corners and an interior space at least partially enclosed by a top wall, a side wall, and an end wall, wherein each primary module is adapted from an intermodal shipping container having four posts, a pair of top side rails, a pair of bottom side rails, a front sill, a rear sill, a top front rail, and a top rear rail, all of which are connected together at the eight primary corners by shipping container corner castings, wherein the primary modules are positioned in a vertical stack of modules and are attached together to form a substantially modular enclosure for the generation of electricity, wherein the primary modules include one or more gen-set modules, each having an engine-generator disposed in the interior thereof, and wherein the primary modules include a switchgear module having switchgear disposed in the interior thereof, wherein the switchgear is ganged to at least one of the one or more gen-set modules; and a control system in communication with each of the gen-set modules to coordinate the engine-generators of the one or more gen-set modules as a unit and to control the loading of each of the generators in response to a power load demand, wherein the control system is disposed in one or more of the primary modules with at least part of the control system being disposed in the switchgear module.

In a feature of this aspect, the primary modules may be attached together via their respective corner castings.

In another feature of this aspect, the switchgear module may be a transformer/switchgear module, the transformer/switchgear module has a transformer disposed in the interior thereof, and the transformer is connected to the switchgear. In a further feature, the primary modules may further include a workroom module, and the control system is jointly disposed in the workroom module and the transformer/switchgear module.

In another feature of this aspect, a lowermost primary module, of the vertical stack of the primary modules, is mounted on, and attached to, a base frame or foundation.

In another feature of this aspect, each gen-set module may further include a dedicated fuel tank disposed in the interior thereof.

In another feature of this aspect, the modular power generation facility may further include one or more secondary modules, wherein each secondary module includes eight primary corners and an interior space at least partially enclosed by a top wall, a side wall, and an end wall, wherein each secondary module may be adapted from an intermodal shipping container having four posts, a pair of top side rails, a pair of bottom side rails, a front sill, a rear sill, a top front rail, and a top rear rail, all of which are connected together at the eight primary corners by shipping container corner castings, and wherein each secondary module is disposed at an end of, but on the same level as, a respective primary module of the vertical stack of primary modules. In further features, the one or more secondary modules may include a fuel tank module, each fuel tank module is disposed at the end of a respective gen-set module, and each fuel tank module houses a fuel tank, in an interior thereof, that provides auxiliary fuel to the engine-generator in the respective gen-set module; each fuel tank module may include sound baffles, disposed in the interior thereof, to muffle sounds of combustion and flow of air in or out of the respective gen-set module; the one or more secondary modules may include a sound baffle module, wherein each sound baffle module is disposed at the end of a respective gen-set module, and wherein each sound baffle module houses sound baffles, in an interior thereof, to muffle sounds of combustion and flow of air in or out of the respective gen-set module.

In another feature of this aspect, the modular power generation facility may further include a staircase module having eight primary corners, wherein each primary corner of the staircase module is a shipping container corner casting, wherein the staircase module is disposed alongside, and attached via the respective corner castings to, at least one primary module in the vertical stack of primary modules. In further features, the primary modules may have a common height, and each staircase module has a height, as measured from a top of a top corner casting to a bottom of a bottom corner casting directly beneath, equal to the common height of the primary modules; and/or the primary modules may have a common width, and each staircase module has a width equal to the common width of the primary modules.

In another feature of this aspect, the primary modules may have a common length.

In another feature of this aspect, each primary module is attached to a body above or below it via the corner castings and corresponding twist lock fasteners.

In another feature of this aspect, the vertical stack of primary modules is a first vertical stack of primary modules, a second vertical stack of primary modules is disposed immediately adjacent the first vertical stack of primary modules, each primary module may include at least one walk-through opening accessing the interior thereof, and the at least one walk-through opening of each primary module in the first vertical stack is aligned with the at least one walk-through opening of the primary module immediately adjacent thereto in the second vertical stack, thereby providing access from the interior of each primary module to the interior of the immediately adjacent primary module.

In another feature of this aspect, portions of at least two of the walls of each primary module may be corrugated shipping container walls.

In another feature of this aspect, each of one or more of the plurality of primary modules may include a respective superstructure, extending outwardly from the end wall, that supports one or more operational component. In further features, at least one of the one or more gen-set modules may include the superstructure; a respective fluid tank may be disposed on each of at least one superstructure, external to the interior space of the primary module; each respective fluid tank may be a diesel exhaust fluid (DEF) tank; each respective fluid tank may be a fuel tank; the switchgear module may include the superstructure; cables routed to/from an adjacent primary module may be supported on each superstructure; each superstructure may include a horizontal ladder structure, the respective horizontal ladder structures of horizontally adjacent primary modules are aligned with each other, and cables are routed to/from the adjacent primary modules via the aligned horizontal ladder structures; and/or each superstructure may include a vertical ladder structure, the respective vertical ladder structures of vertically adjacent primary modules are aligned with each other, and cables are routed to/from the adjacent primary modules via the aligned vertical ladder structures.

Broadly defined, the present invention according to another aspect is a multi-stack modular power generation facility, including: a first plurality of primary modules, wherein the first plurality of primary modules are positioned in a first vertical stack of modules and are attached together to form a substantially modular first vertical enclosure for the generation of electricity, wherein each primary module includes eight primary corners and an interior space at least partially enclosed by a top wall, a floor, a side wall, and an end wall, wherein the primary modules include one or more gen-set modules, each having an engine-generator disposed in the interior thereof, and wherein the primary modules include a first switchgear module having first switchgear disposed in the interior thereof, wherein the first switchgear is ganged to at least one of the one or more gen-set modules in the first vertical stack of primary modules; a first control system in communication with each of the gen-set modules in the first vertical stack of primary modules to coordinate the engine-generators of the one or more gen-set modules as a unit and to control the loading of each of the generators in response to a power load demand, wherein the first control system is disposed in one or more of the primary modules of the first vertical stack with at least part of the first control system being disposed in the first switchgear module; a second plurality of primary modules, wherein the second plurality of primary modules are positioned in a second vertical stack of modules and are attached together to form a substantially modular second vertical enclosure for the generation of electricity, wherein each primary module includes eight primary corners and an interior space at least partially enclosed by a top wall, a floor, a side wall, and an end wall, wherein the primary modules include one or more gen-set modules, each having an engine-generator disposed in the interior thereof, and wherein the primary modules include a second switchgear module having switchgear disposed in the interior thereof, wherein the second switchgear is ganged to at least one of the one or more gen-set modules in the second vertical stack of primary modules; and a second control system in communication with each of the gen-set modules in the second vertical stack of primary modules to coordinate the engine-generators of the one or more gen-set modules as a unit and to control the loading of each of the generators in response to a power load demand, wherein the second control system is disposed in one or more of the primary modules of the second vertical stack with at least part of the second control system being disposed in the second switchgear module; wherein the second plurality of primary modules are disposed immediately adjacent the first plurality of primary modules such that the second vertical enclosure abuts the first vertical enclosure.

In a feature of this aspect, in each vertical stack, all of the primary modules may have a common width.

In another feature of this aspect, in each vertical stack, the switchgear module may be a transformer/switchgear module, wherein the respective transformer/switchgear module has a transformer disposed in the interior thereof, and wherein the respective transformer is connected to the respective switchgear.

In another feature of this aspect, a lowermost primary module, of each vertical stack of primary modules, is mounted on, and attached to, a base frame or foundation. In further features, the base frame or foundation includes a plurality of modular base structures, wherein the lowermost primary module, of each vertical stack of primary modules, is mounted on, and attached to, a respective modular base structure; the lowermost primary module, of each vertical stack of primary modules, is attached, via its primary corners, to the base frame or foundation; the primary corners, of each of the lowermost primary modules, include four bottom corners, wherein each of the bottom corners of each of the lowermost primary modules utilizes a standardized connection structure, and wherein the base frame or foundation includes corresponding structures that couple to, and hold in place, the various bottom corners to hold the lowermost primary modules in place on the base frame or foundation; and/or the standardized connection structures may be corner castings from an intermodal shipping container, and the corresponding structures of the base frame or foundation may be twist lock fasteners.

In another feature of this aspect, in each vertical stack, each gen-set module may further include a dedicated fuel tank disposed in the interior thereof.

In another feature of this aspect, the multi-stack modular power generation facility may further include one or more secondary modules, wherein each secondary module is disposed at an end of, but on the same level as, a respective primary module of the vertical stack of primary modules. In further features, each secondary module may have a width equal to the common width of the primary modules; the one or more secondary modules may include a fuel tank module, wherein each fuel tank module is disposed at the end of a respective gen-set module, and wherein each fuel tank module houses a fuel tank, in an interior thereof, that provides fuel to the engine-generator in the respective gen-set module; each fuel tank module may include sound baffles, disposed in the interior thereof, to muffle sounds of combustion and flow of air in or out of the respective gen-set module; and/or the one or more secondary modules may include a sound baffle module, wherein each sound baffle module is disposed at the end of a respective gen-set module, and wherein each sound baffle module houses sound baffles, in an interior thereof, to muffle sounds of combustion and flow of air in or out of the respective gen-set module.

In another feature of this aspect, the multi-stack modular power generation facility may further include a staircase module having eight primary corners, wherein the staircase module is disposed alongside, and attached via the respective primary corners to, at least one primary module in the first vertical stack of primary modules. In further features, all of the primary modules may have a common height, and each staircase module has a height, as measured from a top of a top primary corner to a bottom of a bottom primary corner directly beneath, equal to the common height of the primary modules; and/or the staircase module is one of a plurality of staircase modules positioned in a vertical stack of staircase modules, wherein each staircase module is attached to a primary module beside it via side attachment fittings that are each connected to one corner on the staircase module and a corresponding corner on the primary module beside the staircase module.

In another feature of this aspect, in each vertical stack, all of the primary modules may have a common length.

In another feature of this aspect, in each vertical stack, each primary module may be adapted from an intermodal shipping container having four posts, a pair of top side rails, a pair of bottom side rails, a front sill, a rear sill, a top front rail, and a top rear rail, all of which are connected together by shipping container corner castings, wherein the shipping container corner castings form the eight primary corners. In further features, in each vertical stack, each primary module is attached to a body above or below it via the corner castings and corresponding twist lock fasteners; the primary modules in the first vertical stack are attached to the primary modules in the second vertical stack via side attachment fittings that are each connected to one corner casting on a first primary module and a corresponding corner casting on a second primary module; and/or portions of at least two of the walls of each primary module may be corrugated shipping container walls.

In another feature of this aspect, each primary module may include at least one walk-through opening accessing the interior thereof, wherein the at least one walk-through opening of each primary module in the first vertical stack is aligned with the at least one walk-through opening of the primary module immediately adjacent thereto in the second vertical stack, thereby providing access from the interior of each primary module in the first vertical stack to the interior of the immediately adjacent primary module in the second vertical stack.

In another feature of this aspect, each primary module in the first vertical stack is attached via the respective primary corners to the primary module immediately adjacent thereto in the second vertical stack.

In another feature of this aspect, the switchgear in the first switchgear module is operatively connected to the switchgear in the second switchgear module. In further features, the first and second switchgear modules are disposed side-by-side and are attached to one another; and/or an exterior wall of the first switchgear module is penetrated by a cable slot through which interconnect cables may pass for connection to the second switchgear module.

In another feature of this aspect, the multi-stack modular power generation facility may further include: a third plurality of primary modules, wherein the third plurality of primary modules are positioned in a third vertical stack of modules and may be attached together to form a substantially modular third vertical enclosure for the generation of electricity, wherein each primary module includes eight primary corners and an interior space at least partially enclosed by a top wall, a floor, a side wall, and an end wall, wherein the primary modules include one or more gen-set modules, each having an engine-generator disposed in the interior thereof, and wherein the primary modules include a third switchgear module having switchgear disposed in the interior thereof, wherein the third switchgear is ganged to at least one of the one or more gen-set modules in the third vertical stack of primary modules; and a third control system in communication with each of the gen-set modules in the third vertical stack of primary modules to coordinate the engine-generators of the one or more gen-set modules as a unit and to control the loading of each of the generators in response to a power load demand, wherein the third control system is disposed in one or more of the primary modules of the third vertical stack with at least part of the third control system being disposed in the third switchgear module; wherein the third plurality of primary modules are disposed immediately adjacent the second plurality of primary modules such that the third vertical enclosure abuts the second vertical enclosure.

In another feature of this aspect, each of one or more of the first and second pluralities of primary modules may include a respective superstructure, extending outwardly from the end wall, that supports one or more operational component. In further features, at least one of the one or more gen-set modules of each of the first and second pluralities of primary modules may include the superstructure; a respective fluid tank may be disposed on each of at least one superstructure, external to the interior space of the primary module; each respective fluid tank may be a diesel exhaust fluid (DEF) tank; each respective fluid tank may be a fuel tank; each of the first and second switchgear modules may include the superstructure; cables routed to/from an adjacent primary module may be supported on each superstructure; each superstructure may include a horizontal ladder structure, wherein the respective horizontal ladder structures of horizontally adjacent primary modules are aligned with each other, and wherein cables are routed to/from the adjacent primary modules via the aligned horizontal ladder structures; and/or each superstructure may include a vertical ladder structure, wherein the respective vertical ladder structures of vertically adjacent primary modules are aligned with each other, and wherein cables are routed to/from the adjacent primary modules via the aligned vertical ladder structures.

Broadly defined, the present invention according to another aspect is a method of erecting a modular power generation facility, including: producing a plurality of primary modules, wherein each primary module including a housing that is adapted from an intermodal shipping container having four posts, a pair of top side rails, a pair of bottom side rails, a front sill, a rear sill, a top front rail, and a top rear rail, all of which are connected together at the eight primary corners by shipping container corner castings, wherein each primary module includes an interior space at least partially enclosed by a top wall, a side wall, wherein the primary modules include one or more gen-set modules, each having an engine-generator operatively installed in the interior thereof, and wherein the primary modules include a switchgear module having switchgear operatively installed in the interior thereof; shipping the plurality of primary modules, with the respective engine-generator or switchgear operatively installed therein, to an installation location; at the installation location, positioning the primary modules, with the respective engine-generator or switchgear operatively installed therein, in a vertical stack; attaching the primary modules, with the respective engine-generator or switchgear operatively installed therein, to one another in the vertical stack, thereby forming a substantially modular enclosure; interconnecting the engine-generators of the one or more gen-set modules with the switchgear of the switchgear module; and operating the engine-generators and the switchgear to provide electricity to a transformer connected to the switchgear in response to a power load demand.

In a feature of this aspect, the operating step includes using a control system, arranged in communication with each of the gen-set modules, to coordinate the engine-generators of the one or more gen-set modules as a unit and to control the loading of each of the generators in response to a power load demand.

In another feature of this aspect, the shipping step is carried out by handling and transporting the shipping container-based primary modules, each with a respective engine-generator or switchgear operatively installed therein, using the corner castings of the respective shipping container housings. In a further feature, at least some of the switchgear modules are transformer/switchgear modules, each transformer/switchgear module has a transformer operatively installed in the interior thereof and operatively connected to the respective switchgear, the shipping step is carried out for each transformer/switchgear module with the respective transformer operatively installed therein, and the operating step is carried out for each transformer/switchgear module using the transformer installed therein.

In another feature of this aspect, the positioning step includes maneuvering the shipping container-based primary modules, each with a respective engine-generator or switchgear operatively installed therein, using the corner castings of the respective shipping container housings.

In another feature of this aspect, the positioning step includes attaching the primary modules to a base frame or foundation via twist lock fasteners mounted to the base frame or foundation, thereby holding the modules in place thereon.

In another feature of this aspect, the operating step is carried out for a period of time, the method may further include a subsequent step of terminating the operating step, the method may further include attaching an additional primary module, which is an additional gen-set module, to the row of existing primary modules, the method may further include interconnecting the engine-generator of the additional gen-set module to the switchgear of the switchgear module, and the method may further include reinitiating the operating step. In a further feature, the method may further include a step, prior to the step of attaching an additional primary module and after the terminating step, of removing one of the one or more gen-set modules, and the step of attaching an additional gen-set module includes attaching the additional module as a replacement for the removed module.

In another feature of this aspect, the method may further include a step of producing one or more staircase module, each having eight primary corners, wherein each primary corner of each staircase module is a shipping container corner casting, and the method may further include attaching one or more staircase modules, in a vertical stack, to the vertical stack of primary modules to provide access to upper primary modules. In further features, the step of attaching the vertical stack of staircase modules to the vertical stack of primary modules is carried out via respective corner castings on the staircase modules and the primary modules; the step of attaching the vertical stack of staircase modules to the vertical stack of primary modules is carried out via side attachment fittings coupled between the respective corner castings on the staircase modules and the primary modules; the method may further include a step of shipping the one or more staircase modules to the installation location, wherein the shipping step is carried out by handling and transporting the staircase modules using the corner castings of the one or more staircase modules; the method may further include a step, prior to the step of attaching the vertical stack of staircase modules to the vertical stack of primary modules, of maneuvering the staircase modules into place next to the primary modules, wherein the maneuvering step is carried out using the corner castings of the respective staircase modules; and/or the method may further include a step, prior to the step of attaching the vertical stack of staircase modules to the vertical stack of primary modules, of attaching a lowermost of the staircase modules to a base frame or foundation via twist lock fasteners mounted to the base frame or foundation, thereby holding the lowermost staircase module in place thereon.

In another feature of this aspect, the method may further include steps of producing a secondary module that includes a housing adapted from an intermodal shipping container having four posts, a pair of top side rails, a pair of bottom side rails, a front sill, a rear sill, a top front rail, and a top rear rail, all of which are connected together at the eight primary corners by shipping container corner castings, maneuvering the secondary module into place at an end of a first of the at least one primary modules, and attaching the secondary module to the end of the first primary module using the corner castings of the respective shipping container housings. In further features, the first primary module is a gen-set module, the secondary module is a fuel tank module housing a fuel tank, and the method may further include operatively connecting the fuel tank to the engine-generator of the gen-set module in the first primary module such that fuel is provided from the fuel tank to the engine-generator; and/or the first primary module is a gen-set module, the secondary module includes a sound baffle module housing sound baffles, and the method may further include muffling sounds of combustion or flow of air in or out of the first primary module.

In another feature of this aspect, the one or more gen-set modules are a first set of gen-set modules, the switchgear module is a first switchgear module, the vertical stack of primary modules is a first vertical stack of primary modules, the step of producing a plurality of primary modules also includes producing at least a second set of the gen-set modules and at least a second switchgear module, the method may further include a step of positioning the second set of primary modules in a second vertical stack, the method may further include attaching the second set of primary modules, with the respective engine-generator or switchgear operatively installed therein, to one another in the second vertical stack, thereby forming a substantially modular enclosure, the method may further include interconnecting the engine-generators of the second set of gen-set modules with the switchgear of the second switchgear module, and the operating step includes operating the first and second sets of engine-generators and the first and second switchgear to provide electricity to transformers connected to the respective switchgear in response to a power load demand. In further features, all of the primary modules may have a common height; all of the primary modules may have a common length; and/or all of the primary modules may have a common width.

In another feature of this aspect, the step of attaching the primary modules to one another in the vertical stack includes attaching each primary module to the primary module above it or below it via the corner castings and corresponding twist lock fasteners.

In another feature of this aspect, the method may further include a step of installing a respective superstructure on each of one or more of the plurality of primary modules, the superstructure extending outwardly from the end wall, and a step of supporting one or more operational component on the superstructure. In further features, at least one of the one or more gen-set modules may include the superstructure; the step of a supporting one more operational component on the superstructure includes supporting a respective fluid tank on each superstructure, external to the interior space of the respective primary module; each respective fluid tank may be a diesel exhaust fluid (DEF) tank; each respective fluid tank may be a fuel tank; the switchgear module may include the superstructure; the step of a supporting one more operational component on the superstructure includes supporting cables that are routed to/from an adjacent primary module; each superstructure may include a horizontal ladder structure, wherein the respective horizontal ladder structures of horizontally adjacent primary modules are aligned with each other, and wherein cables are routed to/from the adjacent primary modules via the aligned horizontal ladder structures; and/or each superstructure may include a vertical ladder structure, wherein the respective vertical ladder structures of vertically adjacent primary modules are aligned with each other, and wherein cables are routed to/from the adjacent primary modules via the aligned vertical ladder structures.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein:

FIG. 12E is rear view of the gen-set module of FIG. 12A;

FIG. 12F is a front view of the gen-set module of FIG. 12A;

DETAILED DESCRIPTION

Figure 1:
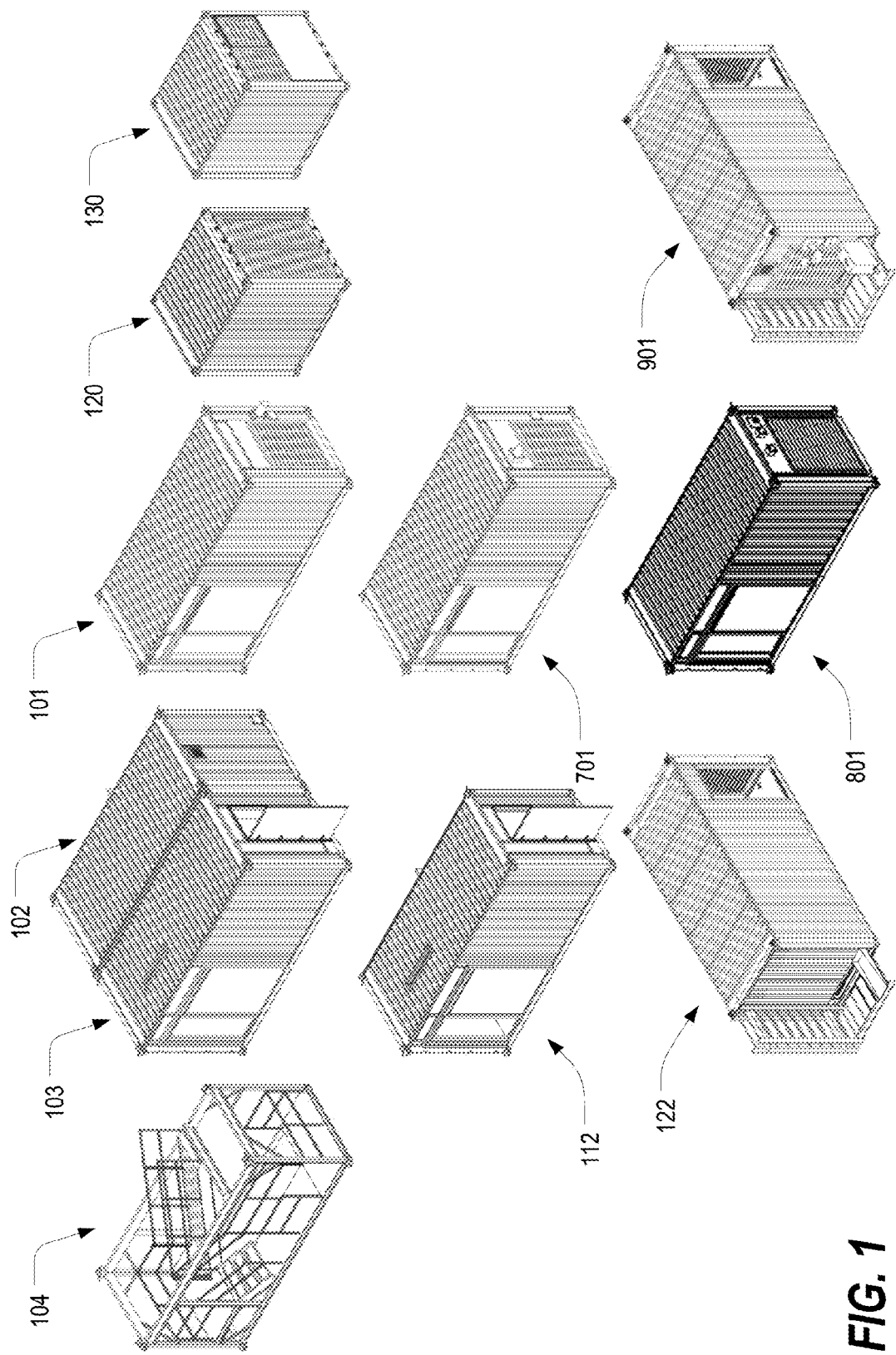
FIG. 1 is an isometric view of a collection of electric power generation modules for use as building blocks in modular power generation facilities, all in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

One aspect of the present invention is the use of purpose-built intermodal shipping containers that meet the International Organization for Standardization ("ISO") specifications for standard container size and construction (often referred to as ISO shipping containers, and general referred to herein as "ISO intermodal shipping containers" or simply "intermodal shipping containers"). Such containers are manufactured in a limited number of sizes. Common container lengths include ten feet (approximately 9-feet-9.625-inches external) and twenty feet (approximately 19-feet-10.5-inches external) lengths. The standard width for such ISO intermodal shipping containers are eight feet, and the common height is eight-feet-six-inches (standard height containers) or nine-feet-six-inches ("high-cube" containers). A typical standard container has five fixed sides (top, bottom, sides, and one end) and a set of swinging doors with hinges and vertical locking bars, with the locking bars extending from top to bottom of the doors and adapted to latch to the rear sill and the top rear rail. However, the top, bottom, side, and end walls can be customized for specific needs. In a non-limiting example, locking bars may be removed or omitted entirely from the rear doors, either as part of manufacturing or after shipping. The common feature for all ISO intermodal shipping containers is that there is a heavy-duty casting at each of the eight corners that terminate the eight beams (two bottom side rails, two top side rails, a front top rail, a back top rail, a front sill, and a rear sill) and the four columns (two front posts and two rear posts) of the container. Much of the structural integrity of an ISO container is provided by the eight top and bottom beams and the four vertical columns terminating into the eight corner castings, with additional structural integrity being provided by the use of corrugated walls. The corner castings also allow the containers to be fastened using a device known as a twist lock fastener; such twist lock fasteners can be manual or automatic (i.e., spring-loaded or the like). The twist lock fastener allows a container to be secured to a truck flatbed (for shipment to a site), to a base frame or foundation once on-site, and to abutting containers above and below for vertical stacking.

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses. The use of "right," "left," "front," and "rear" in describing the various views is somewhat arbitrary, but is intended to match terminology used to describe an ISO intermodal shipping container when the container is on a tractor-trailer combination, wherein the front wall is the wall that is typically arranged closest to the tractor cab and the rear wall is the wall that contains the container doors.

FIG. 1 is an isometric view of a collection of electric power generation modules for use as building blocks in modular power generation facilities, all in accordance with one or more preferred embodiments of the present invention. As illustrated therein, modules preferably include different types of gen-set modules 101,701,801,901, transformer/switchgear modules 102, workroom modules 103, switchgear/workroom modules 112,122, staircase modules 104, sound baffle modules 120, and external fuel tank modules 130. Gen-set modules 101,701,801,901, transformer/switchgear modules 102, workroom modules 103, and switchgear/workroom modules 112,122 are sometimes referred to herein as "primary modules;" sound baffle modules 120 and external fuel tank modules 130 are sometimes referred to herein as "secondary modules." The modules may be arranged in various ways to form modular power generation facilities, some of which are described and illustrated herein. In a typical facility, each transformer/switchgear module 102 abuts the side of a gen-set module 101,701,801, each workroom module 103 abuts the opposite side of a transformer/switchgear module 102, each sound baffle module 120 abuts one end of a gen-set module 101,701,801, each external fuel tank module 130 abuts the opposite end of the gen-set module 101,701,801, and each staircase module 104 abuts the side of a workroom module 103 or the side of a gen-set module 101,701,801. In another typical facility, each switchgear/workroom module 112 abuts the side of a gen-set module 101,701,801, each sound baffle module 120 abuts one end of a gen-set module 101,701,801, each external fuel tank module 130 abuts the opposite end of the gen-set module 101,701,801, and each staircase module 104 abuts the side of a workroom module 103 or the side of a gen-set module 101,701,801. However, it will be appreciated that the modules may be used as building blocks in a wide variety of facilities, wherein some facilities may include all of the illustrated modules, while others may only include a subset of the modules, and wherein the number of modules of each type may vary considerably from one facility to another. Each of these will be described in greater detail hereinbelow.

FIGS. 2A-2F are an isometric view, a top cross-sectional view, a right side view, a left side view, a rear view, and a front view, respectively, of one of the gen-set modules 101 of FIG. 1. The gen-set module 101 includes a generator 200 housed in a purpose-built ISO intermodal shipping container with limited modifications of options, all in the same space footprint as a conventional ISO intermodal shipping container. In at least one contemplated commercial embodiment, the shipping container footprint is that of a "hi-cube" unit that is eight feet wide, 20 feet long, and 9-foot-6-inches tall; however, other conventional shipping container footprint sizes may additionally or alternatively be utilized.

The container includes a top left side rail 232, a bottom left side rail 230, a top right side rail 233, a bottom right side rail 231, a top rear rail 234, a rear sill 235, a rear left post 236, a rear right post 237, a top front rail 245, a front sill 246, a front left post 247, and a front right post 248. A plurality of walls are supported by the rails, sills, and posts to form a housing; portions or the entirety of each such wall preferably utilize conventional corrugated steel construction, like that of conventional intermodal shipping containers. Conventional (ISO where applicable) corner castings, preferably including both upper and lower corner castings 241,242, are provided to enable the modules 101 to be carried, and preferably stacked, like conventional shipping containers. The modules 101 may thus be hauled by rail, tractor-trailer, ship, and any other conventional mode of shipping container transport. Side attachment fittings 243 are also provided to enable the module 101 to be securely attached to another module placed in side-by-side abutment therewith. Preferably, the side attachment fittings 243 are connected to the conventional corner castings 241,242. In at least some embodiments, a corner casting 241,242 of one module 101 can be attached to a corresponding corner casting 241,242 on the adjacent module via a single side attachment fitting 243. In at least some of these embodiments, the side attachment fittings 243 are provided on the four fixtures 241,242 on one side of the module 101, and the side that is selected is the same for every module such that a proper set of side attachment fittings is always available for side-to-side attachment of adjacent modules.

One or more large ventilation opening in the rear doors or wall, preferably covered by louvers 211, allows ventilation air to circulate through the gen-set module 101, while one or more additional ventilation opening in the front wall, also preferably covered by louvers 214, allows cooling air to circulate to the generator 200 contained inside. The rear ventilation openings preferably occupy substantially all of the area of the rear doors or panel, while the front ventilation openings preferably occupy at least a quarter of the area of the front panel. User access to the interior is generally provided via doorways 204 and a passageway 220; a door 203 is shown in an open position in one of the doorways 204. However, in at least some embodiments, a front panel 215, front louvers 214, and/or rear louvers 211 may be removed, and/or the rear doors (if provided) may be opened, to provide additional access to the contents of the gen-set module 101, allowing access for repair, upgrade or replacement of components.

Figure 2A:
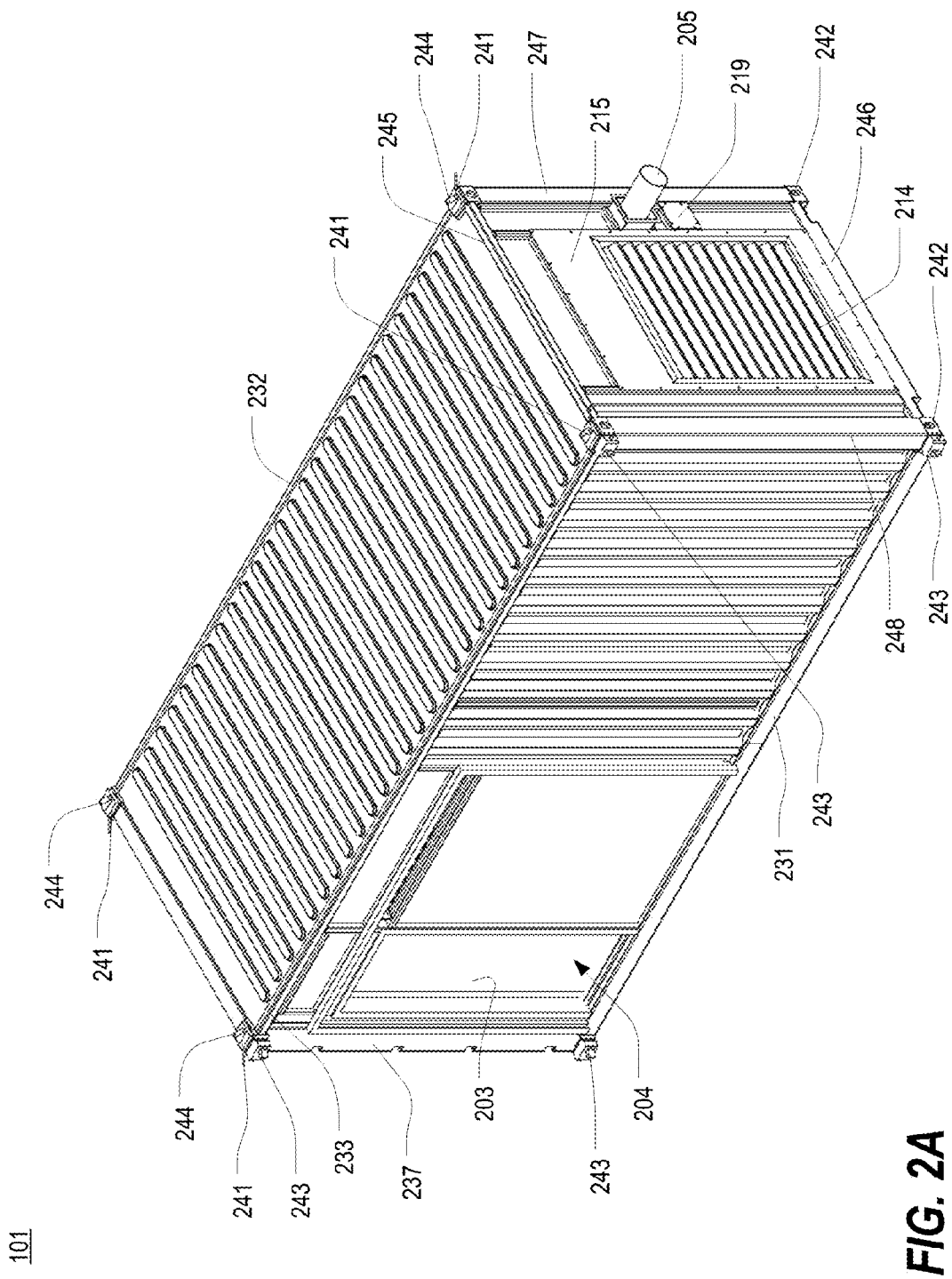
FIG. 2A is an isometric view of one of the gen-set modules of FIG. 1.
Figure 2B:
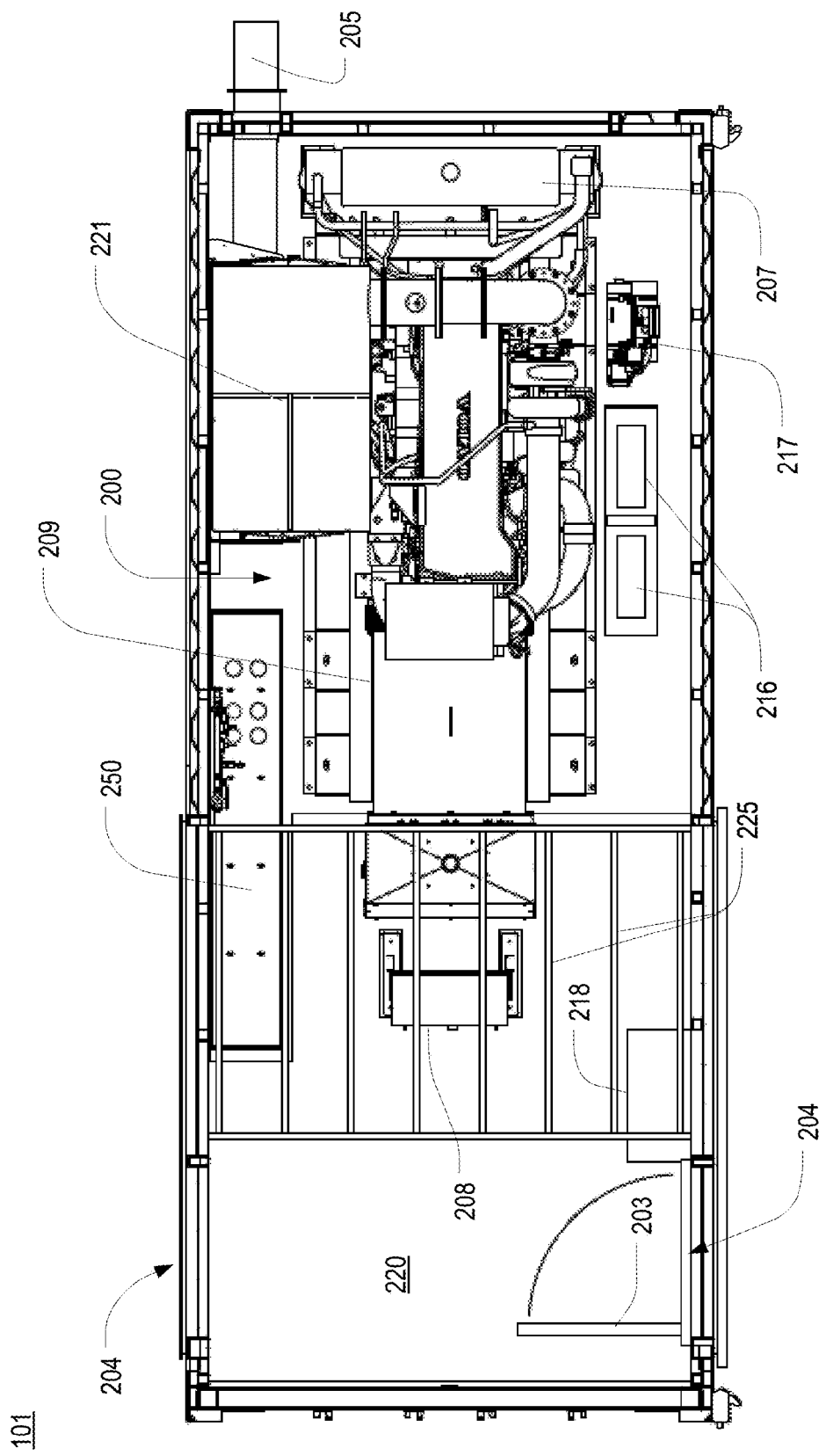
FIG. 2B is a top cross-sectional view of the gen-set module of FIG. 2A, taken along line 2B-2B of FIG. 2D.
Figure 2C:
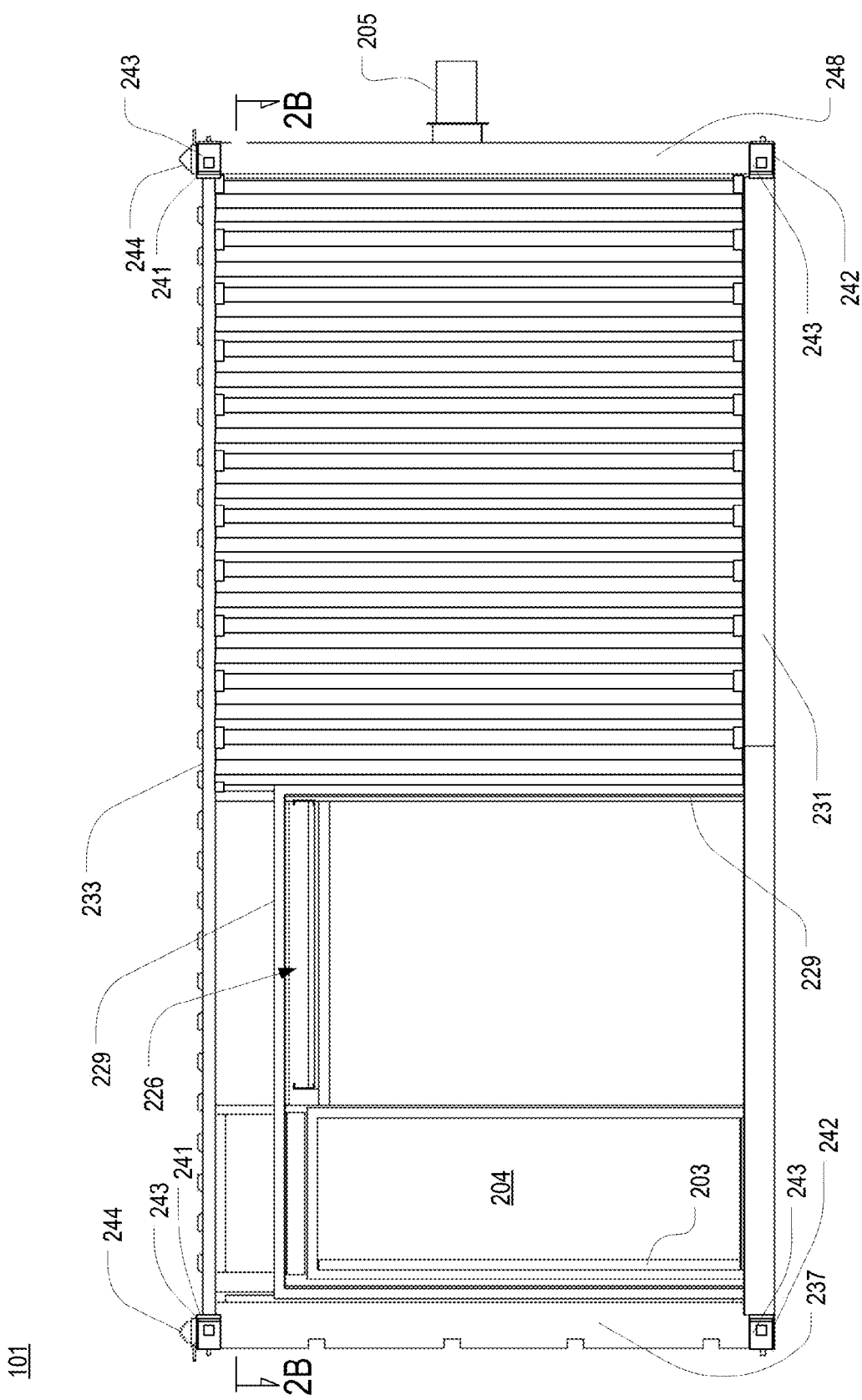
FIG. 2C is a right side view of the gen-set module of FIG. 2A.
Figure 2D:
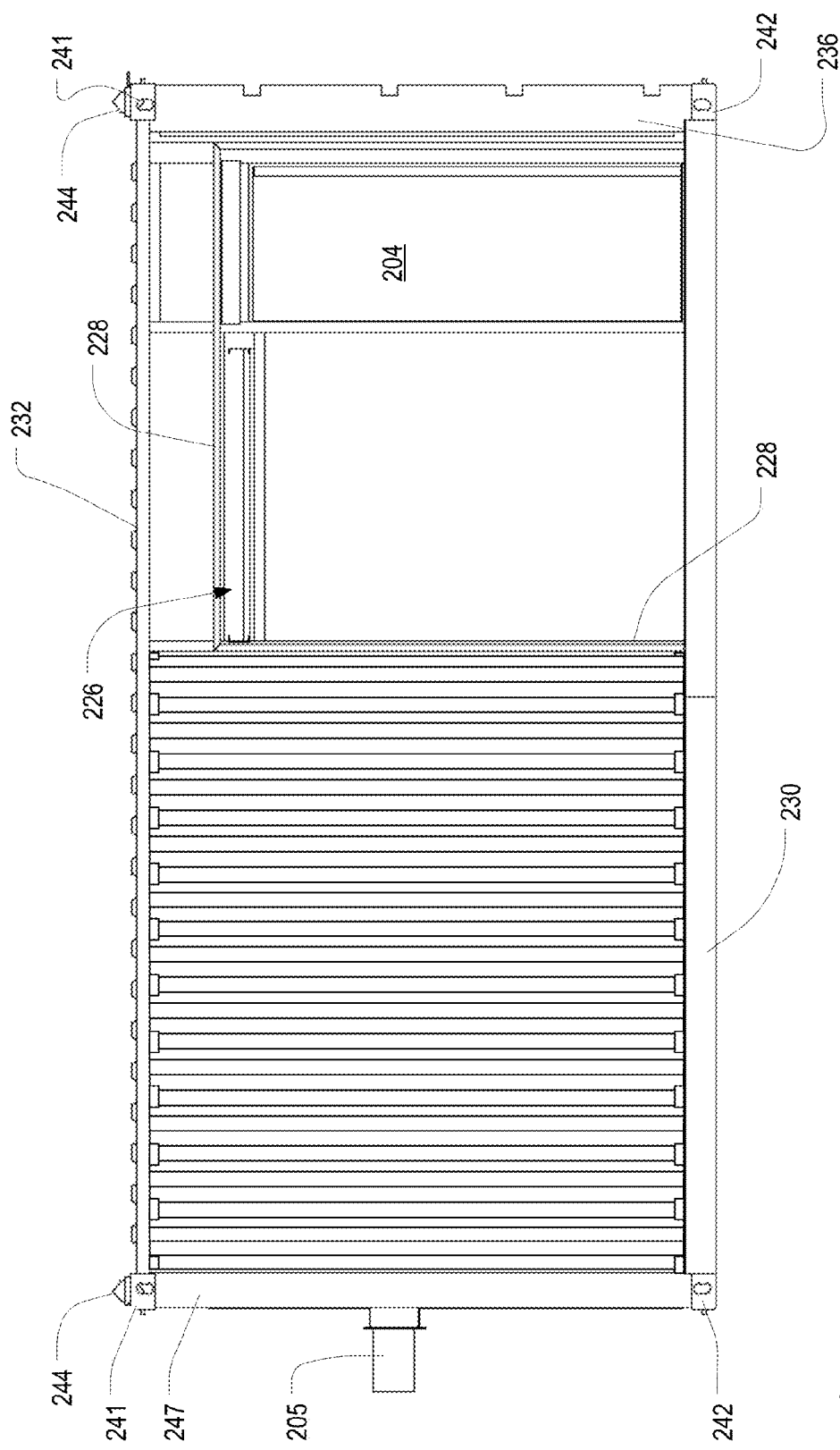
FIG. 2D is a left side view of the gen-set module of FIG. 2A.
Figures 2E, 2F:
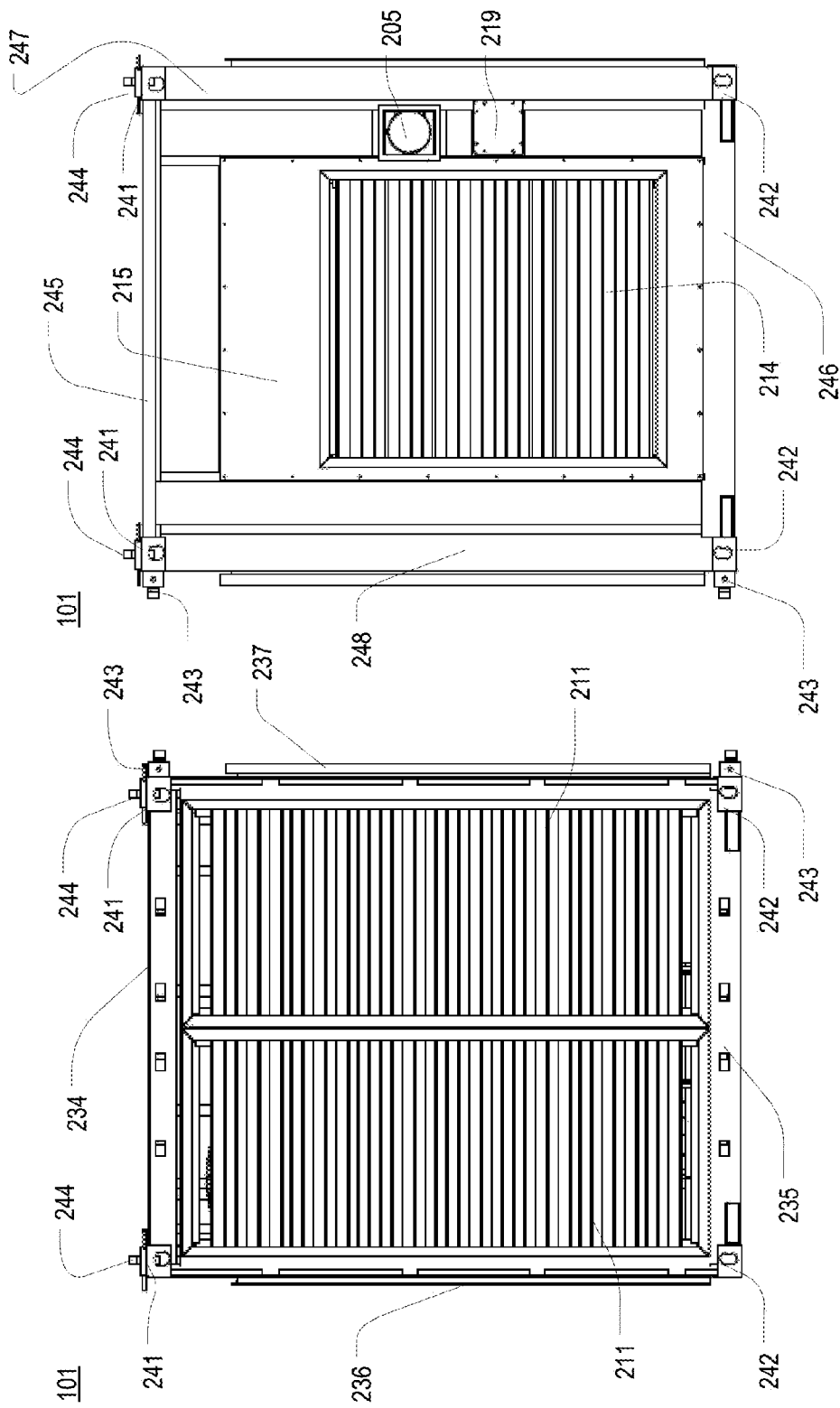
FIG. 2E is a rear view of the gen-set module of FIG. 2A.
FIG. 2F is a front view of the gen-set module of FIG. 2A.

As perhaps best shown in the top cross-sectional view of FIG. 2B, the interior of the gen-set module 101 contains a generator 200, an alternator 209, one or more batteries 216, a "hotstart" heating/starting system 217, a cooling radiator 207, a circuit breaker/switchgear panel 208, a communications (comms) box 218, a fuel tank 250, and an exhaust pipe 205. In at least some contemplated commercial embodiments, the generator 200 is diesel-fired and satisfies the EPA Tier 4 Final emissions standards. Equipment suitable for use includes a Tier 4 (625 kW) engine available from Volvo and a corresponding alternator available from Marathon. In at least some embodiments, a selective catalyst reduction (SCR) system 221 and diesel exhaust fluid (DEF) (urea) tank are provided in order to help meet Tier 4 emission level requirements. In some such embodiments, including the one illustrated in FIG. 2B, the SCR system 221 is housed within the container, while the DEF tank is located outside the ISO container in order to facilitate ease of connection to main supply infrastructure and to provide greater internal module space for operation and maintenance access. In at least some such embodiments, standard harnesses and plumbing as provided by the engine manufacturer are utilized without modification. Also, it will be appreciated that in various embodiments, some of which are described herein, a gen-set module may be provided with a generator that is gasoline fired, natural gas fired, propane fired, fuel oil fired, or fired by any other type of fuel. In various embodiments, the generators can be high-efficiency and rated for continuous use, or can be lower efficiency rated for non-continuous use.

The filling of the tank 250 may be accomplished by supply hoses passed through a doorway 204 or via some other opening. In at least some embodiments, an access port 219 provides such opening in the front wall of the gen-set module 101,701,901 and preferably includes a cover that seals the opening when not in use. In an alternate embodiment, filling ports may be mounted on an external surface of the gen-set module 101 such as the surface where the louvers 211 are mounted. In another alternate embodiment, the tanks of a plurality of gen-set modules 101 can be interconnected through a manifold system, and fluid levels can be centrally monitored using a set of tank-level sensors and replenished manually by an operator or automatically under the control of a central monitoring control system.

In at least some embodiments of the present invention, one or more overhead cable trays 225 are used to carry power output and control signal cables (not shown) within the module 101. Such interconnect cables are connected to the circuit breaker/switchgear panel 208 and communications (comms) box 218 in a given gen-set module 101. In at least some embodiments, the cables are provided as part of a pre-defined power cable and control wire harnesses that are pre-manufactured, pre-installed, and factory verified prior to shipment. A cable slot 226 is arranged in the respective side wall of the container at each end of the cable tray 225 to provide entry and exit of the cables to/from the module 101. As described further elsewhere herein, the cables may be passed through the cable trays of adjacent modules, particularly including other gen-set modules 101, until the cables can be terminated at the equipment located in the transformer/switchgear module 102 and workroom module 103 located on the same level as the corresponding gen-set modules 101. Additionally or alternatively, vertical cable chases (not shown) may be provided to enable interconnect between a gen-set module 101 and the module above and/or below it. Also, in an alternate embodiments (not shown), interconnect cables that are integral to each gen-set module 101 and arranged such that they are terminated in modular connections that can be made by plugs mounted to the exterior walls of each of the gen-set modules 101.

The doorways 204 and cable slots 226 of each module are preferably surrounded by a frame that may be coupled to a corresponding frame on an adjacent module to provide environmental protection for the cable connections and the doorways. In at least some embodiments, one side of the module 101 utilizes an inner frame 228 and the other side of the module 101 utilizes an outer frame 229 such that when the module 101 is placed in side-to-side abutment with another module, the inner frame 228 of one module fits within the outer frame 229 of the other module to surround and protect the inter-module doorway and cable passages. In other embodiments (not shown), the frames on opposing sides may be identical but arranged to couple with each other in a manner providing similar protection.

FIGS. 3A-3F are an isometric view, a top cross-sectional view, a right side view, a left side view, a rear view, and a front view of the transformer/switchgear module 102 and the workroom module 103 of FIG. 1. Although shown coupled together, the transformer/switchgear module 102 and workroom module 103 are separate modules that may be transported separately and in some cases used separately. However, in at least some commercial embodiments it is anticipated that they would be used together regularly, and they are presented that way herein.

The transformer/switchgear module 102 and the workroom module 103 are each housed in a respective purpose-built ISO intermodal shipping container with limited modifications of options, all in the same space footprint as a conventional ISO intermodal shipping container. In at least one contemplated commercial embodiment, the shipping container footprint is that of a "hi-cube" unit that is eight feet wide, 20 feet long, and 9-foot-6-inches tall; however, other conventional shipping container footprint sizes may additionally or alternatively be utilized. In this regard, however, it is preferred that the height be selected to match that of the other module types, and, to a lesser degree, it is preferred that the length be selected to match that of the other module types, and particularly that of the gen-set modules 101.

The container includes a top left side rail 232, a bottom left side rail 230, a top right side rail 233, a bottom right side rail 231, a top rear rail 234, a rear sill 235, a rear left post 236, a rear right post 237, a top front rail 245, a front sill 246, a front left post 247, and a front right post 248. A plurality of walls are supported by the rails, sills, and posts to form a housing; portions or the entirety of each such wall preferably utilize conventional corrugated steel construction, like that of conventional intermodal shipping containers. Conventional (ISO where applicable) corner castings, preferably including both upper and lower corner castings 241,242, are provided to enable the modules 102,103 to be carried, and preferably stacked, like conventional shipping containers. The modules 102,103 may thus be hauled by rail, tractor-trailer, ship, and any other conventional mode of shipping container transport. Side attachment fittings 243 are also provided to enable the modules 102,103 to be securely attached to one another and to other modules placed in side-by-side abutment therewith. Preferably, the side attachment fittings 243 are connected to the conventional corner castings 241,242. In at least some embodiments, a corner casting 241,242 of one module 102,103 can be attached to a corresponding corner casting 241,242 on the adjacent module via a single side attachment fitting 243. In at least some of these embodiments, the side attachment fittings 243 are provided on the four fixtures 241,242 on one side of each module 102,103, and the side that is selected is the same for every module such that a proper set of side attachment fittings is always available for side-to-side attachment of adjacent modules.

One or more intake vent, preferably covered by louvers 314, is preferably provided in one or both of the modules 102,103 and provides fresh air to the workroom module 103 and transformer/switchgear module 102, and one or more ventilation fan and discharge vent 313 is preferably provided in one or both of the modules 102,103. The vents may be relatively small compared to the louvered openings in the gen-set module 101 because the air intake/exhaust and cooling needs of the modules 102,103 are much lower than those of the gen-set module 101. User access to the interior of the modules 102,103 is generally provided via a primary access door 310, a gen-set access door 311, and an emergency egress door 312, each of which is illustrated in its open position in FIGS. 3A-3F. In at least some embodiments, the rear of each of the modules 102,103 may also include doors 316 that provide access and allow the transformer and/or other electrical gear to be removed for upgrade or replacement. Notably, the doors 316 are shown as being standard ISO intermodal shipping container doors. While each module type is purpose built, it is acknowledged that the doors 316 for the transformer/switchgear module 102 and the workroom module 103 do not require any special fittings and standard shipping container doors are likely the most cost-effective choice.

Figure 3A:
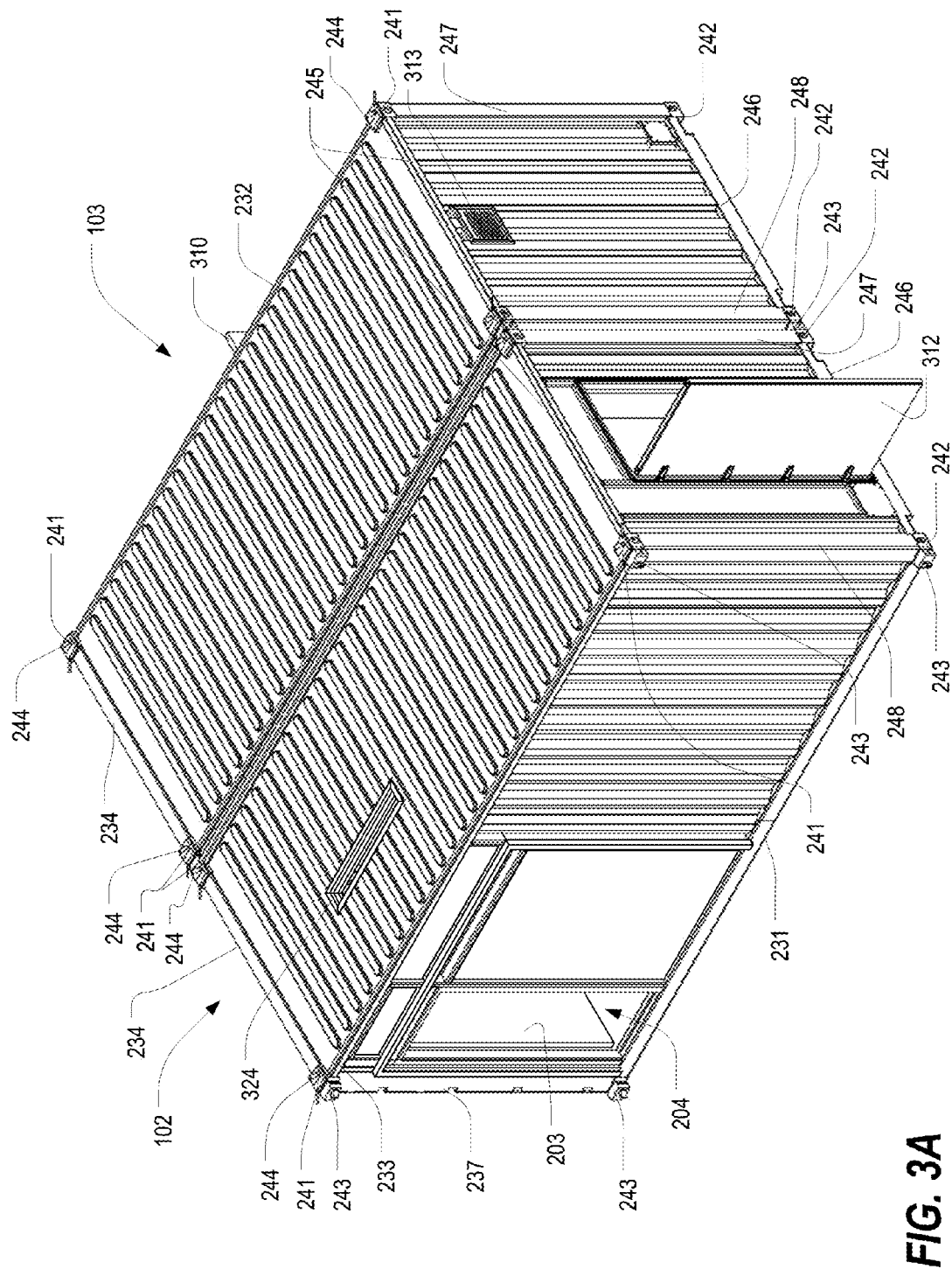
FIG. 3A is an isometric view of the transformer/switchgear module and the workroom module of FIG. 1.
Figure 3B:
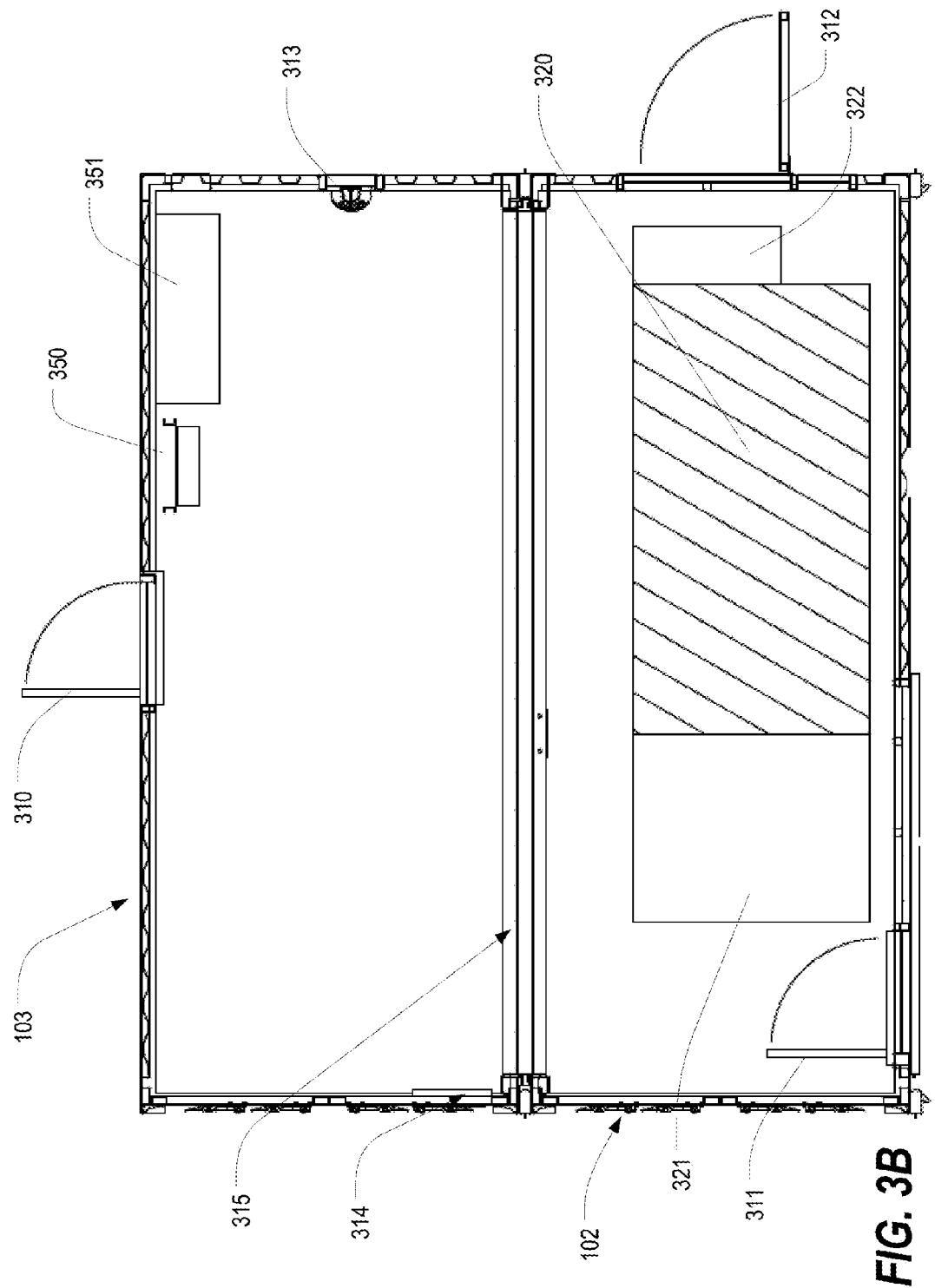
FIG. 3B is a top cross-sectional view of the transformer/switchgear module and the workroom module of FIG. 3A, taken along line 3B-3B of FIG. 3D.
Figure 3C:
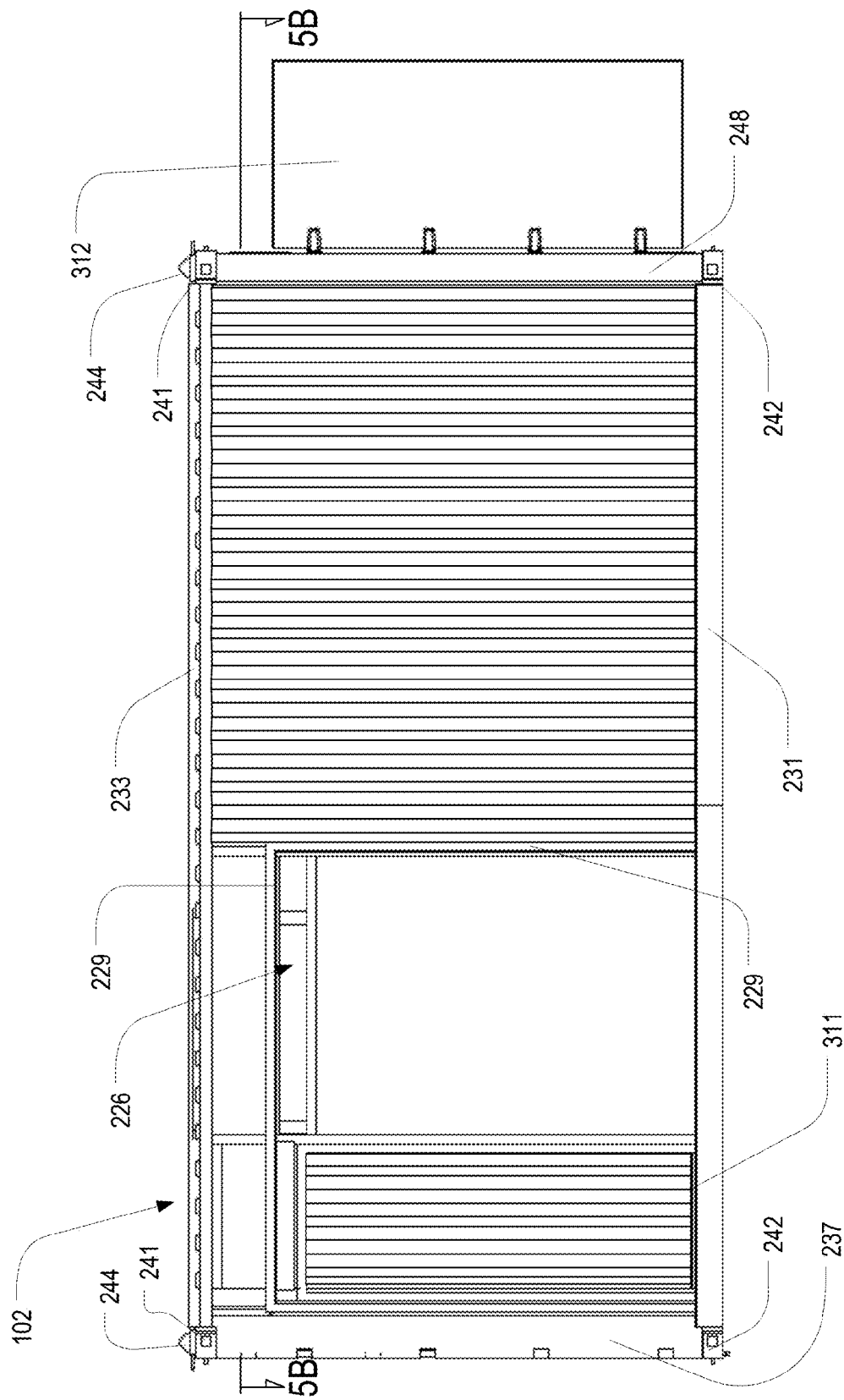
FIG. 3C is a right side view of the transformer/switchgear module and the workroom module of FIG. 3A.
Figure 3D:
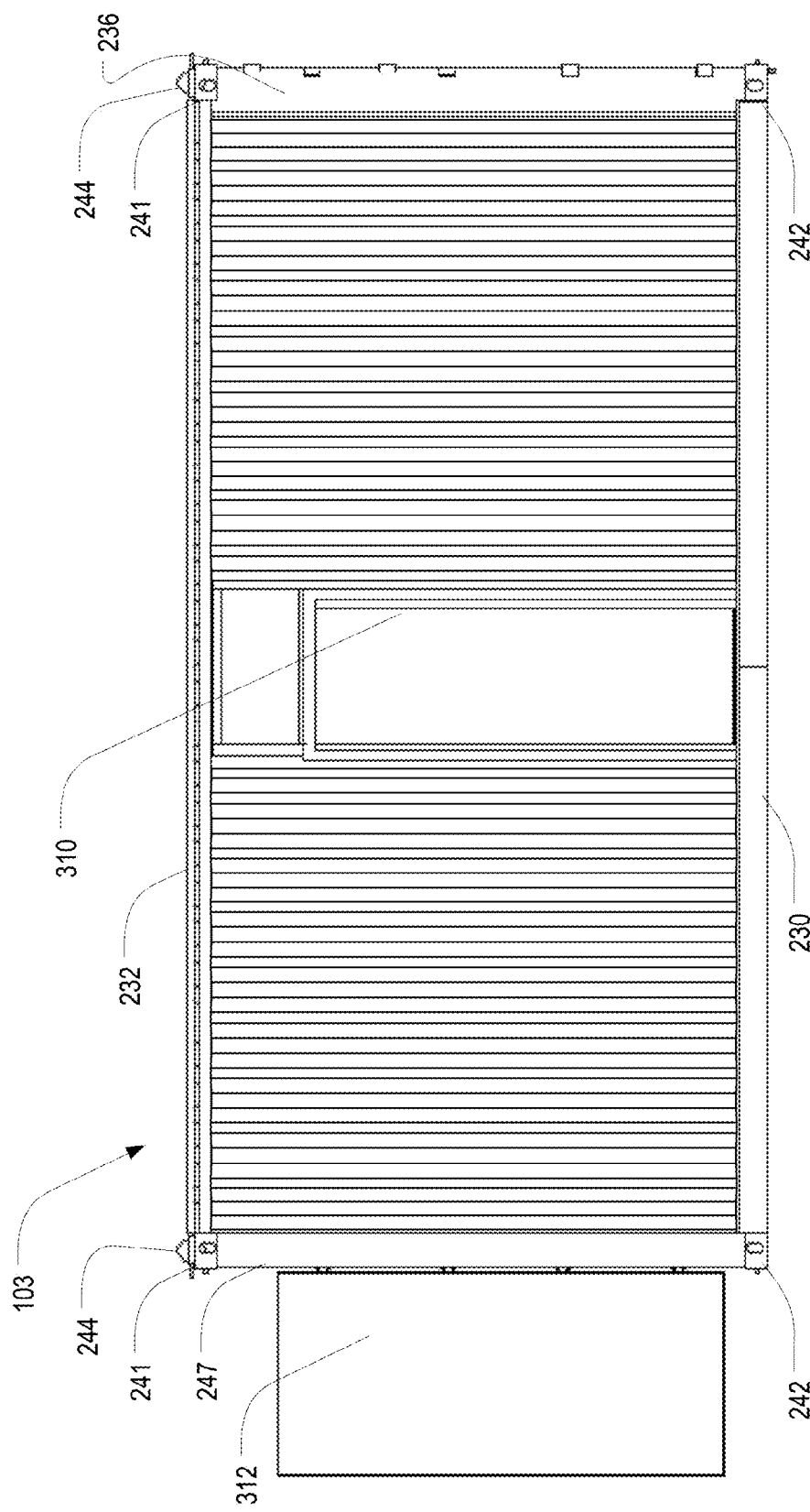
FIG. 3D is a left side view of the transformer/switchgear module and the workroom module of FIG. 3A.
Figure 3E:
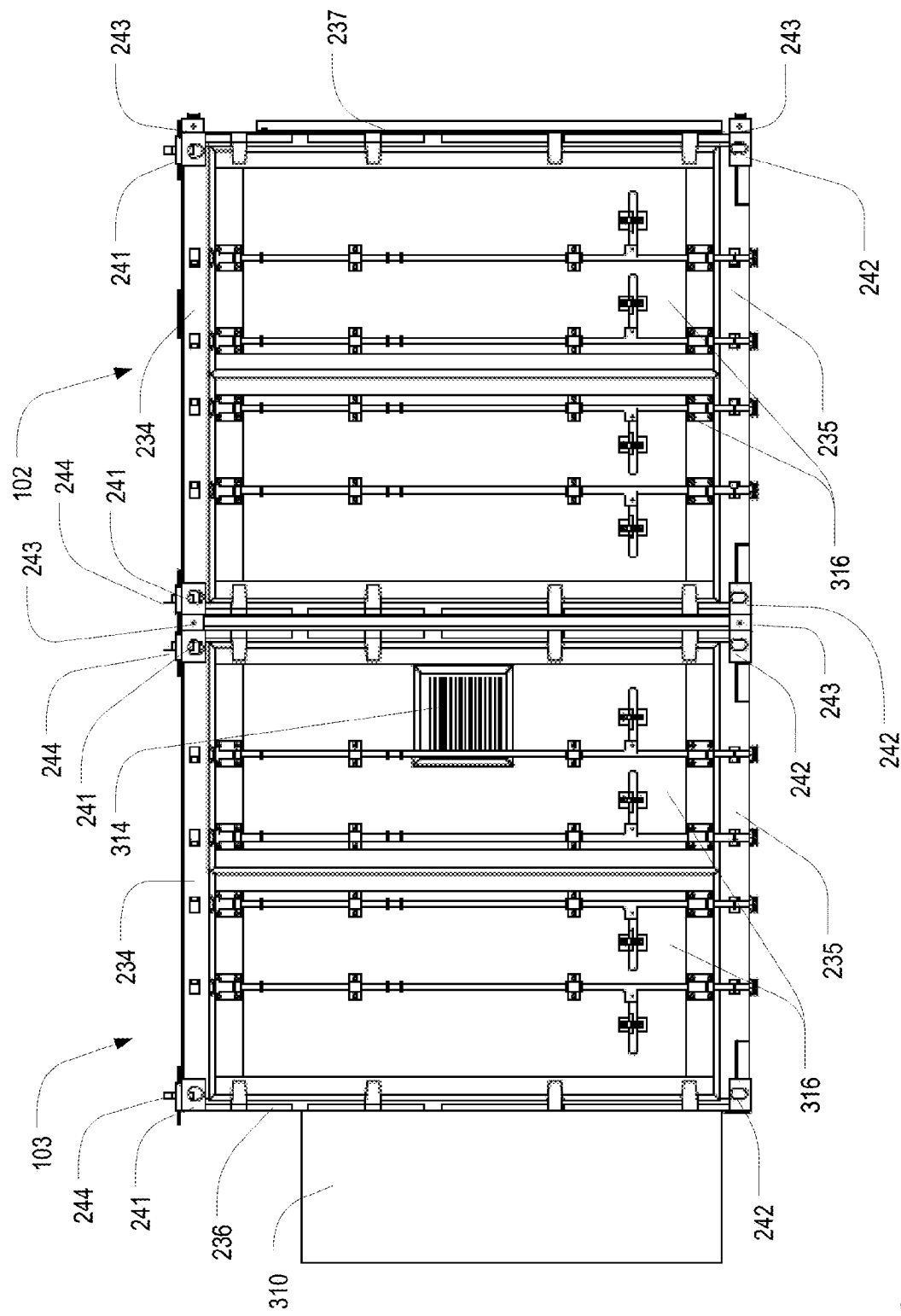
FIG. 3E is a rear view of the transformer/switchgear module and the workroom module of FIG. 3A.
Figure 3F:
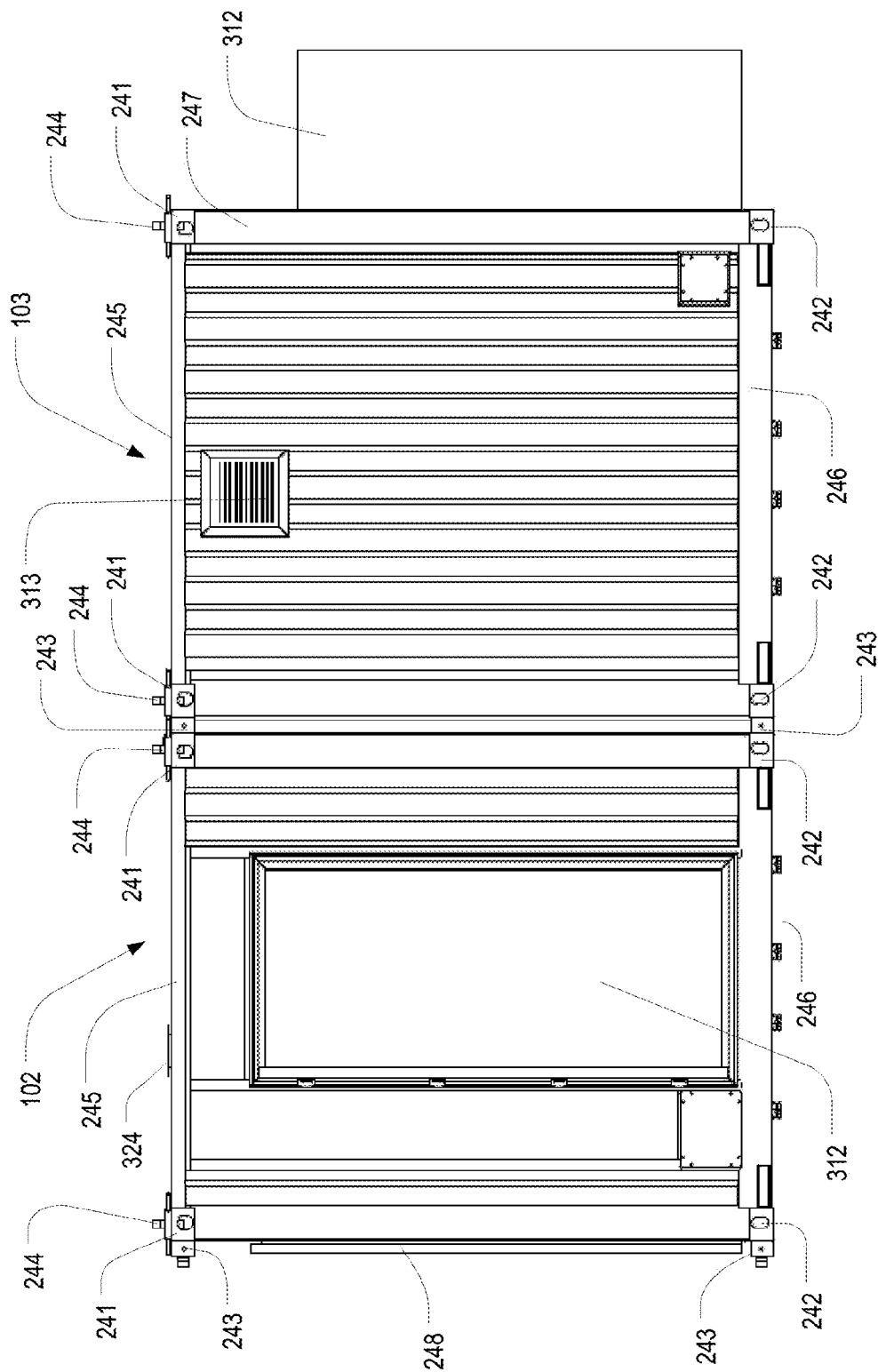
FIG. 3F is a front view of the transformer/switchgear module and the workroom module of FIG. 3A.

As perhaps best shown in the top cross-sectional view of FIG. 3B, the transformer/switchgear module 102 primarily houses a transformer 320, input tie gear or switchgear 321, output switchgear 322, as well as other items needed for the interconnection of each of the gen-sets modules 101 and needed to carry the power output to the end user. In a contemplated commercial embodiment, the transformer 320 is a 3750 kVA transformer, the output switchgear 322 is a high voltage level switchgear and load interrupter such as the HVL/cc product manufactured by Square D. The workroom module 103 is shown abutting the transformer/switchgear module 102 along an interface 315, and may house additional control panels and the like, such as a house power panel 350, a system controller 351 and other gear. In most preferred embodiments, no partition exists along the interface 315 as the open space in the workroom module 103 is generally useful in order to provide additional clearance around the transformer 320.

The switchgear housed in the transformer/switchgear module 102 forms part of a control system that is arranged in communication with each of the gen-set modules 101. Other parts of such control system may likewise be housed in the transformer/switchgear module 102, although in some embodiments, some elements of the control system may be housed elsewhere, particularly including the workroom module 103. Also, controls for the individual generators 200 are typically included in each respective gen-set module 101. Typically, the control system coordinates the generators 200 as a unit and controls the loading of each of the generators 200 in response to a power load demand.

Although power generation facilities typically require the use of transformers to provide a desired voltage level, it is anticipated that in at least some modular power generation facilities, the transformers are provided separately or are already available on site. In many such facilities, however, it is still necessary to provide the necessary controls and switchgear to interconnect the modular gen-sets with the transformers. In this regard, FIGS. 4A-4F are an isometric view, a top cross-sectional view, a right side view, a left side view, a rear view, and a front view of a switchgear/workroom module 112 of FIG. 1. The switchgear/workroom module 112 includes switchgear, controls, and work space housed in a purpose-built ISO intermodal shipping container with limited modifications of options, all in the same space footprint as a conventional ISO intermodal shipping container. In at least one contemplated commercial embodiment, the shipping container footprint is that of a "hi-cube" unit that is eight feet wide, 20 feet long, and 9-foot-6-inches tall; however, other conventional shipping container footprint sizes may additionally or alternatively be utilized. In this regard, however, it is preferred that the height be selected to match that of the other module types, and, to a lesser degree, it is preferred that the length be selected to match that of the other module types, and particularly that of the gen-set modules 101.

The container includes a top left side rail 232, a bottom left side rail 230, a top right side rail 233, a bottom right side rail 231, a top rear rail 234, a rear sill 235, a rear left post 236, a rear right post 237, a top front rail 245, a front sill 246, a front left post 247, and a front right post 248. A plurality of walls are supported by the rails, sills, and posts to form a housing; portions or the entirety of each such wall preferably utilize conventional corrugated steel construction, like that of conventional intermodal shipping containers. Conventional (ISO where applicable) corner castings, preferably including both upper and lower corner castings 241,242, are provided to enable the module 112 to be carried, and preferably stacked, like conventional shipping containers. The module 112 may thus be hauled by rail, tractor-trailer, ship, and any other conventional mode of shipping container transport. Side attachment fittings 243 are also provided to enable the modules 102,103 to be securely attached to one another and to other modules placed in side-by-side abutment therewith. Preferably, the side attachment fittings 243 are connected to the conventional corner castings 241,242. In at least some embodiments, a corner casting 241,242 of one module 102,103 can be attached to a corresponding corner casting 241,242 on the adjacent module via a single side attachment fitting 243. In at least some of these embodiments, the side attachment fittings 243 are provided on the four fixtures 241,242 on one side of the module 112, and the side that is selected is the same for every module such that a proper set of side attachment fittings is always available for side-to-side attachment of adjacent modules.

One or more intake vents (not shown), preferably covered by louvers, may be provided in the module 112 to provide fresh air to the interior of the module 112, and one or more ventilation fans and discharge vents (not shown) may also be provided. The vents may be relatively small compared to the louvered openings in the gen-set module 101 because the air intake/exhaust and cooling needs of the module 112 are much lower than those of the gen-set module 101. User access to the interior of the module 112 is generally provided via a primary access door 310, a gen-set access door 311, and an emergency egress door 312, each of which is illustrated in its open position in FIGS. 4A-4F. In at least some embodiments, the rear of the module 112 may also include doors 316 that provide access and allow the various electrical gear inside to be removed for upgrade or replacement. Notably, the doors 316 are shown as being standard ISO intermodal shipping container doors. While each module type is purpose built, it is acknowledged that the doors 316 for the switchgear/workroom module 112 do not require any special fittings and standard shipping container doors are likely the most cost-effective choice.

Figure 4A:
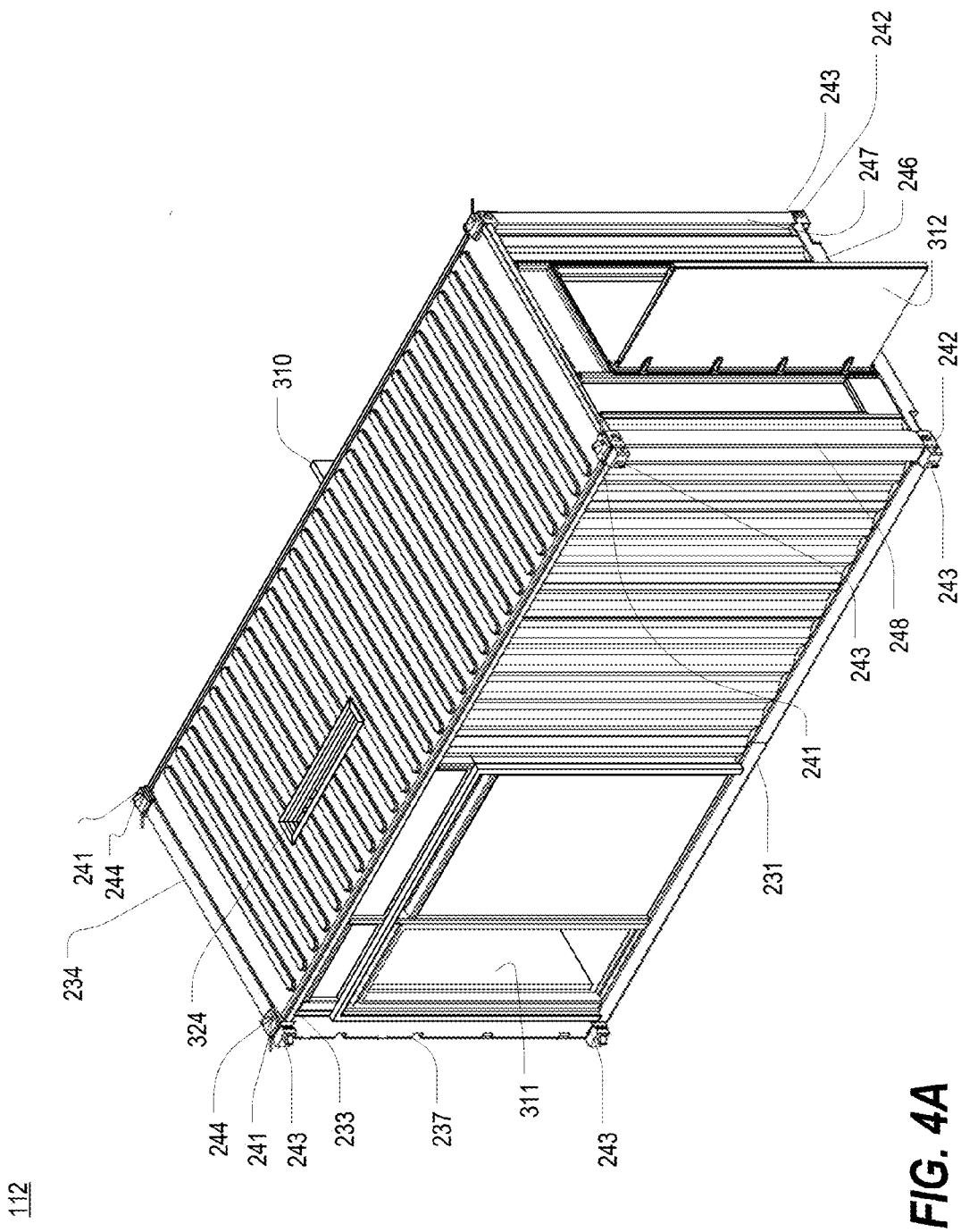
FIG. 4A is an isometric view of a switchgear/workroom module of FIG. 1.
Figure 4B:
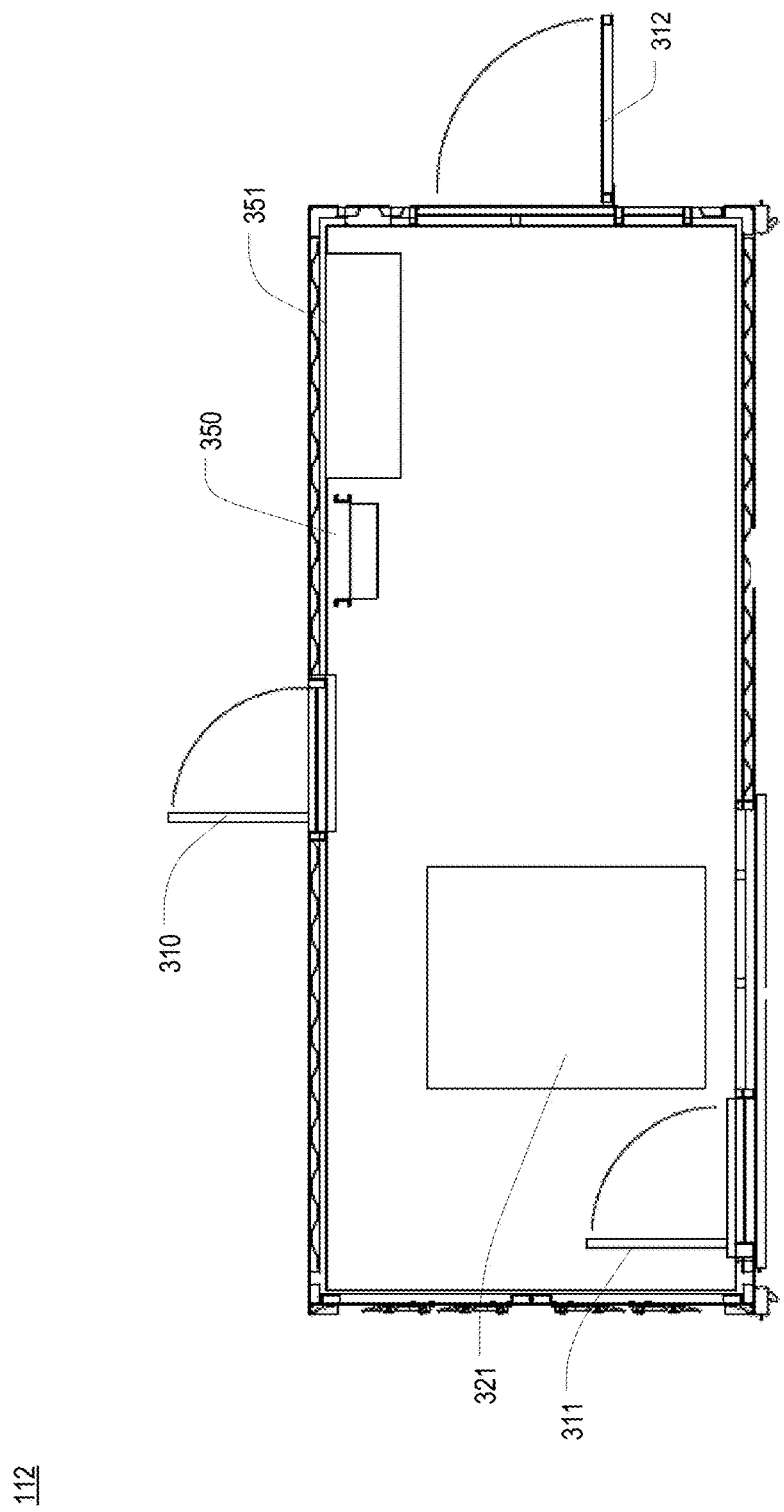
FIG. 4B is a top cross-sectional view of a switchgear/workroom module of FIG. 4A.
Figure 4C:
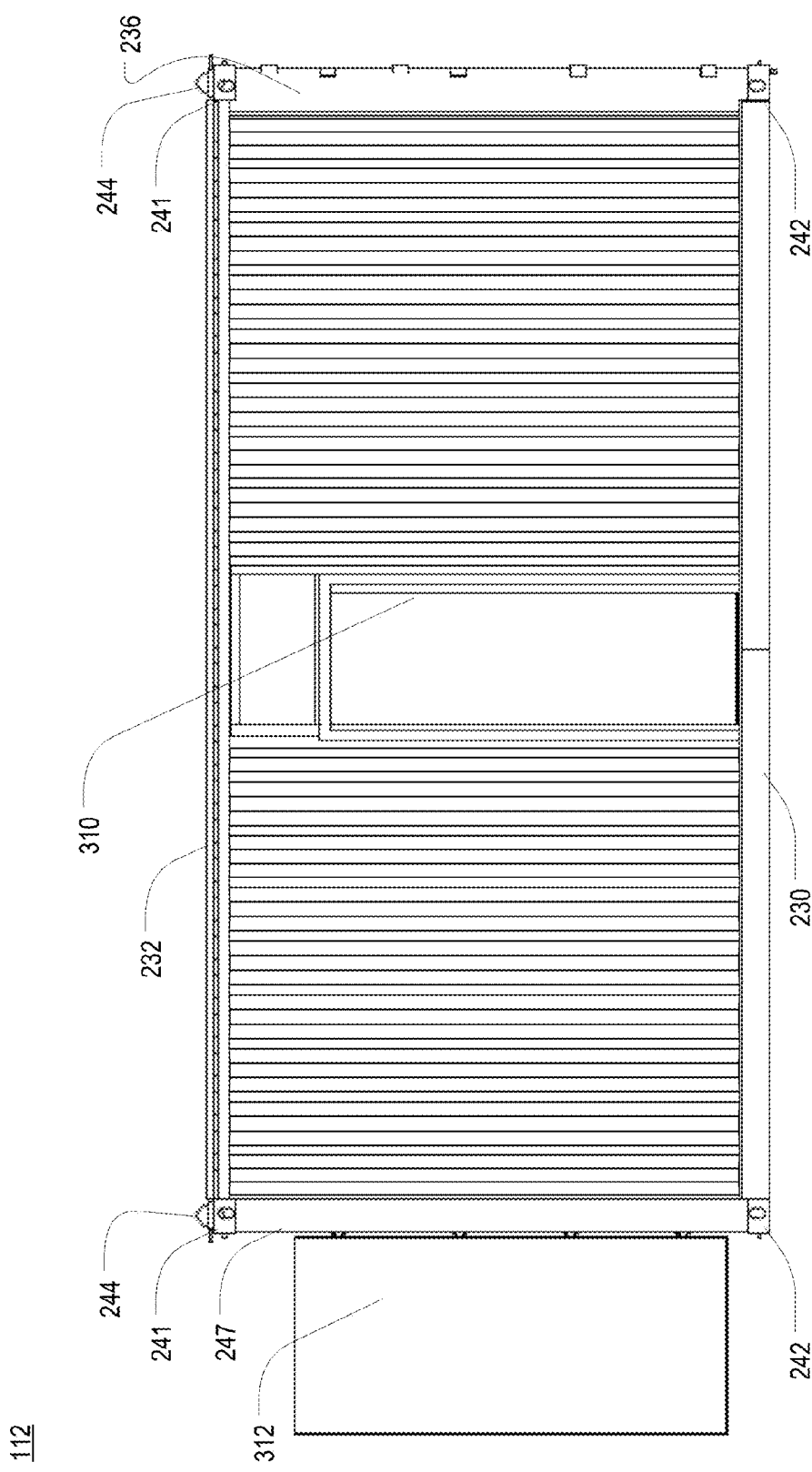
FIG. 4C is a right side view of the switchgear/workroom module of FIG. 4A.
Figure 4D:
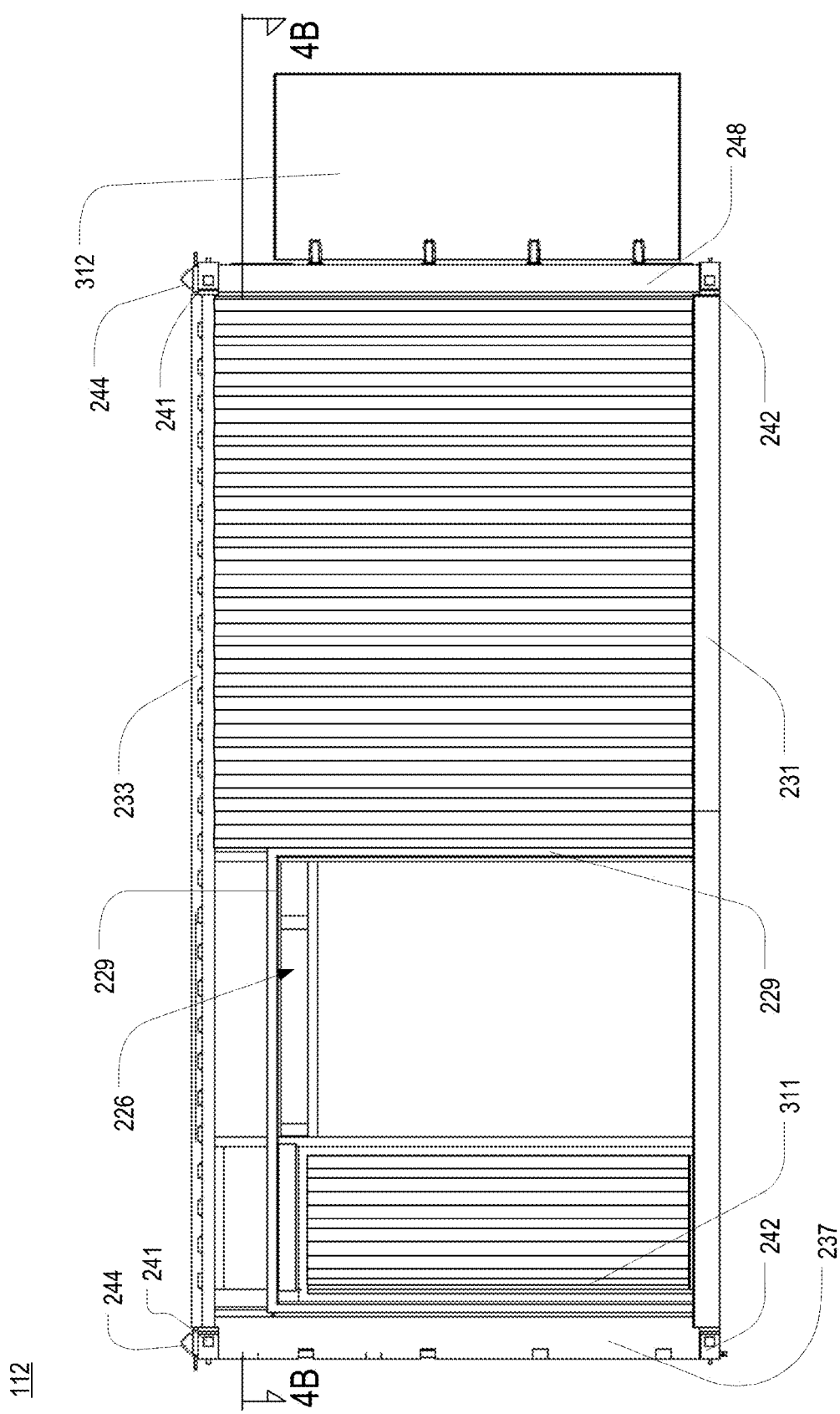
FIG. 4D is a left side view of the switchgear/workroom module of FIG. 4A.
Figure 4E:
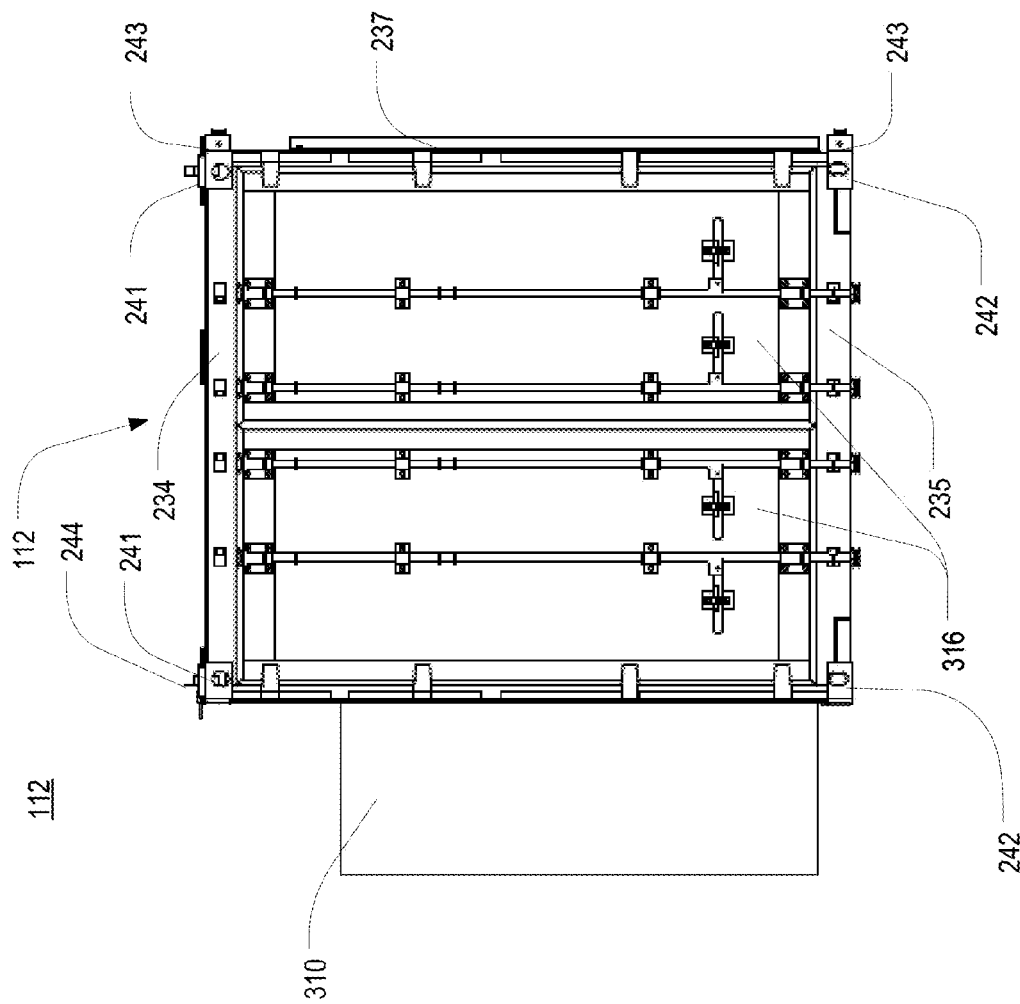
FIG. 4E is a rear view of the switchgear/workroom module of FIG. 4A.
Figure 4F:
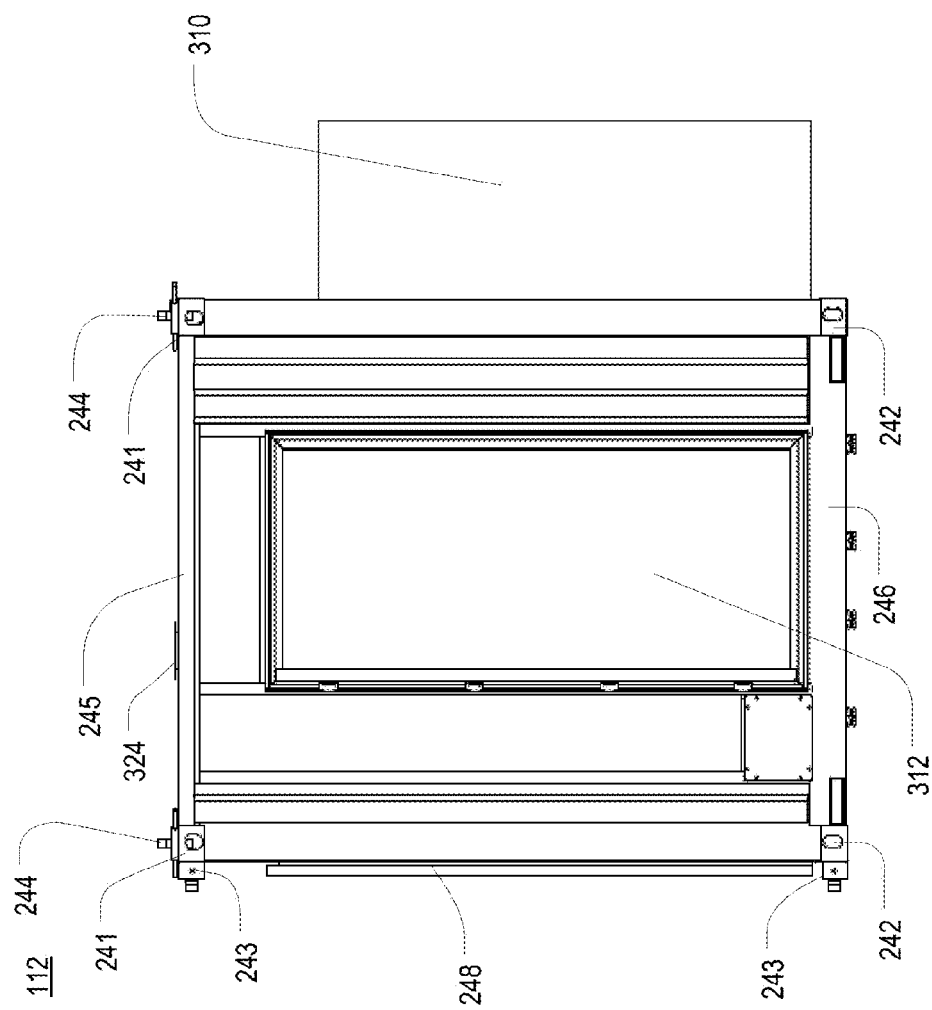
FIG. 4F is a front view of the switchgear/workroom module of FIG. 4A.
Figure 5A:
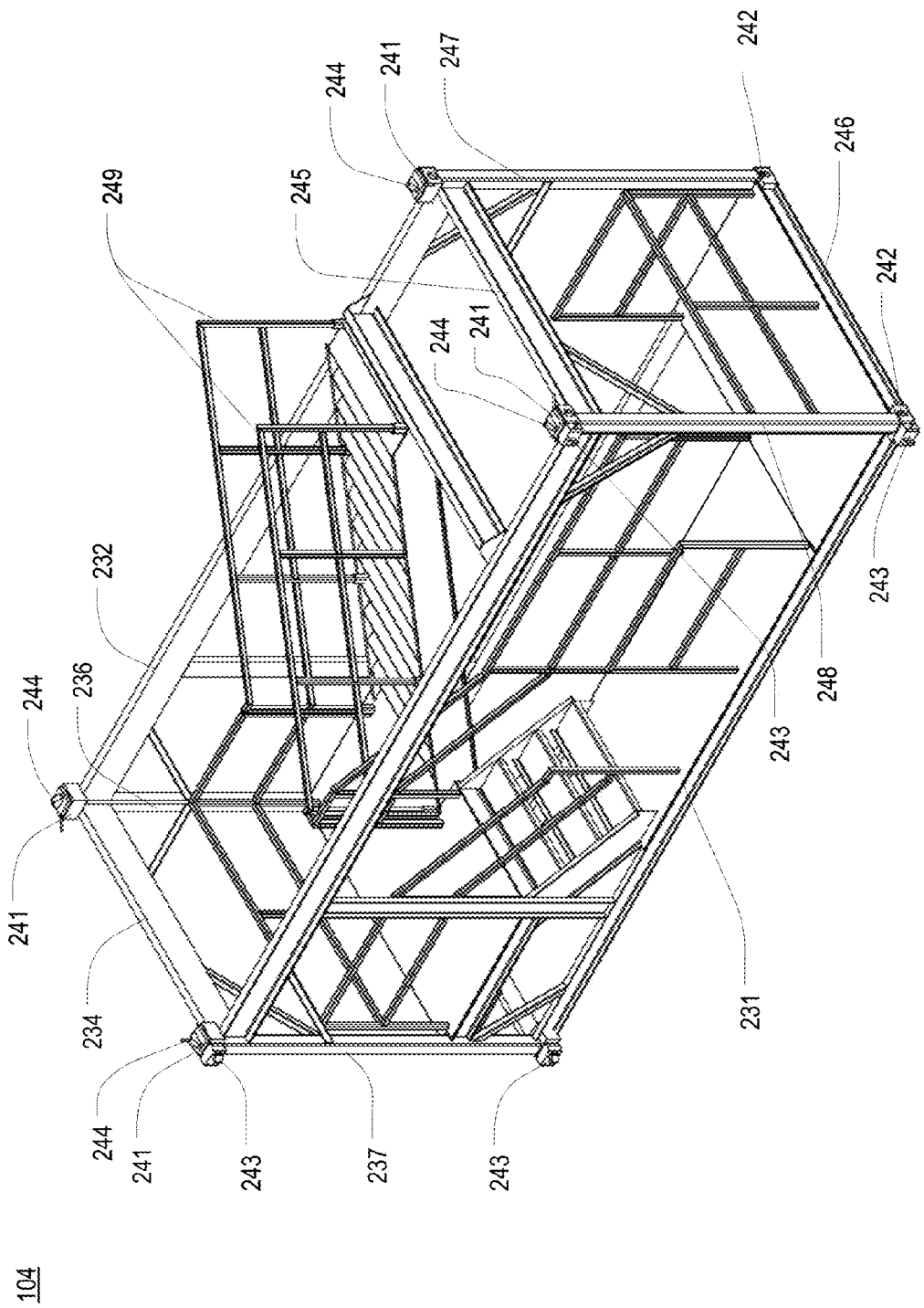
FIG. 5A is an isometric view of the staircase module of FIG. 1.
Figure 5B:
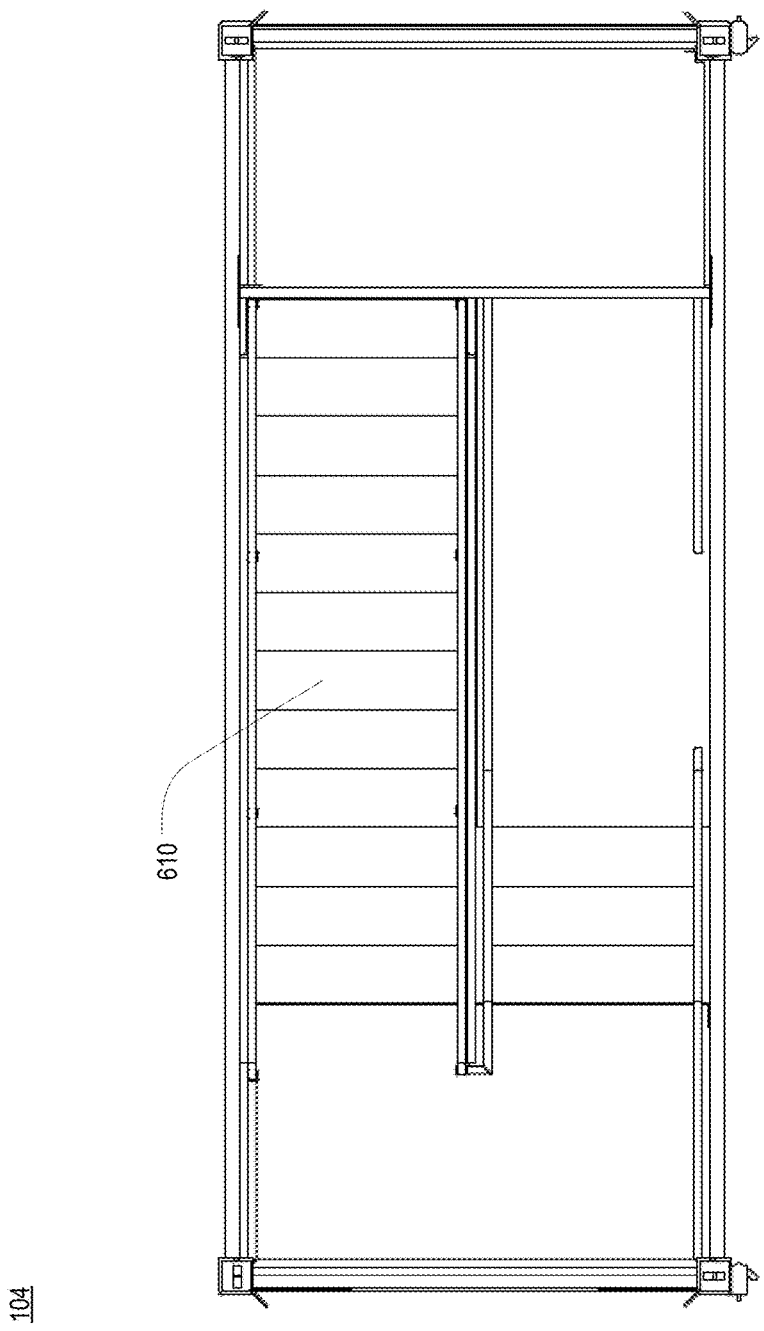
FIG. 5B is a top view of the staircase module of FIG. 5A.
Figure 5C:
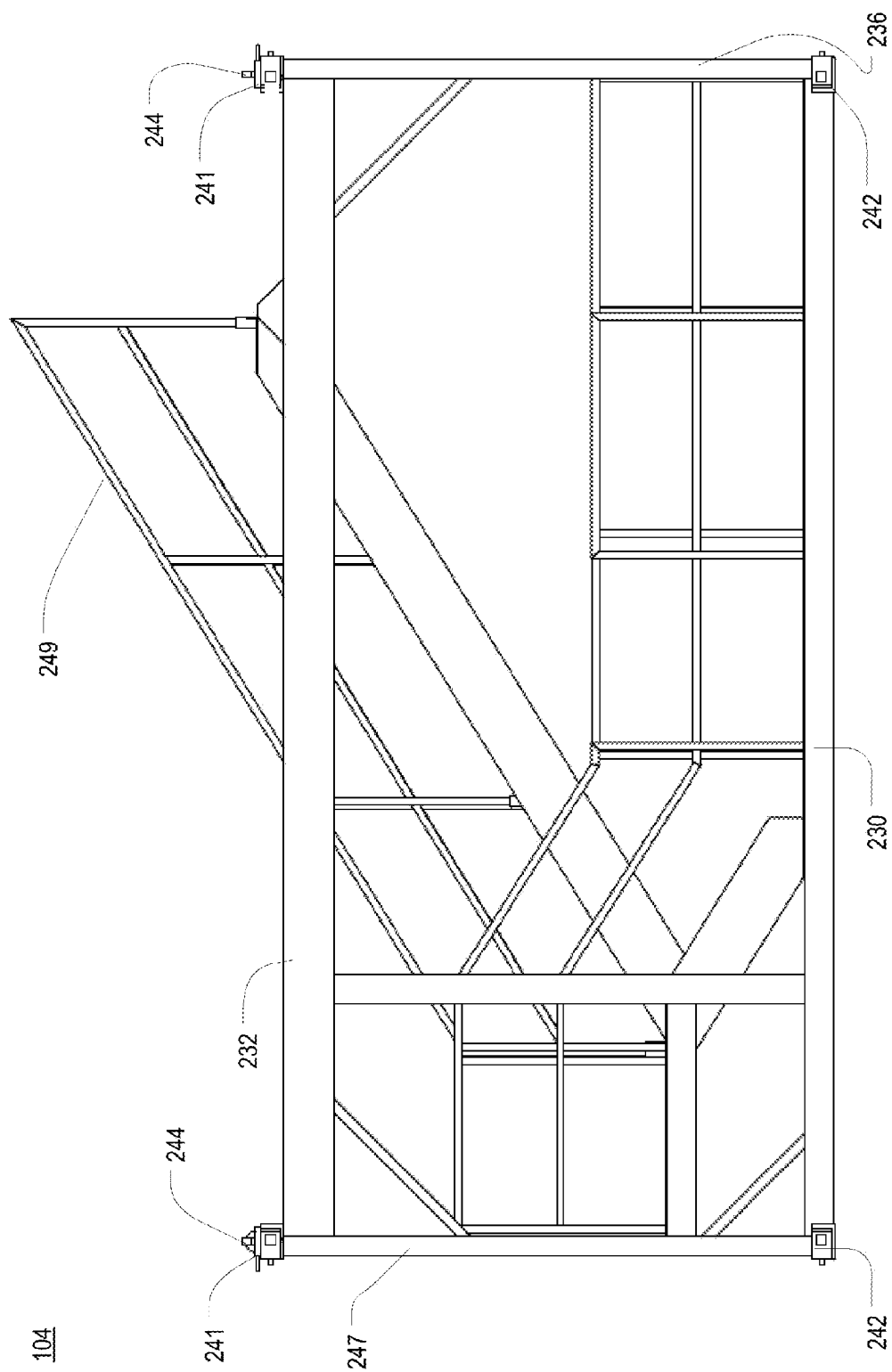
FIG. 5C is a left side view of the staircase module of FIG. 5A.
Figure 5D:
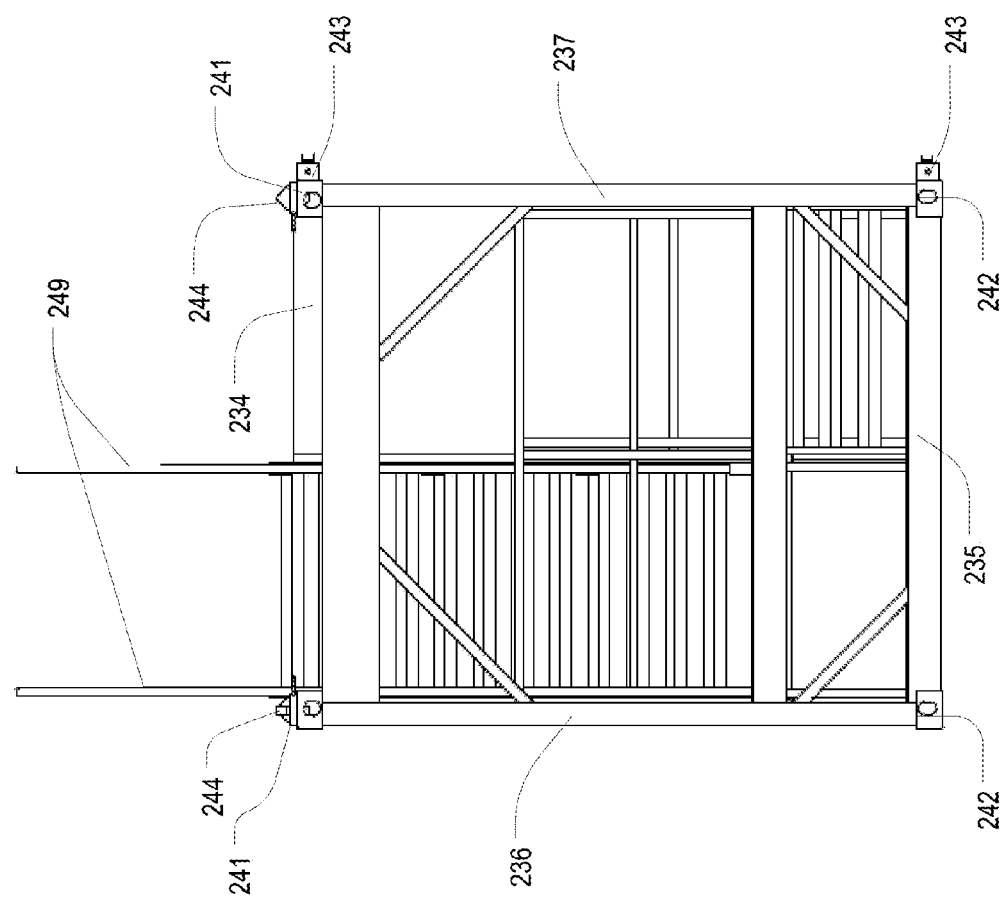
FIG. 5D is a rear view of the staircase module of FIG. 5A.
Figure 5E:
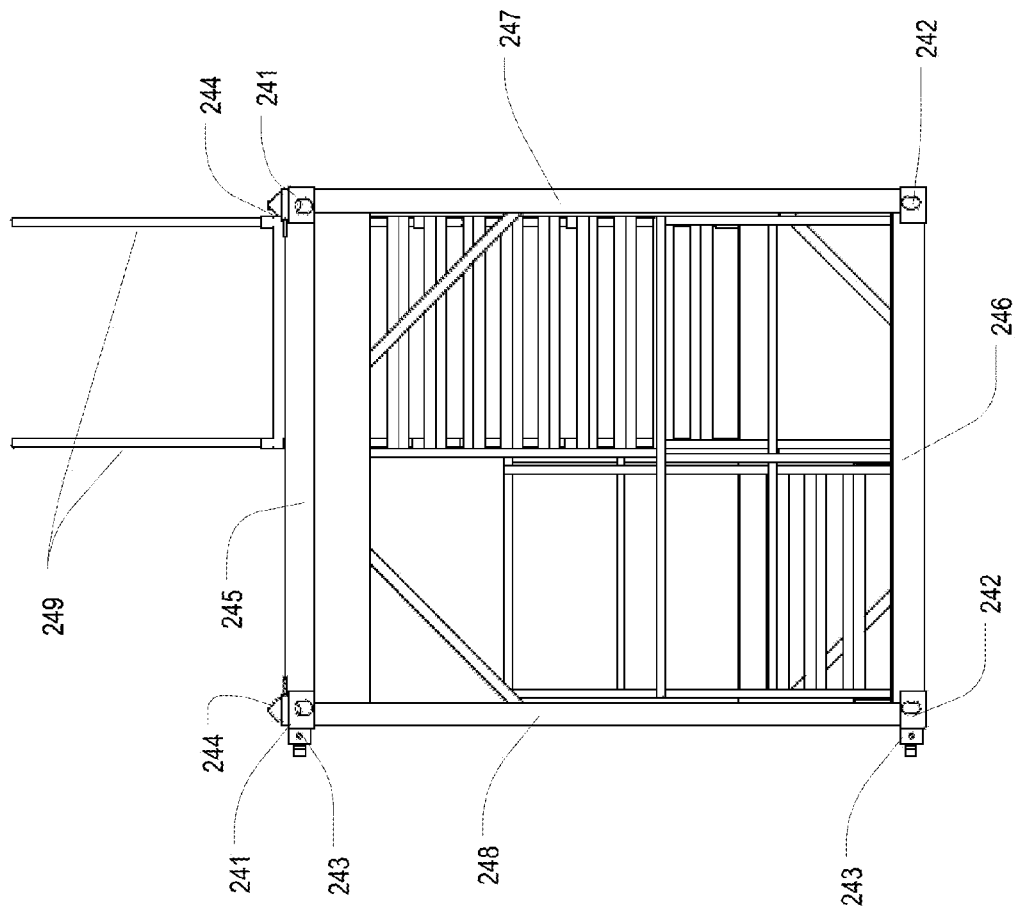
FIG. 5E is a front view of the staircase module of FIG. 5A.

As perhaps best shown in the top cross-sectional view of FIG. 4B, the switchgear/workroom module 112 primarily houses input tie gear or switchgear 321, a house power panel 350, a system controller 351, and other items needed for the interconnection of each of the gen-sets modules 101, the delivery of the power output to a transformer or end user, and at least some of the controls for these functions.

The switchgear 321 housed in the switchgear/workroom module 112 forms part of a control system that is arranged in communication with each of the gen-set modules 101. Other parts of such control system may likewise be housed in the switchgear/workroom module 112, although in some embodiments, some elements of the control system may be housed elsewhere, and controls for the individual generators 200 are typically included in each respective gen-set module 101. Typically, the control system coordinates the generators 200 as a unit and controls the loading of each of the generators 200 in response to a power load demand.

In some embodiments, the switchgear may include a microprocessor controller to operate multiple paralleling of the generators 200, a drawout circuit breaker, and closeable doors. Generally, the controller is in electrical communication with the gen-set modules 101 and controls the output and load scheme of each of the generators 200. For example, the controller may control each generator's power output in response to either a predetermined or failure event power load demand. The controller may include an inherently built-in safety feature, wherein if one generator 200 fails, or is otherwise bypassed, the remaining generators 200 will continue to operate. For example purposes only, a 3.0 MW (five 600 kW generators arranged in parallel) that loses one generator 200 will still have the ability to produce 2.4 MW with the four remaining generators 200.

In particular embodiments, the controller provides control and protection for a prime mover by allowing full control of a starter and fuel flow throughout various applications. Further, in the event that one of the engine-generators 200 is set up for control over, or via, a suitable protocol, the microprocessor controller may be able to not only send commands to the generators 200 for starting, stopping and throttle control, but is also able to receive data back from the generators 200 and display the information on a display for the user. Programmable inputs in a generator control compartment also provide protection from generator failures by allowing the user to monitor an analog and/or digital signal generated by the controller. The control compartment may also be used to optimize the generator output and controlling the paralleling of the generators 200 with the utility grid.

In particular embodiments, the switchgear and controller are used to place a modular power generation facility, created from the gen-set module 101 and other modules as described elsewhere herein, in parallel with a utility grid by synchronizing a generator signal to the bus and synchronizing a mains signal to the bus. The paralleling operation may provide protection, metering, control and switching elements in a master control compartment, the generator control compartment and/or a utility control compartment to manage the load scheme(s) of the block of generators 200 for parallel integration with the utility grid. For example, the controller and parallel switchgear may match the frequency, voltage, phase angle, and phase rotation of each generator 200 in the modular power generation facility.

The controller preferably meets or exceeds the IEEE 1547 Specification interconnect requirements. In at least some embodiments, the microprocessor controller initiates a generator start command from a utility, or central control command, to start and synchronize the generators 200 together. Further, the controller may synchronize the block of generators 200 to the utility grid. In some embodiments the controller can have all generators up to full power in less than 60 seconds, and preferably in ten to thirty seconds, from the time the command is initiated. Such a capability is particularly helpful in utility grids under stress to quickly and efficiently respond to a power failure event or power demand change. Further, a modular power generation facility may create power with the generators 200 and feed the power directly into the utility grid.

In particular embodiments, the user may adjust the acceptable phase window and voltage delta necessary for control of a particular application. For illustrative purposes only, the controller may incorporate phase matching or slip frequency techniques during the synchronization of the generator signal and/or the mains signal. Further, the controller may incorporate dead bus paralleling and full breaker/contactor control. In some embodiments, the drawout breaker may include a generator breaker used to tie the generator bus to the utility bus. The drawout breaker may also include a utility breaker that connects the modular power generation facility to the utility grid. A main breaker may be used to tie the generator bus to the utility bus. In some embodiments, the drawout breaker may further include a distribution breaker to directly feed loads and transfer switches for parallel operation with the utility grid.

The microprocessor controller provides loading of the generators 200 and precise output control, for example kw/var output control, to provide optimal control over the modular power generation facility based on preset values. For instance, the controller may determine individual generator power factor control. Further, the loading and output control may be fully programmable to allow remote access. In this particular embodiment, a remote access terminal can automatically curtail less important building loads in the event of a generator's failure during the loss of utility power. For example, if the failure rate of the individual generators 200 is about 2%, then the reliability of the modular power generation facility to important loads is about 99.96%, without the cost of adding redundant generators.

Although not illustrated in FIGS. 3A-3F or FIGS. 4A-4F, one or more overhead cable trays may be used to carry power output, control signal cables, and/or the like (not shown) within the module 102,103,112, including, for example, the interconnect cables from the circuit breaker/switchgear panel 208 and communications (comms) box 218 in the gen-set modules 101 as well as the power output cables from the gen-set modules 101. In at least some embodiments, the cables are provided as part of a pre-defined power cable and control wire harnesses that are pre-manufactured, pre-installed, and factory verified prior to shipment. A cable slot 226 is preferably arranged in the side wall of the transformer/switchgear module 102 or switchgear/workroom module 112 to provide entry and exit of the cables to/from the module 102,112. As described further elsewhere herein, the cables may be passed through the cable trays of adjacent modules, particularly including the gen-set modules 101 on the same level as the transformer/switchgear module 102 or switchgear/workroom module 112, until the cables can be terminated at the equipment located in the transformer/switchgear module 102, workroom module 103, or switchgear/workroom module 112. Additionally, vertical cable chases 324 may be provided to enable interconnect between a transformer/switchgear module 102 or switchgear/workroom module 112 and the module above and/or below it. Also, in alternate embodiments (not shown), interconnect cables that are integral to each transformer/switchgear module 102 or switchgear/workroom module 112 can be arranged such that they are terminated in modular connections that can be made by plugs mounted to the exterior walls of the transformer/switchgear module 102 or switchgear/workroom module 112.

The gen-set access door 311 and cable slots 226 of the transformer/switchgear module 102 or switchgear/workroom module 112 are preferably surrounded by a frame that may be coupled to a corresponding frame on an adjacent module to provide environmental protection for the cable connections and the doorways. In the illustrated embodiments, the frame is an outer frame 229 like that of the gen-set modules 101 such that when the module 102,112 is placed in side-to-side abutment with another module, the inner frame 228 of the other module fits within the outer frame 229 of the transformer/switchgear module 102 or switchgear/workroom module 112 to surround and protect the inter-module doorway and cable passages. In other embodiments (not shown), the frames on opposing sides may be identical but arranged to couple with each other in a manner providing similar protection.

FIGS. 5A-5E are an isometric view, a top view, a left side view, a rear view, and a front view of the staircase module 104 of FIG. 1. The staircase module 104 is utilized to provide access to upper levels of a power generation facility as further described elsewhere herein. Although there are no wall panels shown in FIGS. 5A-5E, the staircase module 104 is constructed according to the same footprint as other ISO intermodal shipping containers. In at least one contemplated commercial embodiment, the shipping container footprint is that of a "hi-cube" unit that is eight feet wide, 20 feet long, and 9-foot-6-inches tall; however, other conventional shipping container footprint sizes may additionally or alternatively be utilized. In this regard, however, it is preferred that the height be selected to match that of the other module types, and, to a lesser degree, it is preferred that the length be selected to match that of the other module types, and particularly that of the gen-set modules 101. In this regard, the relevant height of the staircase module 104 is understood to be defined by the distance from the top of one of the upper corner castings 241 to the bottom of the bottom corner casting 242 directly therebeneath.

The staircase module 104 includes eight rails or beams and four posts similar to standard ISO intermodal shipping containers. Conventional (ISO where applicable) corner castings, preferably including both upper and lower corner castings 241,242, are provided to enable the modules 104 to be carried, and preferably stacked, like conventional shipping containers. The modules 104 may thus be hauled by rail, tractor-trailer, ship, and any other conventional mode of shipping container transport. Side attachment fittings 243 are also provided to enable the module 104 to be securely attached to another module placed in side-by-side abutment therewith. Preferably, the side attachment fittings 243 are connected to the conventional corner castings 241,242. In at least some embodiments, a corner casting 241,242 of one module 104 can be attached to a corresponding corner casting 241,242 on the adjacent module via a single side attachment fitting 243. In at least some of these embodiments, the side attachment fittings 243 are provided on the four fixtures 241,242 on one side of the module 104, and the side that is selected is the same for every module such that a proper set of side attachment fittings is always available for side-to-side attachment of adjacent modules.

The staircase module 104 includes various platforms and flights of stairs to enable a user to climb from one level to the next, as well as safety rails in appropriate locations along both the platforms and the stairs. The platforms and stairs are built off of, and supported by, the beams and posts. In the illustrated embodiment, an additional cross beam is provided to provide additional support to platform sections and the top of the primary flight of stairs, and a pair of additional posts are provided to provide additional support for the other platform and the bottom of the primary flight of stairs, but other arrangements are likewise possible. In at least some embodiments, the staircase module 104 is specifically designed to abut a workroom module 103 and includes an opening in the safety rail such that the opening can be aligned with the primary access door 310 of the module 103 such that personnel may access the workroom module 103 thereby.

Notably, one or more stair sections and corresponding safety rails may extend above the upper corner castings 241, as shown in the illustrations, or even below the lower corner castings 242. For shipping and other purposes, it is preferred that the primary structure including beams and posts, are fully assembled at a manufacturing or other remote location so that the staircase module 104 may be shipped and otherwise handled like a conventional shipping container, and that a relatively limited amount of assembly of superstructure components (like the uppermost safety rails 249 shown in FIGS. 5A-5E) is required at the installation site.

FIGS. 6A-6E are an isometric view, a top cross-sectional view, a side view, a rear view, and a front view of the sound baffle module 120 of FIG. 1. The sound baffle module 120, which may optionally be used with a respective gen-set module 101, to is housed in a purpose-built ISO intermodal shipping container with limited modifications of options, all in the same space footprint as a conventional ISO intermodal shipping container. In at least one contemplated commercial embodiment, the shipping container footprint is that of a "hi-cube" unit that is eight feet wide, 10 feet long, and 9-foot-6-inches tall; however, other conventional shipping container footprint sizes may additionally or alternatively be utilized; however, other conventional shipping container footprint sizes may additionally or alternatively be utilized. In this regard, however, it is preferred that the height be selected to match that of the other module types.

The container includes a top left side rail 532, a bottom left side rail 530, a top right side rail 533, a bottom right side rail 531, a top rear rail 234, a rear sill 235, a rear left post 236, a rear right post 237, a top front rail 245, a front sill 246, a front left post 247, and a front right post 248. A plurality of walls are supported by the rails, sills, and posts to form a housing; portions or the entirety of each such wall preferably utilize conventional corrugated steel construction, like that of conventional intermodal shipping containers. Conventional (ISO where applicable) corner castings, preferably including both upper and lower corner castings 241,242, are provided to enable the modules 120 to be carried, and preferably stacked, like conventional shipping containers. The modules 120 may thus be hauled by rail, tractor-trailer, ship, and any other conventional mode of shipping container transport. Side attachment fittings 243 may be provided to enable the module 120 to be securely attached to another module placed in side-by-side abutment therewith. End attachment fittings (not shown) may also be provided to enable the module 120 to be securely attached to the end of a gen-set module 101. Preferably, the side attachment fittings 243 and end attachment fittings are connected to the conventional corner castings 241,242. In at least some embodiments, a corner casting 241,242 of one module 120 can be attached to a corresponding corner casting 241,242 on the adjacent module via a single side attachment fitting 243.

Figure 6A:
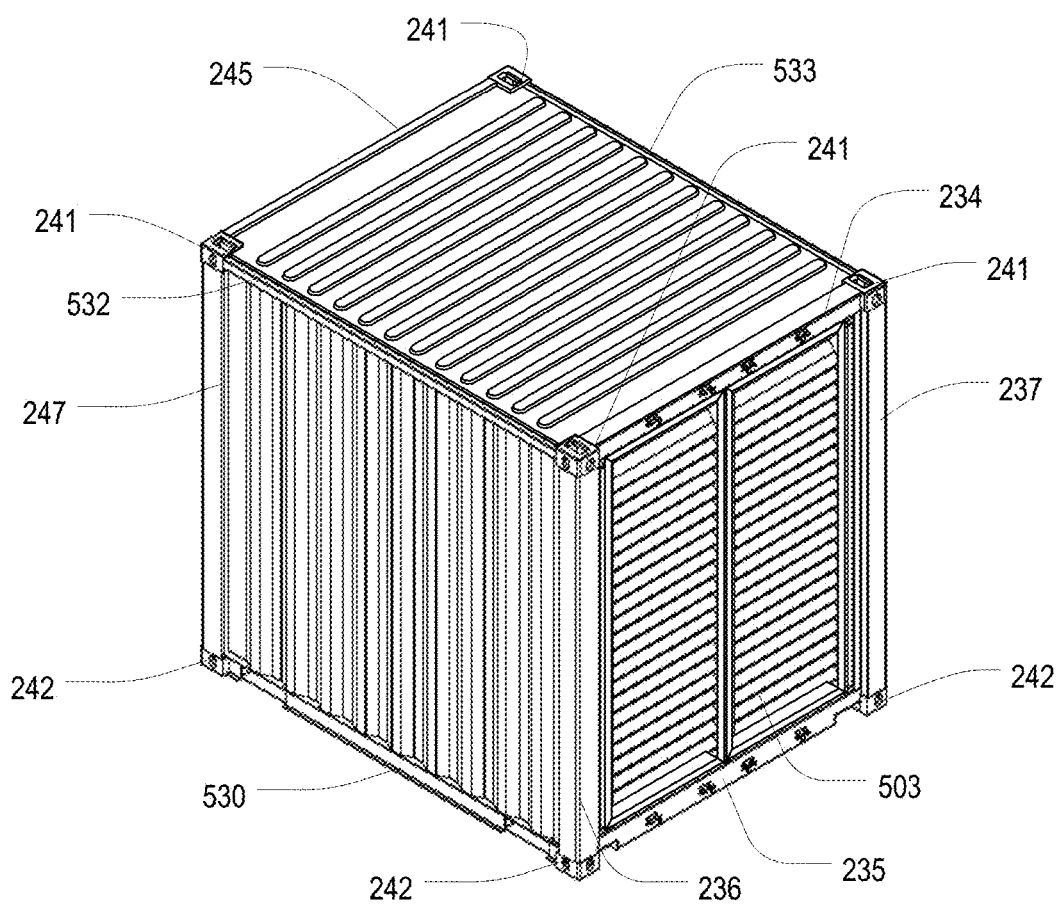
FIG. 6A is an isometric view of the sound baffle module of FIG. 1.
Figure 6B:
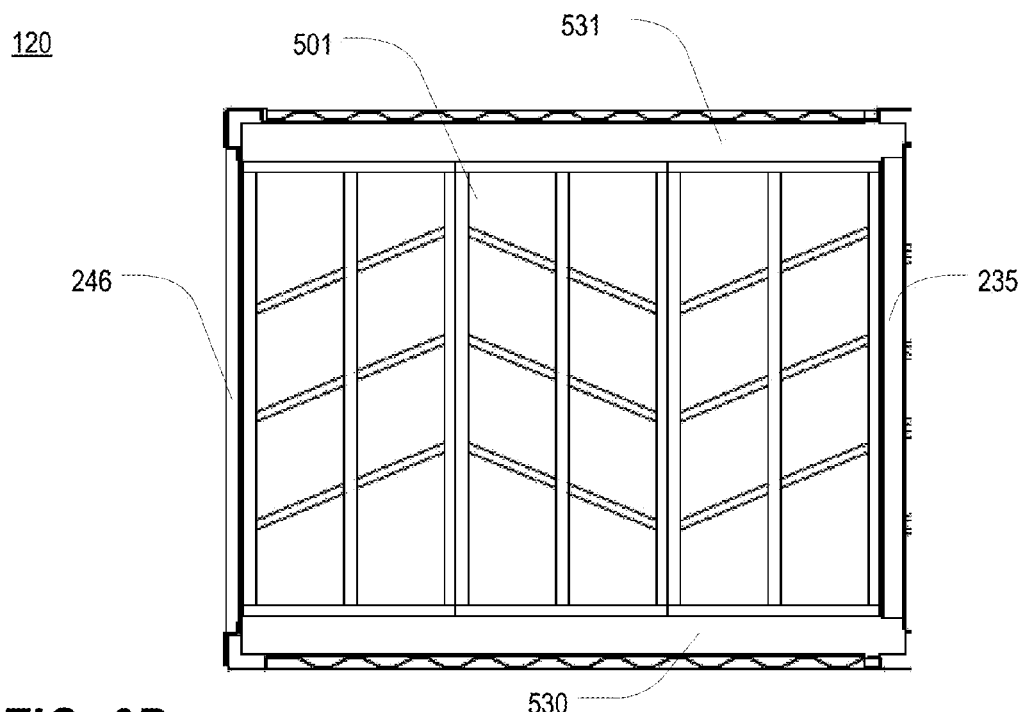
FIG. 6B is a top cross-sectional view of the sound baffle module of FIG. 1, taken along line 6B-6B of FIG. 6C.
Figure 6C:
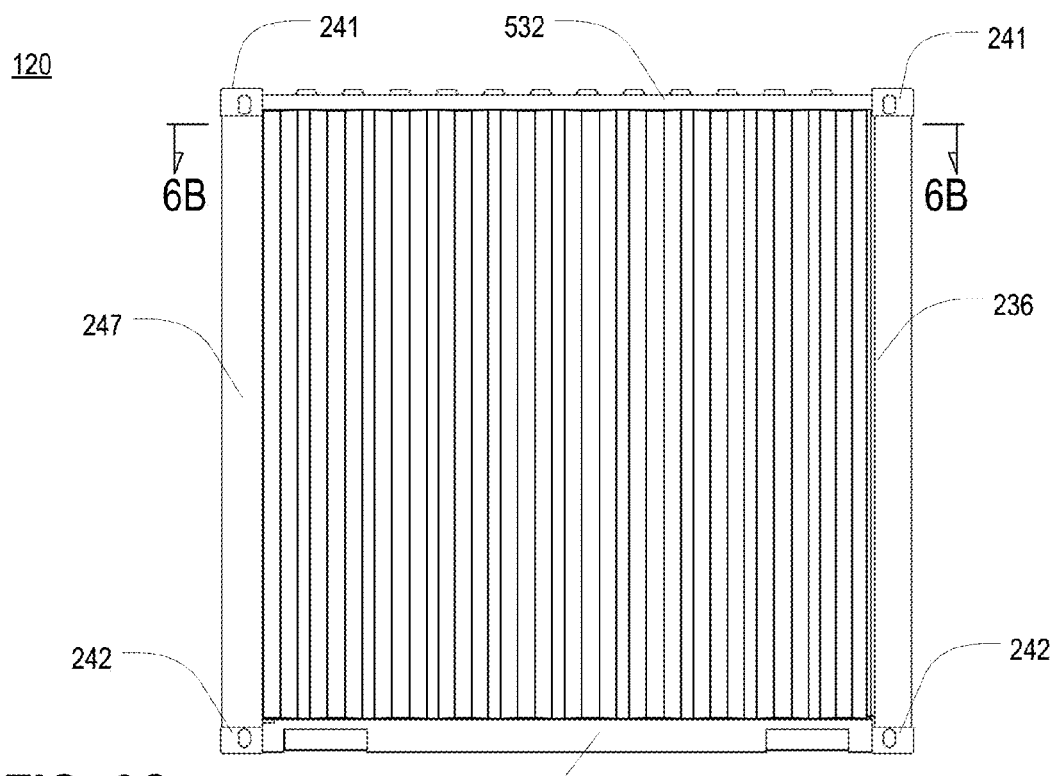
FIG. 6C is a left side view of the sound baffle module of FIG. 6A.
Figure 6D:
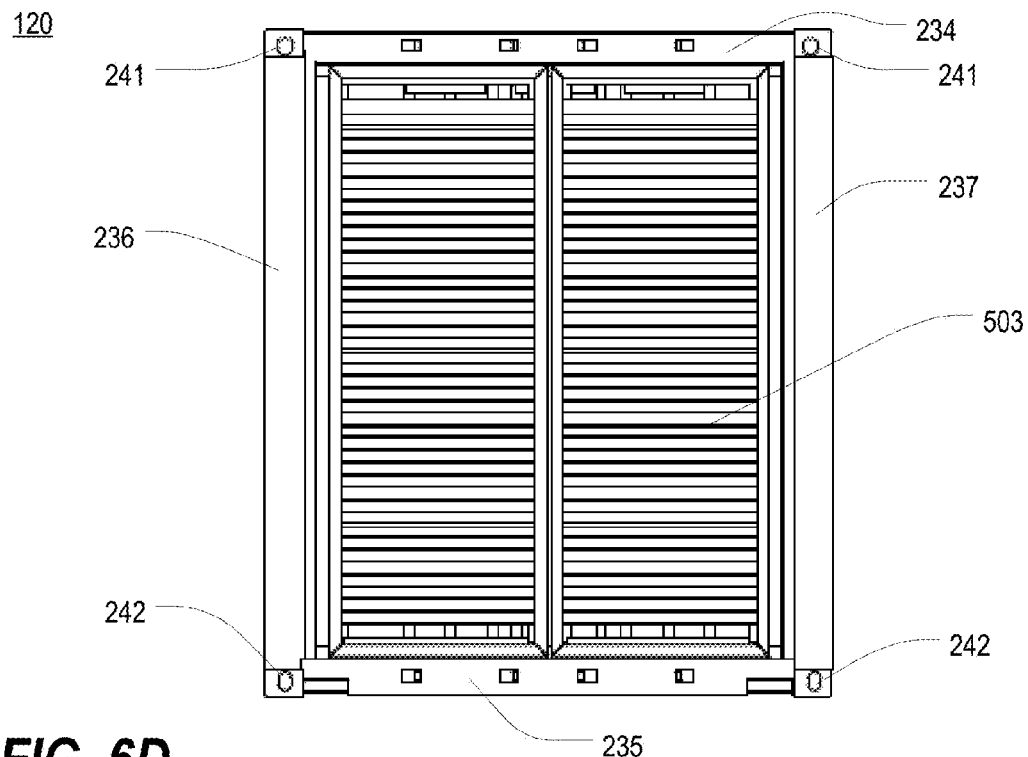
FIG. 6D is a rear view of the sound baffle module of FIG. 6A.
Figure 6E:
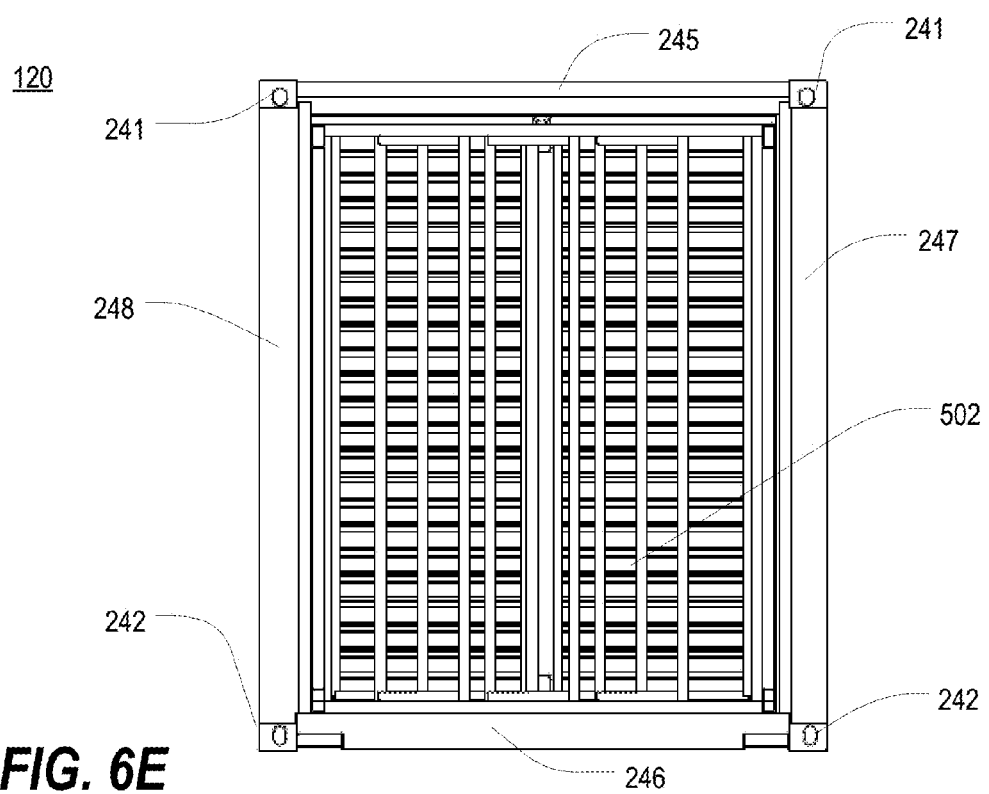
FIG. 6E is a front view of the sound baffle module of FIG. 6A.

As shown, for example, in the top cross-sectional view of FIG. 6B, the sound baffle module 120 includes internal sound baffles 501 in one or more of the top, bottom, sides, and ends that are used to muffle the sound of moving air. Airflow into and/or out of the module 120 is facilitated by large ventilation openings, preferably covered by louvers 502,503. In at least some embodiments, the rear louvers 503 are input louvers and the front louvers 502 are output louvers. The ventilation openings preferably occupy substantially all of the area of the front and rear doors or panels. The sound baffle module 120 also attenuates mechanical sounds that are generated inside of a gen-set module 101 and pass through the rear louvers 211 thereof. When used, the sound baffle module 120 is preferably placed at the rear end of a gen-set module 101 such that the rear louvers 503 thereof are adjacent to the rear louvers 211 of the gen-set module 101.

FIGS. 7A-7E are an isometric view, a top cross-sectional view, a left side view, a right side cross-sectional view, and a rear view of the external fuel tank module 130 of FIG. 1. The external fuel tank module 130 is housed in a purpose-built ISO intermodal shipping container with limited modifications of options, all in the same space footprint as a conventional ISO intermodal shipping container. In at least one contemplated commercial embodiment, the shipping container footprint is that of a "hi-cube" unit that is eight feet wide, 10 feet long, and 9-foot-6-inches tall; however, other conventional shipping container footprint sizes may additionally or alternatively be utilized; however, other conventional shipping container footprint sizes may additionally or alternatively be utilized. In this regard, however, it is preferred that the height be selected to match that of the other module types.

The container includes a top left side rail 532, a bottom left side rail 530, a top right side rail 533, a bottom right side rail 531, a top rear rail 234, a rear sill 235, a rear left post 236, a rear right post 237, a top front rail 245, a front sill 246, a front left post 247, and a front right post 248. A plurality of walls are supported by the rails, sills, and posts to form a housing; portions or the entirety of each such wall preferably utilize conventional corrugated steel construction, like that of conventional intermodal shipping containers. Conventional (ISO where applicable) corner castings, preferably including both upper and lower corner castings 241,242, are provided to enable the modules 130 to be carried, and preferably stacked, like conventional shipping containers. The modules 130 may thus be hauled by rail, tractor-trailer, ship, and any other conventional mode of shipping container transport. Side attachment fittings 243 may be provided to enable the module 130 to be securely attached to another module placed in side-by-side abutment therewith. End attachment fittings (not shown) may also be provided to enable the module 130 to be securely attached to the end of a gen-set module 101. Preferably, the side attachment fittings 243 and end attachment fittings are connected to the conventional corner castings 241,242. In at least some embodiments, a corner casting 241,242 of one module 130 can be attached to a corresponding corner casting 241,242 on the adjacent module via a single side attachment fitting 243.

Figure 7A:
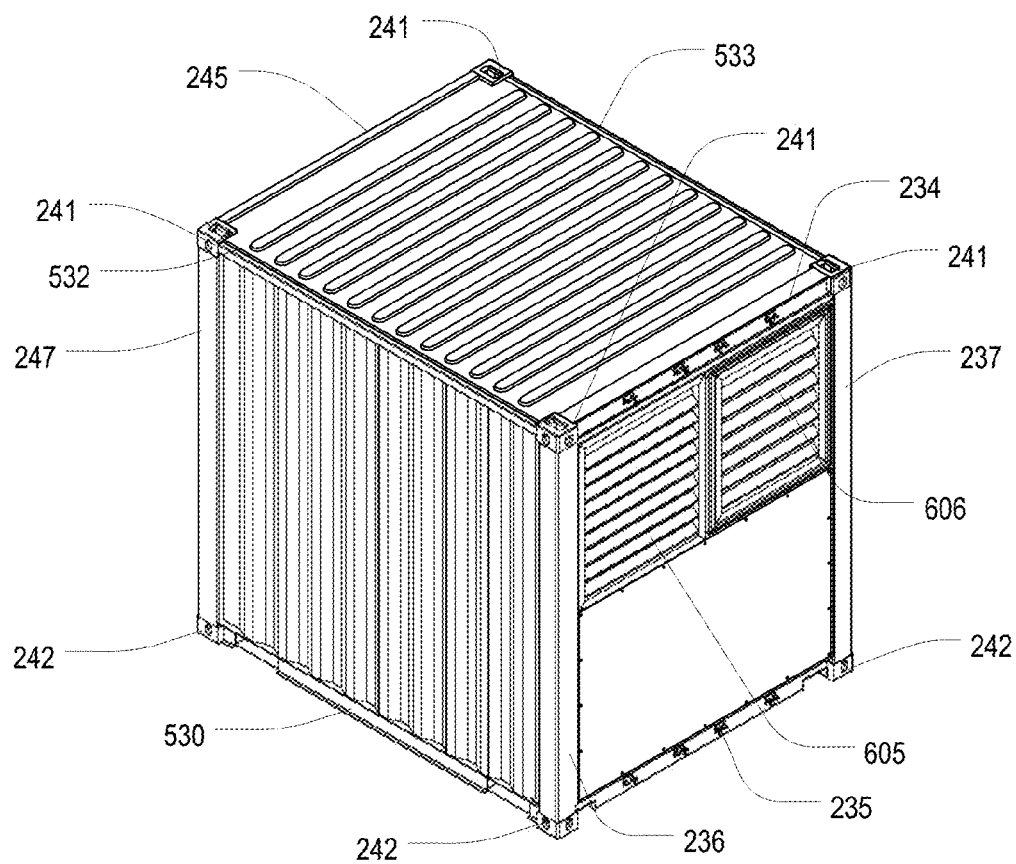
FIG. 7A is an isometric view of the external fuel tank module of FIG. 1.
Figure 7B:
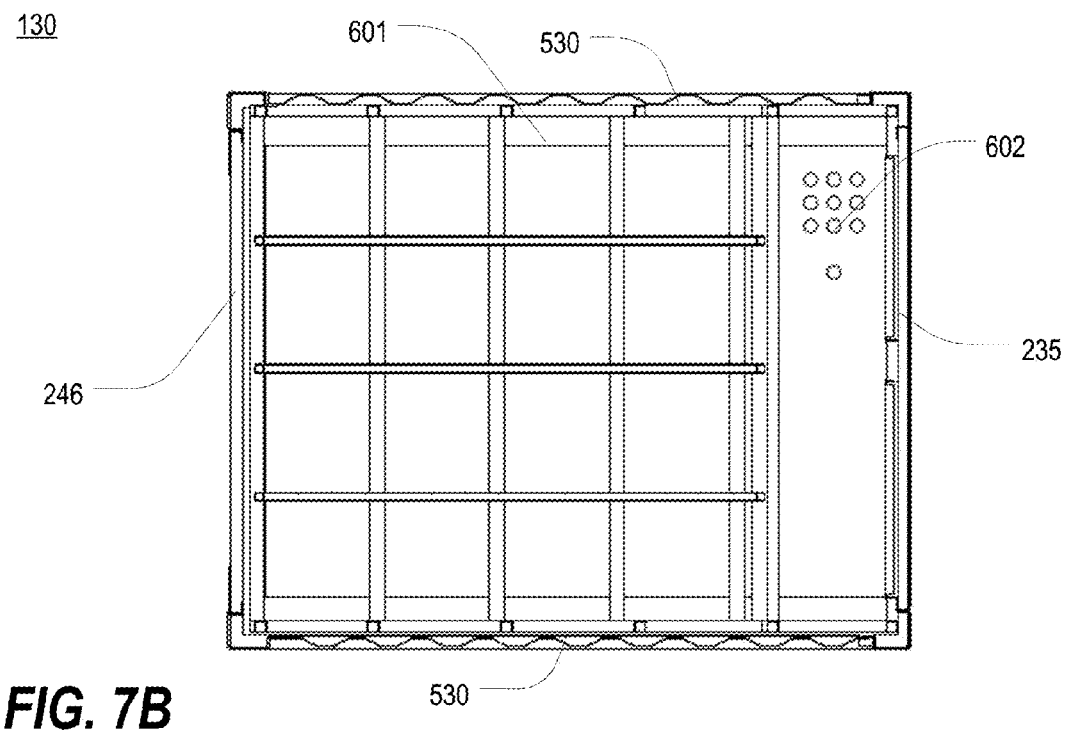
FIG. 7B is a top cross-sectional view of the external fuel tank module of FIG. 7A, taken along line 7B-7B of FIG. 7C.
Figure 7C:
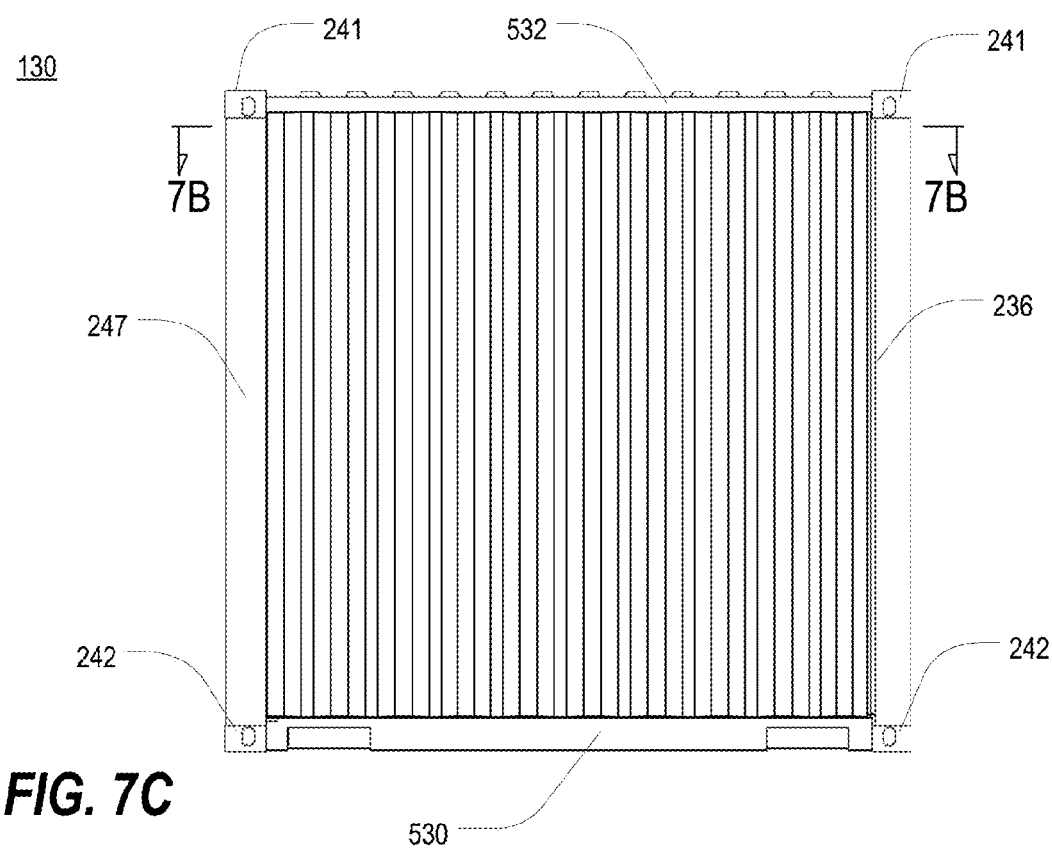
FIG. 7C is a left side view of the external fuel tank module of FIG. 7A.
Figure 7D:
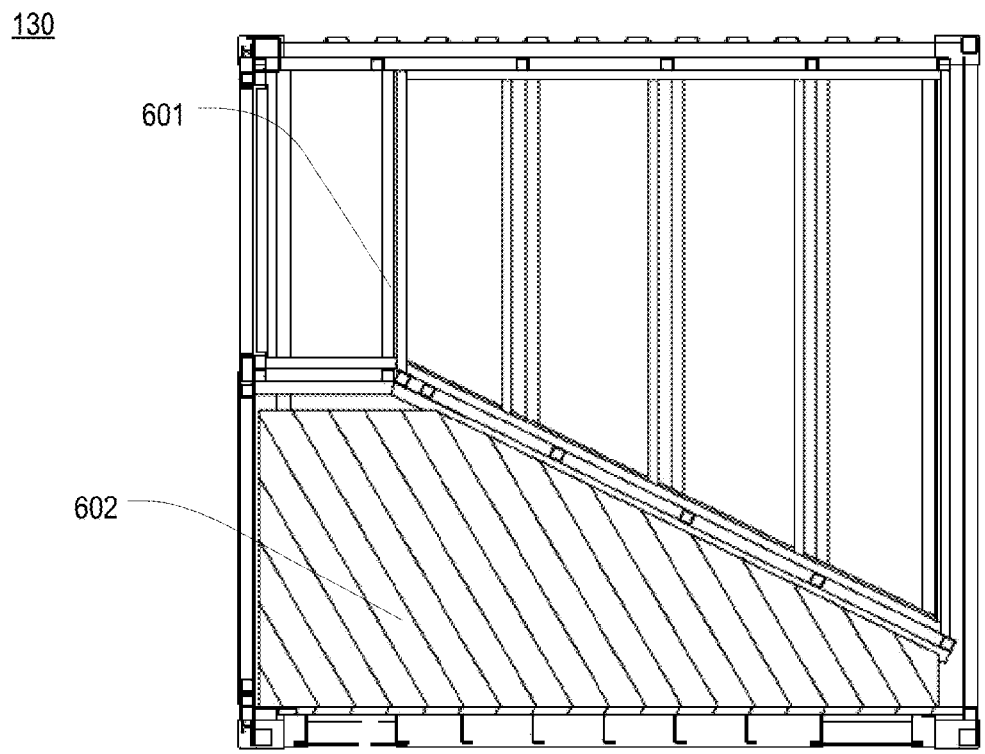
FIG. 7D is a rear view of the external fuel tank module of FIG. 7A.
Figure 7E:
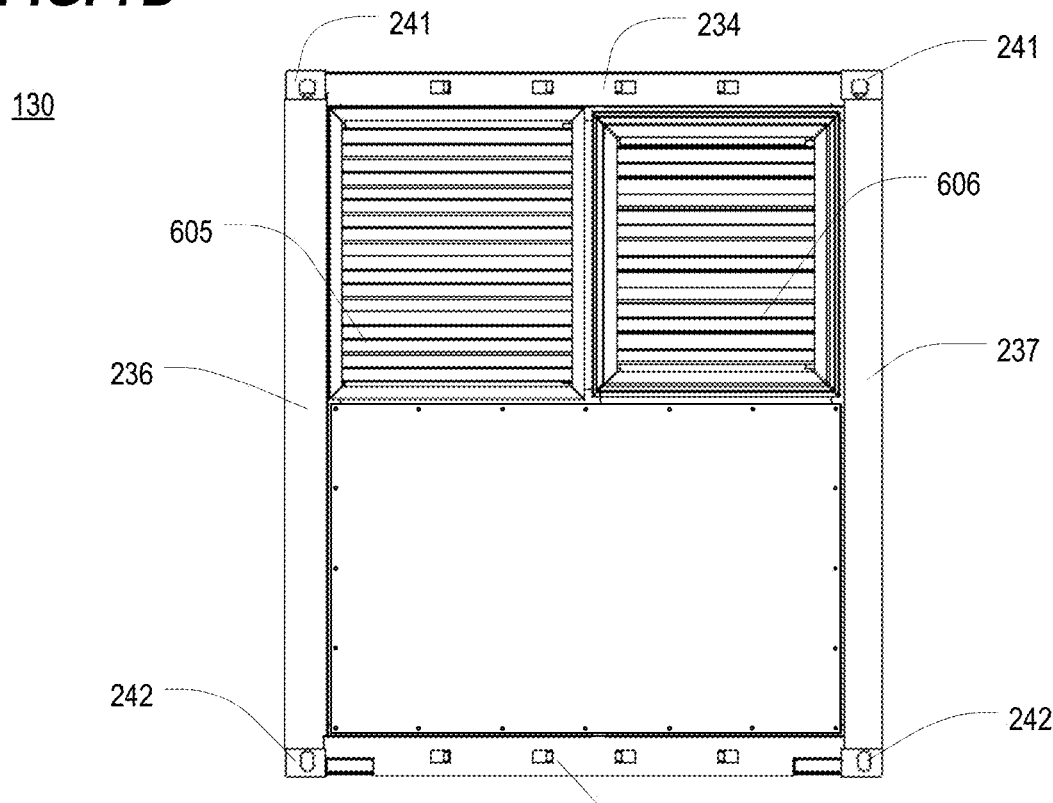
FIG. 7E is a front view of the external fuel tank module of FIG. 7A.

As shown in FIGS. 7B and 7D, the external fuel tank module 130 includes a fuel tank 602 that may be connected to the generator 200 such as by an access port 219 in the front wall of the gen-set module 101. The access port 219 preferably includes an opening through the end wall and a cover that seals the opening when not in use. In some power generation facility implementations, the fuel tanks 602 may be used as auxiliary fuel tanks, supplementing the fuel contained in an internal fuel tank 250 of a gen-set module 101. In other power generation facility implementations, it may be required (for example due to local regulations) that fuel tanks must be kept separate from generators, in which case the external fuel tank 602 of this module 130 is used to keep the fuel separate from a gen-set module 101. Placing the fuel tank 602 in a separate module from that of the generator 200 provides a higher level of safety protection, particularly in larger facilities. For example, by placing fuel tanks 602 in separate modules 130, and by placing those modules 130 in stacks that are separate from the stacks of gen-set modules 101, the risk is considerably reduced of fuel, oil, or other fluids leaking from a higher level in a stack of modules into a lower-level gen-set module 101, thereby creating a possible fire hazard.

Also as shown in FIGS. 7B and 7D, the external fuel tank module 130 preferably includes internal sound baffles 601 that are used to muffle the sound of combustion and cooling air as well as exhaust from the generator 200. Airflow into and/or out of the module 130 is facilitated by ventilation openings, preferably cover by louvers such as the louvers 605,606 shown in FIG. 7E, in the rear panel of the module 130. In at least some embodiments, the louvers 605 on the left are input louvers and the louvers 606 on the right are output louvers. One or more ventilation openings, preferably covered by louvers, may also be provided in the front panel. The external fuel tank module 130 also attenuates mechanical sounds that are generated inside of a gen-set module 101 and pass through the front louvers 214 thereof. The external fuel tank module 130 is an optional module that is placed at the front end of a gen-set module 101 such that the rear louvers 605,606 thereof are adjacent to the front louvers 214 of the gen-set module 101.

Figure 8A:
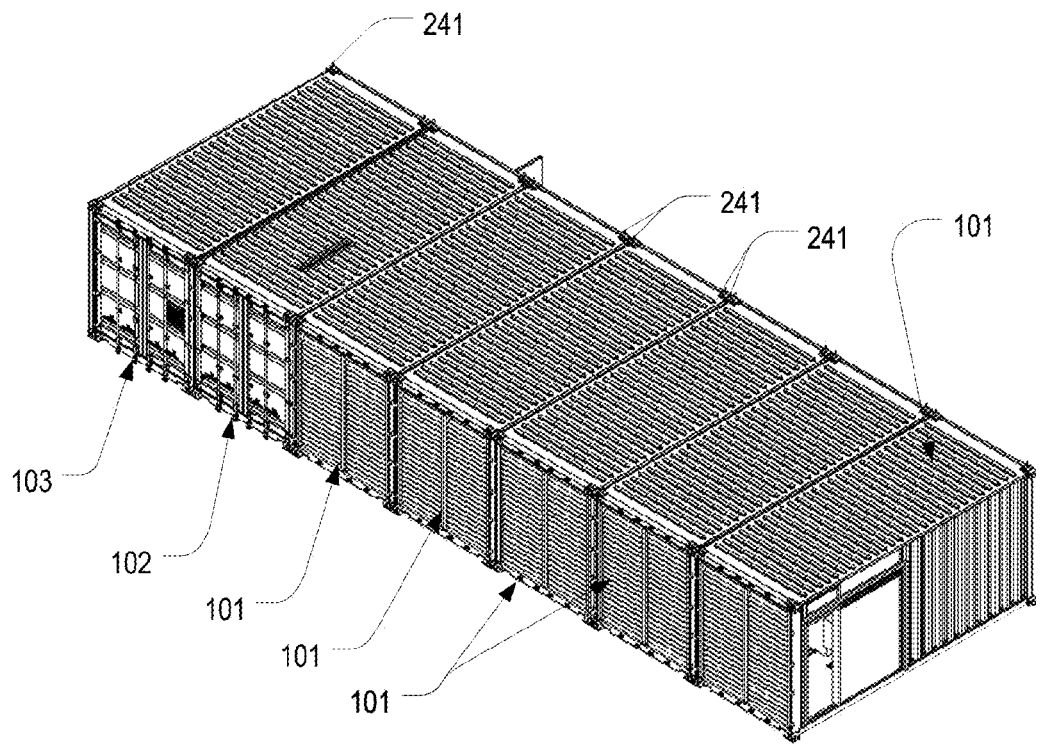
FIG. 8A is an isometric view of a first exemplary modular power generation facility constructed using some of the building block modules of FIG. 1, all according to one or more preferred embodiments of the present invention.
Figure 8B:
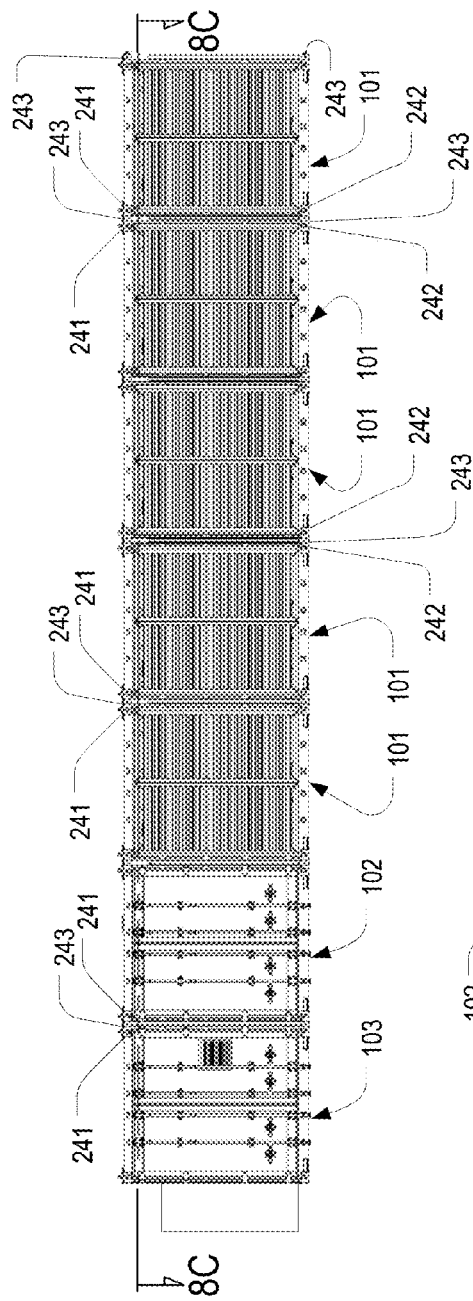
FIG. 8B is a rear view of the exemplary modular power generation facility of FIG. 8A.
Figure 8C:
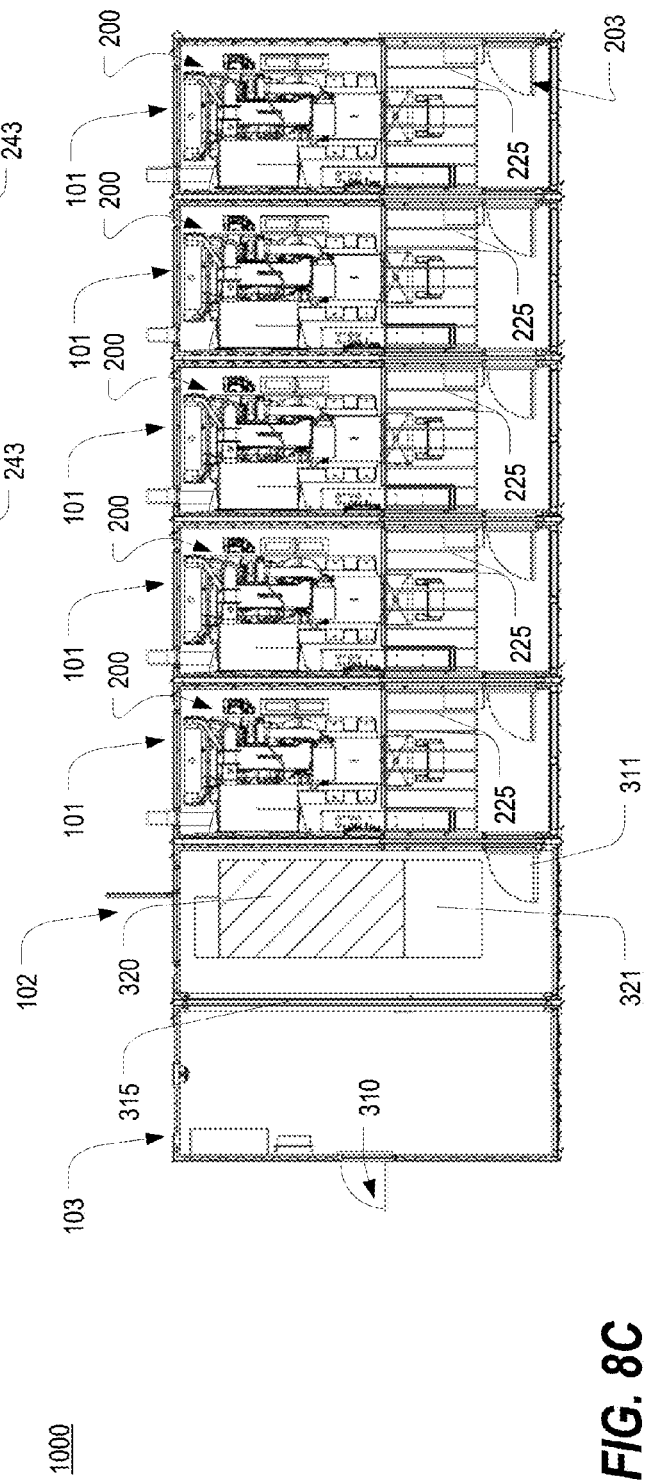
FIG. 8C is a top cross-sectional view of the exemplary modular power generation facility of FIG. 8B, taken along line 8C-8C.

FIGS. 8A-8C are an isometric view, a rear view, and a top cross-sectional view, respectively, of a first exemplary modular power generation facility 1000 constructed using some of the building block modules of FIG. 1, all according to one or more preferred embodiments of the present invention. In this exemplary facility 1000, five gen-set modules 101 are placed side-by-side, a transformer/switchgear module 102 is placed next to one of the gen-set modules 101, and a workroom module 103 is placed next to the transformer/switchgear module 102 on the other side from the gen-set modules 101. With the modules 101,102,103 positioned and leveled, the side attachment fittings 243 are used to secure the sides of the modules together, thus creating a substantially modular enclosure.

As noted previously, because the various modules are adapted from ISO intermodal shipping containers, they may be moved and otherwise handled using any equipment conventionally used to handle ISO intermodal shipping containers. Suitable handling equipment includes short distance equipment such as container gantry cranes, straddle carriers, grappler lifts, reach stackers, side lifters, forklift trucks, and the like, as well as long distance equipment such as railcars, tractor-trailer equipment, and ships. The widespread availability and use of such equipment is a major advantage in the handling, long distance transport, and on-site assembly of modules into modular power generation facilities.

Figure 8D:
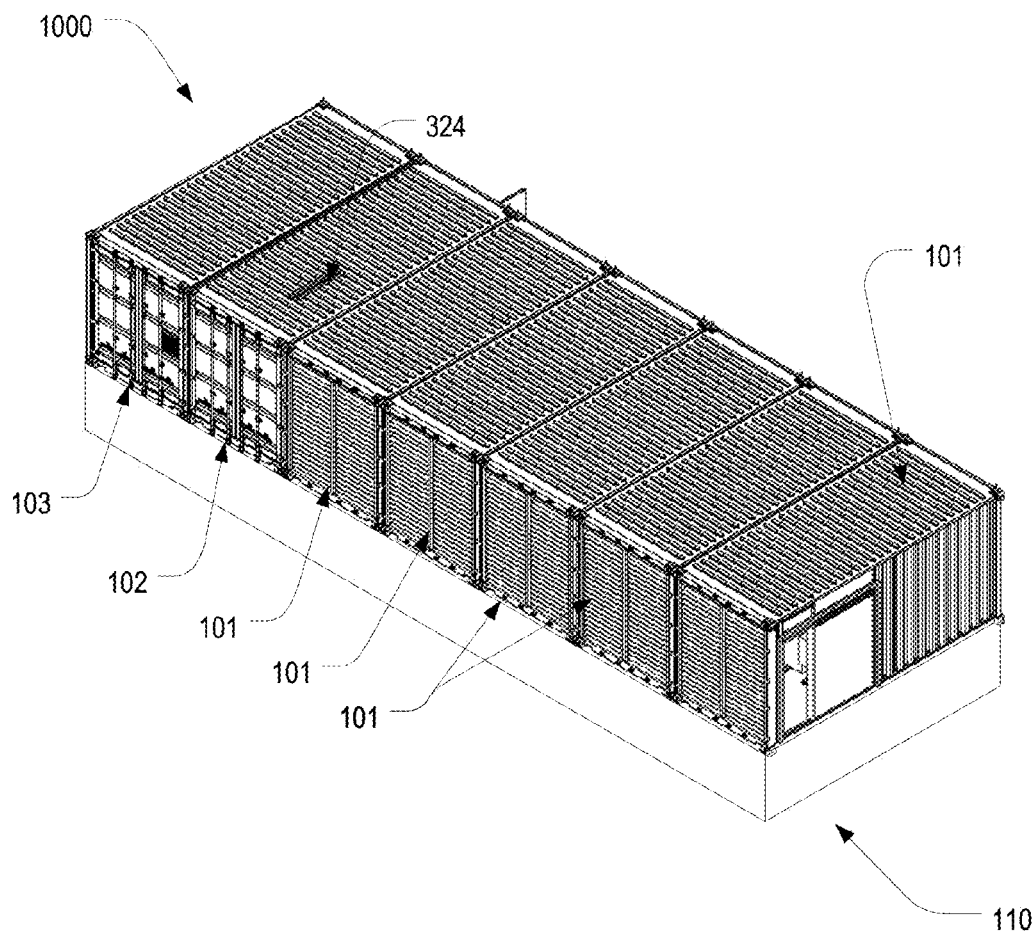
FIGS. 8D and 8E are isometric views of the exemplary modular power generation facility of FIG. 8A, shown with the modules positioned on a base frame or foundation.
Figure 8E:
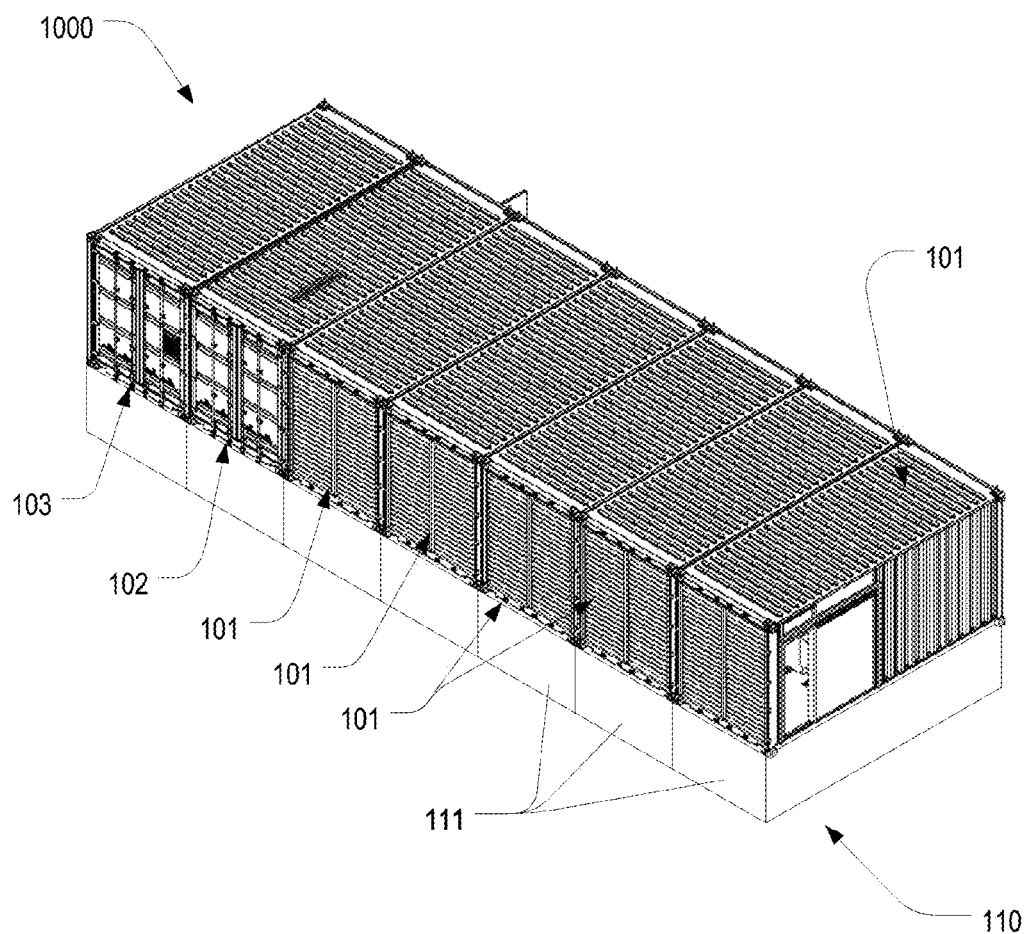

In at least some embodiments, the modules are erected upon a base frame or foundation. In this regard, FIGS. 8D and 8E are isometric views of the power generation facility 1000 of FIG. 8A, shown with the modules positioned on a base frame or foundation 110. In FIG. 8D, the base frame or foundation 110 is a single unified structure that supports all of modules, while in FIG. 8E, the base frame or foundation 110 is a modular structure that includes a separate module platform 111 for each respective module. In at least some embodiments, the base frame or foundation 110 may utilize conventional mechanisms 244 (e.g., twist lock fasteners) positioned to interact with the lower corner castings 242 of the various modules. The use of corner castings and twist lock fasteners, which are conventional with intermodal shipping containers but not with power generation facility modules, is another major advantage in the transport and assembly of modules into such modular power generation facilities.

With the modules in place, the prime movers, generators, transformer, communication components, and other operational components may be made operational. Installation and operation of the operational components of the facility 1000 is similar in many respects to that of systems described in U.S. Pat. No. 8,427,005, relevant portions of which are incorporated herein by reference.

As shown in detail in FIG. 8C, personnel may enter the workroom module 103, and thus the transformer/switchgear module 102 (via the open interface 315), via the primary access door 310. The transformer/switchgear module 102 has a door 311 allowing access into and out of the adjacent gen-set module 101 via the doorway 204 of such module 101, and the doors 203 of the gen-set modules 101 allow personnel to enter one side of each module 101 and progress through an opening opposite of the door to enter the door of the next gen-set module 101. FIG. 8C also illustrates the alignment of the cable trays 225 in the various gen-set modules 101 to allow cables to be routed to, from, and between the gen-set modules 101 and the transformer/switchgear module 102.

Notably, the use of a common width among the various modules allows the arrangement of modules to be changed without having to remove, shift, or otherwise change the position of all of the modules, or the base frame or foundation 110 on which the facility is mounted, in order to accommodate a change in one of the modules. In one example, a gen-set module 101 may be removed and replaced by a different gen-set module without moving any of the other modules because the replacement module has the same width as the original. In another example, the base frame or foundation 110 may be extended, the workroom module 103 may be moved onto the extension, the transformer/switchgear module 102 may be moved to the location previously occupied by the workroom module 103, and a new gen-set module 101 may installed in the location previously occupied by the transformer/switchgear module 102. Other examples are described or suggested elsewhere herein.

Still further, the use of a common length among the various modules, particularly in combination with the use of a common width, allows a new module to be mounted on exactly the same base frame or foundation 110. For examples, in the situations described above, the corner castings of the new module will fit on the same twist lock fasteners used for the previous module without any adjustment thereto.

Figure 9A:
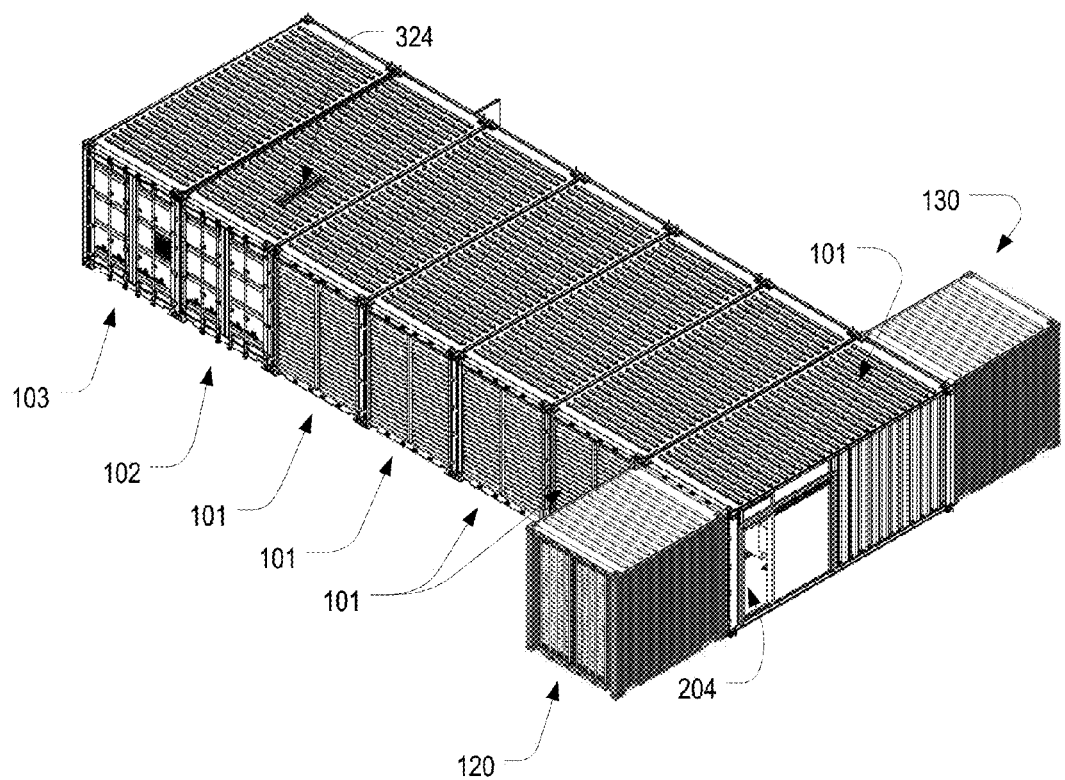
FIG. 9A is an isometric view of a second exemplary modular power generation facility constructed using some of the building block modules of FIG. 1, all according to one or more preferred embodiments of the present invention.
Figure 9B:
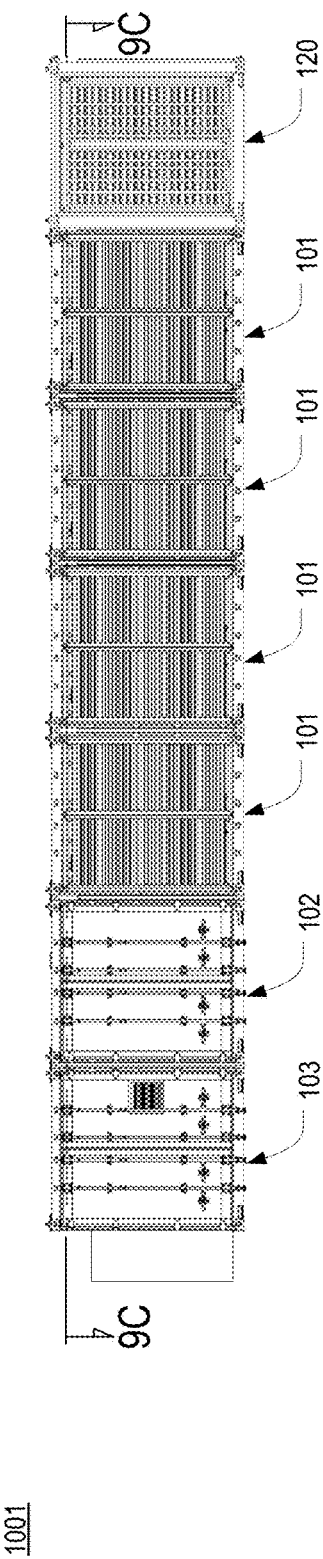
FIG. 9B is a rear view of the exemplary modular power generation facility of FIG. 9A.
Figure 9C:
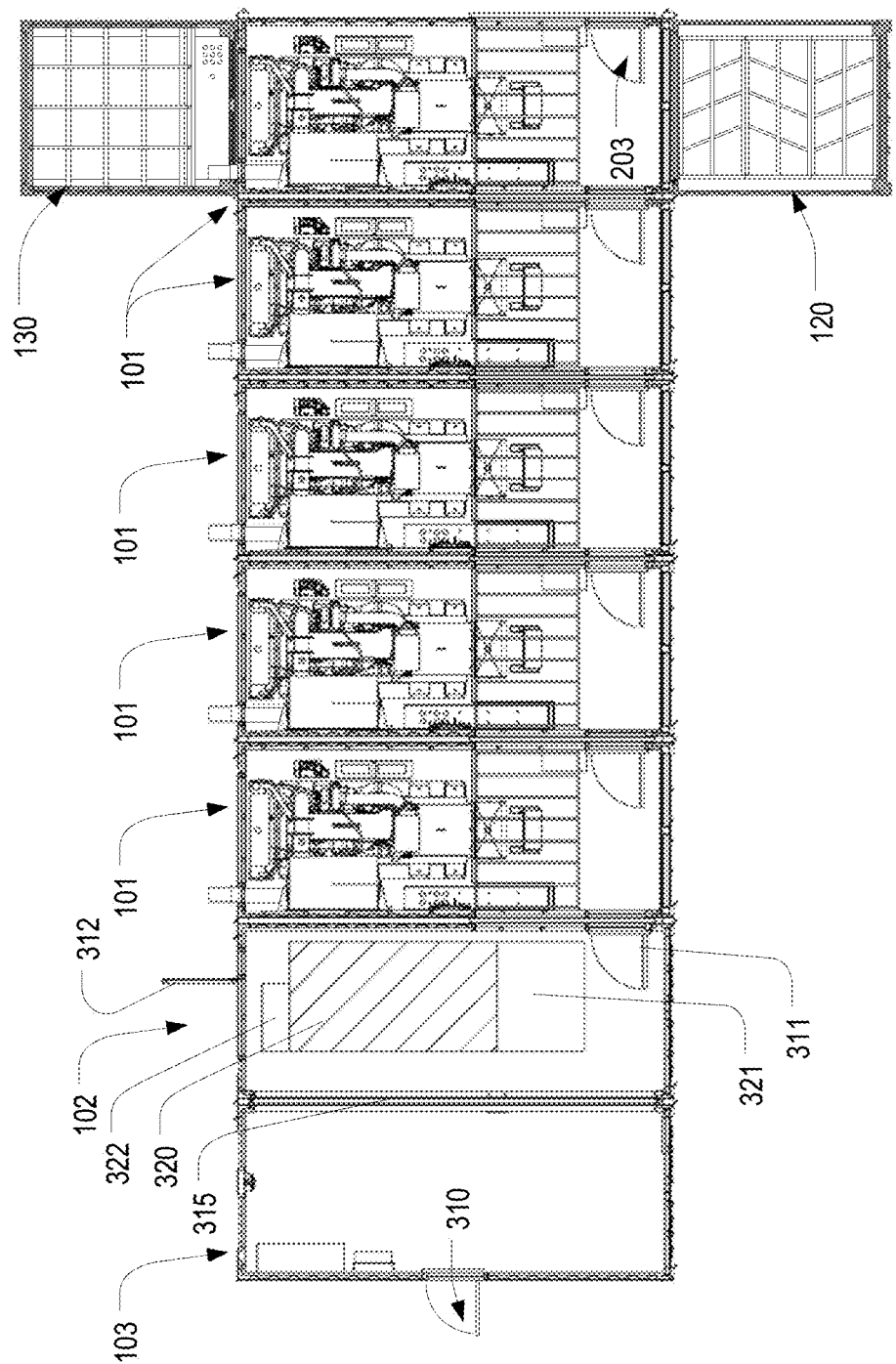
FIG. 9C is a top cross-sectional view of the exemplary modular power generation facility of FIG. 9B, taken along line 9C-9C.

FIGS. 9A-9C are an isometric view, a rear view, and a top cross-sectional view, respectively, of a second exemplary modular power generation facility 1001 constructed using some of the building block modules of FIG. 1, all according to one or more preferred embodiments of the present invention. This exemplary facility 1001 likewise includes five gen-set modules 101 placed side-by-side, a transformer/switchgear module 102 is placed next to one of the gen-set modules 101, and a workroom module 103 placed on the other side of the transformer/switchgear module 102. In addition, however, an external fuel tank module 130 and a sound baffle module 120 abut the front and rear ends of the nearest gen-set module 101. Notably, although these modules 120,130 are shown in abutment with only one of the gen-set modules 101, it will be appreciated that if these modules 120,130 are used, a more typical implementation would include such modules 120,130 in use with each of the gen-set modules 101.

Although not illustrated, the facility 1001 may be erected upon a base frame or foundation similar in many respects to the base frames or foundations 110 of FIGS. 8D and 8E. Such a base frame or foundation may be a unified structure or a modular structure. The base frame or foundation 110 may include support for the sound baffle module 120 and the external fuel tank module 130 (and any other such modules 120,130 that are utilized). The base frame or foundation 110 may utilize conventional mechanisms 244 (e.g., twist lock fasteners) positioned to interact with the lower corner castings 242 of the various modules.

Figure 10A:
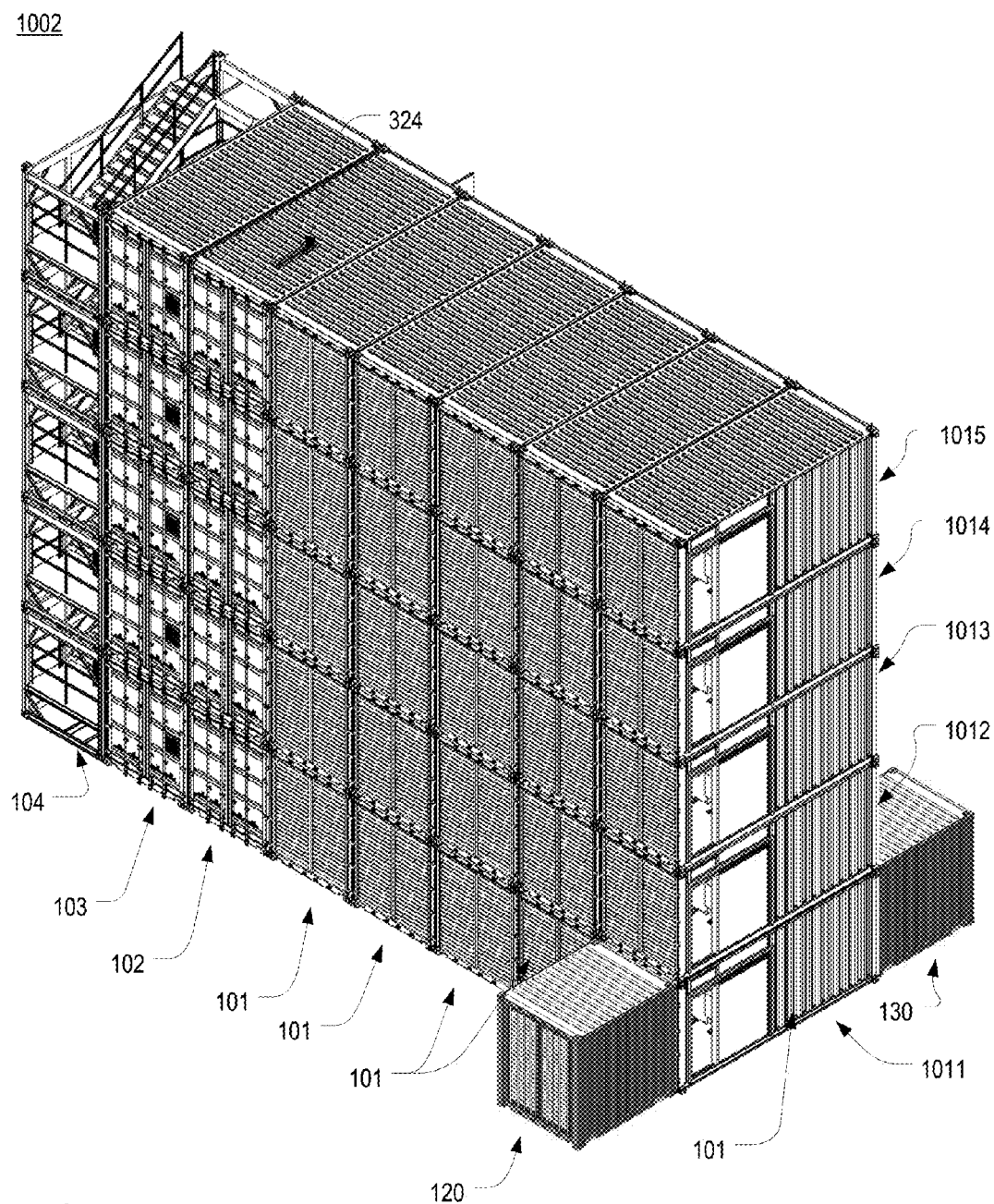
FIG. 10A is an isometric view of a third exemplary modular power generation facility constructed using some of the building block modules of FIG. 1, all according to one or more preferred embodiments of the present invention.
Figure 10B:
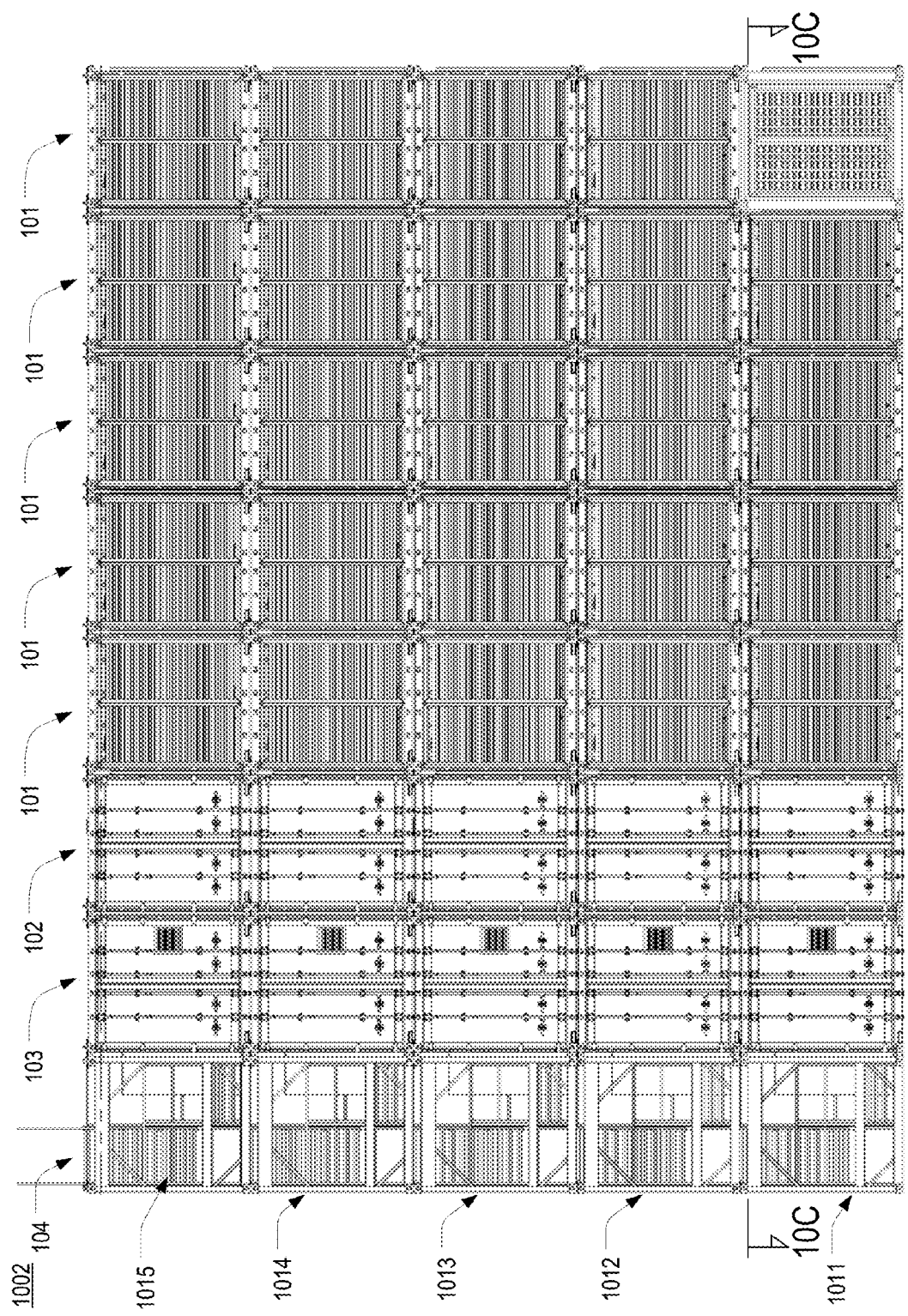
FIG. 10B is a rear view of the exemplary modular power generation facility of FIG. 10A.
Figure 10C:
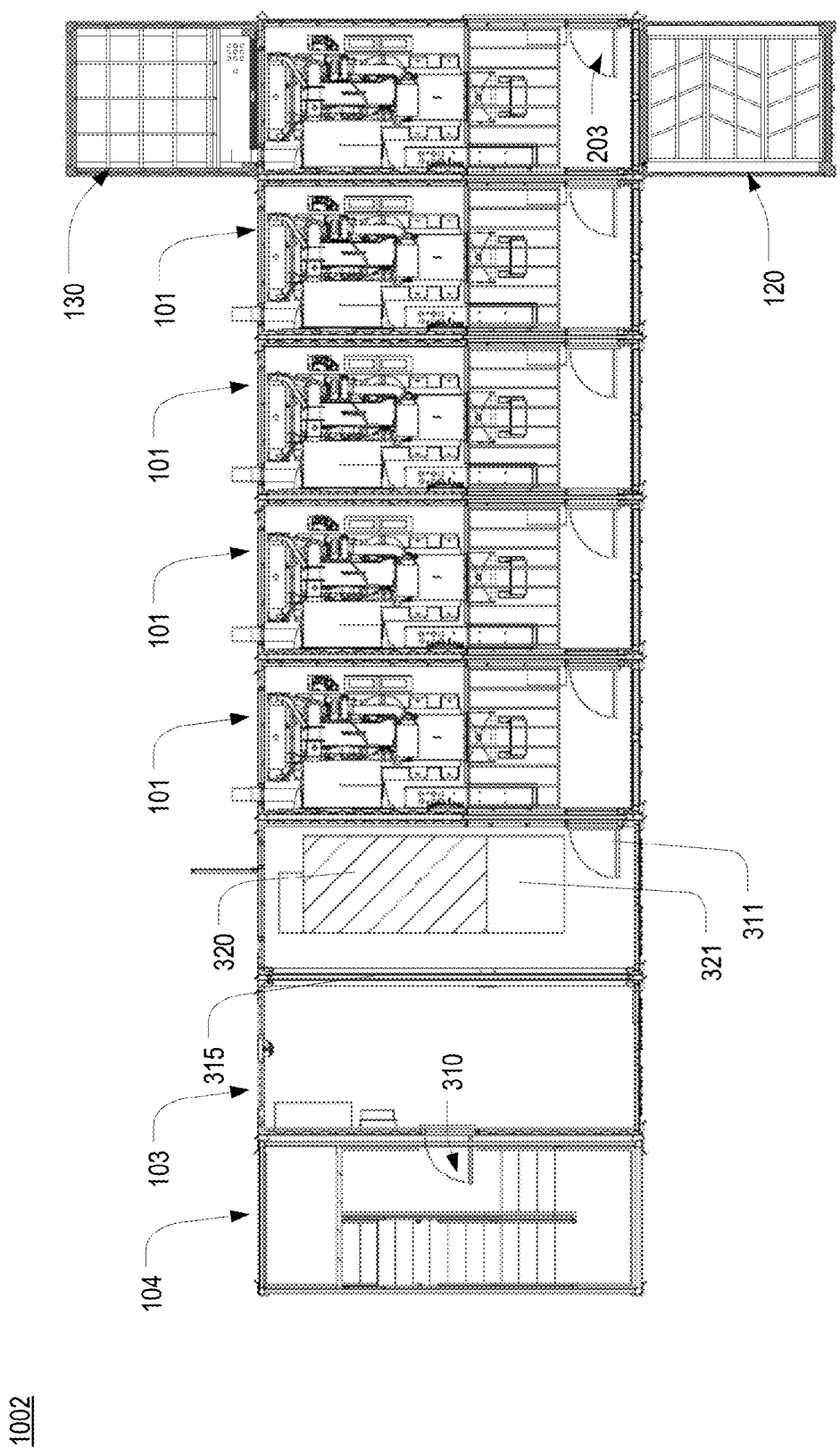
FIG. 10C is a top cross-sectional view of the exemplary modular power generation facility of FIG. 10B, taken along line 10C-10C.

In at least some embodiments, the building block modules may be stacked on top of each other to create multi-level power generation facilities. In this regard, FIGS. 10A-10C are an isometric view, a rear view, and a top cross-sectional view, respectively, of a third exemplary modular power generation facility 1002 constructed using the building block modules of FIG. 1, all according to one or more preferred embodiments of the present invention. As shown therein, the facilities 1000,1001 of FIGS. 8A-8C and FIGS. 9A-9C are used as base building blocks in the creation of a five-level matrix of modules. The base level 1011 includes all of the electric power generation modules of the exemplary facility 1001 of FIGS. 9A-9C as well as a staircase module 104 to allow access to a second level 1012 of the facility 1002. The second level 1012, a third level 1013, a fourth level 1014, and a fifth level 1015 each include all of the electric power generation modules of the exemplary facility 1000 of FIGS. 8A-8C as well as a staircase module 104 to allow access to the level above and/or the level below. As with the facility 1001 of FIGS. 9A-9C, the sound baffle module 120 and external fuel tank module 130 are only shown in use with the nearest gen-set module 101 on the first level 1011, but it will be appreciated that such modules 120,130 may likewise be used with each gen-set module 101 in the first level 1011, and may also be stacked on top of each other for use with the gen-set modules 101 in the upper levels 1012,1013,1014, 1015.

As shown in detail in FIG. 10C, personnel may enter the workroom module 103, and thus the transformer/switchgear module 102 (via the open interface 315), via the primary access door 310. The primary access door 310 is accessible from a landing or platform portion of the staircase module 104; one or more openings in the safety rails may be provided at suitable locations to permit passage from the staircase module 104 into the workroom module 103 or, as shown in another exemplary facility below, another module as desired. Access to the various gen-set modules 101 on each level is accessible through doors and passages accessible from the transformer/switchgear module 102 as described previously with respect to the first exemplary facility 1000.

In the arrangement of FIGS. 10A-10C, it is anticipated that each level or row of modules operates to at least some degree as a functional unit, wherein the gen-set modules 101 are ganged together with the transformer/switchgear module 102 and the switchgear forms part of the control system used to effectuate operation of the modules on that particular level in the facility. In such an arrangement, each row or level of modules may operate with some degree of independence from other rows or levels of modules, and although some elements of common control may be provided (such as monitoring functions), overall control is provided on a level-by-level basis. However, in various modular power generation facility embodiments, other arrangements may alternatively be utilized, including arrangements, described below, wherein stacks of modules, rather than rows or levels, may operate as functional units.

Notably, the use of a common width among the various modules allows the arrangement of modules to be changed without having to remove, shift, or otherwise change the position of all of the modules, and without having to remove, shift, or otherwise change the position of modules in lower levels, in order to accommodate a change in one of the modules. In one example, a gen-set module 101 may be removed and replaced by a different gen-set module without moving any of the other modules because the replacement module has the same width as the original. In another example, a module can be stacked on directly top of a lower module, such that the upper module is directly adjacent a neighboring module in the upper level, without having to reposition the lower level module. Other examples are described or suggested elsewhere herein.

Still further, the use of a common height among the various modules allows entire levels of modules to be assembled, with each module in each level being at the same elevation. This facilitates the routing of cables between and through modules and makes it possible for users to access modules in each level by walking through other modules, with the floors of the various modules being generally co-planar. Still further, the use of a common length among the various modules in combination with the use of a common height makes it easy for modules to be stacked on top of each other because each module on an upper level is fully supported by the module below it.

As noted previously, because the various modules are adapted from ISO intermodal shipping containers, they may be moved and otherwise handled using any equipment conventionally used to handle ISO intermodal shipping containers. Suitable handling equipment includes short distance equipment such as container gantry cranes, straddle carriers, grappler lifts, reach stackers, side lifters, forklift trucks, and the like, as well as long distance equipment such as railcars, tractor-trailer equipment, and ships. The widespread availability and use of such equipment is a major advantage in the handling, long distance transport, and on-site assembly of modules into modular power generation facilities, particularly when modules are stacked on top of each other as shown in FIGS. 10A-10C. Advantageously, when one module is placed on top of another module, the upper module can be easily attached to the lower module via conventional mechanisms (e.g., twist lock fasteners). At higher levels, it may be particularly useful for the twist lock fasteners to be of the automatic type because of the difficulty inherent in accessing them directly.

Particularly when multiple levels of stacked modules are employed, additional equipment and techniques for stabilizing the module stacks may be adapted from the intermodal shipping industry and utilized. For example, crisscrossed pairs of conventional lashing rods (not shown) may be installed at the end of each first-level module by attaching one end of each lashing rod to the base frame or foundation (typically via a "padeye") and attaching the other end to a corner casting on the bottom of the second level module that is stacked on top of the first-level module. Such lashing rods typically employ turnbuckles that may be tightened to ensure that the second-level module is held tightly on top of the first-level module in each stack.

Figure 11:
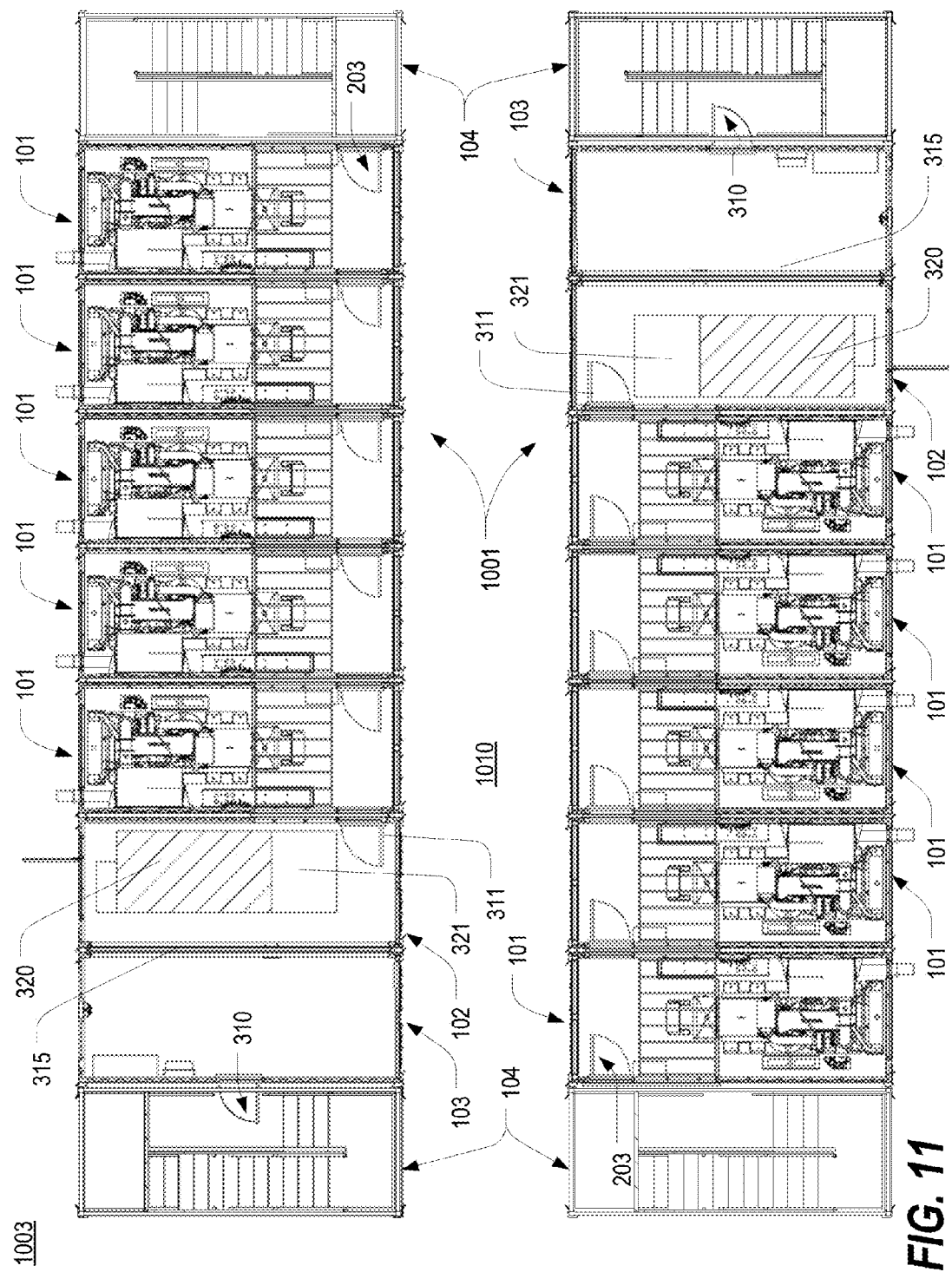
FIG. 11 is a top cross-sectional view of a fourth exemplary modular power generation facility constructed using some of the building block modules of FIG. 1, all according to one or more preferred embodiments of the present invention.

Stacked structures such as the facility 1002 of FIGS. 10A-10C may also be utilized in conjunction with other stacked structures to provide even greater flexibility in the creation of modular power generation facilities. For example, FIG. 11 is a top cross-sectional view of a fourth exemplary modular power generation facility 1003 constructed using the building block modules of FIG. 1, all according to one or more preferred embodiments of the present invention. In this facility 1003, two of the facilities 1000 shown in FIGS. 8A-8C are positioned in close proximity to each other. Such an arrangement enables still greater power density in a smaller footprint than previously possible. This may be particularly useful when the power generation needs exceed the greatest maximum facility height, where such maximum may be set by physical restraints, local requirements (such as construction restrictions requiring structures to remain below a tree canopy, neighboring buildings, or the like), design preference, or the like. In FIG. 11, the two sub-facilities 1000 are arranged only ten feet from each other with an alley 1010 extending therebetween.

FIG. 11 also illustrates the use of a second stack of staircase modules 104 at the opposite end from the first in each of the two sub-facilities 1000. Although most operational access to a facility involves entry to the workroom module 103 and transformer/switchgear module 102, access to the various gen-set modules 101 in each level of a facility is sometimes necessary, and traversing the path through the workroom module 103 and transformer/switchgear module 102 on each level to get to the most distant gen-set modules 101 can be tedious. Thus, a second staircase module 104, providing access to the adjacent gen-set module 101 via access door 203, can be added if desired. The total area occupied by the exemplary two-stack facility 1003 of FIG. 11 is thus 80 feet long (ten modules, each 8 feet wide) by 50 feet wide (two modules, each 20 feet long, separated by a ten-foot-wide alley 1010).

FIGS. 12A-12F are an isometric view, a top cross-sectional view, a right side view, a left side view, a rear view, and a front view, respectively, of another one of the gen-set modules 701 of FIG. 1. As with the first type of gen-set module 101, this gen-set module 701 includes a generator 700 housed in a purpose-built ISO intermodal shipping container with limited modifications of options, all in the same space footprint as a conventional ISO intermodal shipping container. In at least one contemplated commercial embodiment, the shipping container footprint is that of a "hi-cube" unit that is eight feet wide, 20 feet long, and 9-foot-6-inches tall; however, other conventional shipping container footprint sizes may additionally or alternatively be utilized.

The container includes a top left side rail 232, a bottom left side rail 230, a top right side rail 233, a bottom right side rail 231, a top rear rail 234, a rear sill 235, a rear left post 236, a rear right post 237, a top front rail 245, a front sill 246, a front left post 247, and a front right post 248. A plurality of walls are supported by the rails, sills, and posts to form a housing; portions or the entirety of each such wall preferably utilize conventional corrugated steel construction, like that of conventional intermodal shipping containers. Conventional (ISO where applicable) corner castings, preferably including both upper and lower corner castings 241,242, are provided to enable the modules 701 to be carried, and preferably stacked, like conventional shipping containers. The modules 701 may thus be hauled by rail, tractor-trailer, ship, and any other conventional mode of shipping container transport. Side attachment fittings 243 are also provided to enable the module 701 to be securely attached to another module placed in side-by-side abutment therewith. Preferably, the side attachment fittings 243 are connected to the conventional corner castings 241,242. In at least some embodiments, a corner casting 241,242 of one module 701 can be attached to a corresponding corner casting 241,242 on the adjacent module via a single side attachment fitting 243. In at least some of these embodiments, the side attachment fittings 243 are provided on the four fixtures 241,242 on one side of the module 701, and the side that is selected is the same for every module such that a proper set of side attachment fittings is always available for side-to-side attachment of adjacent modules.

One or more large ventilation opening in the rear doors or panel, preferably covered by louvers 211, allows ventilation air to circulate through the gen-set module 701, while one or more additional ventilation opening in the front wall, also preferably covered by louvers 714, allows cooling air to circulate to the generator 700 contained inside. The rear ventilation openings preferably occupy substantially all of the area of the rear doors or panel, while the front ventilation openings preferably occupy at least a quarter of the area of the front panel. User access to the interior is generally provided via doorways 204 and a passageway 220; a door 203 is shown in an open position in one of the doorways 204.

However, in at least some embodiments, a front panel 715, front louvers 714, and/or rear louvers 211 may be removed, and/or the rear doors (if provided) may be opened, to provide additional access to the contents of the gen-set module 701, allowing access for repair, upgrade or replacement of components.

Figure 12A:
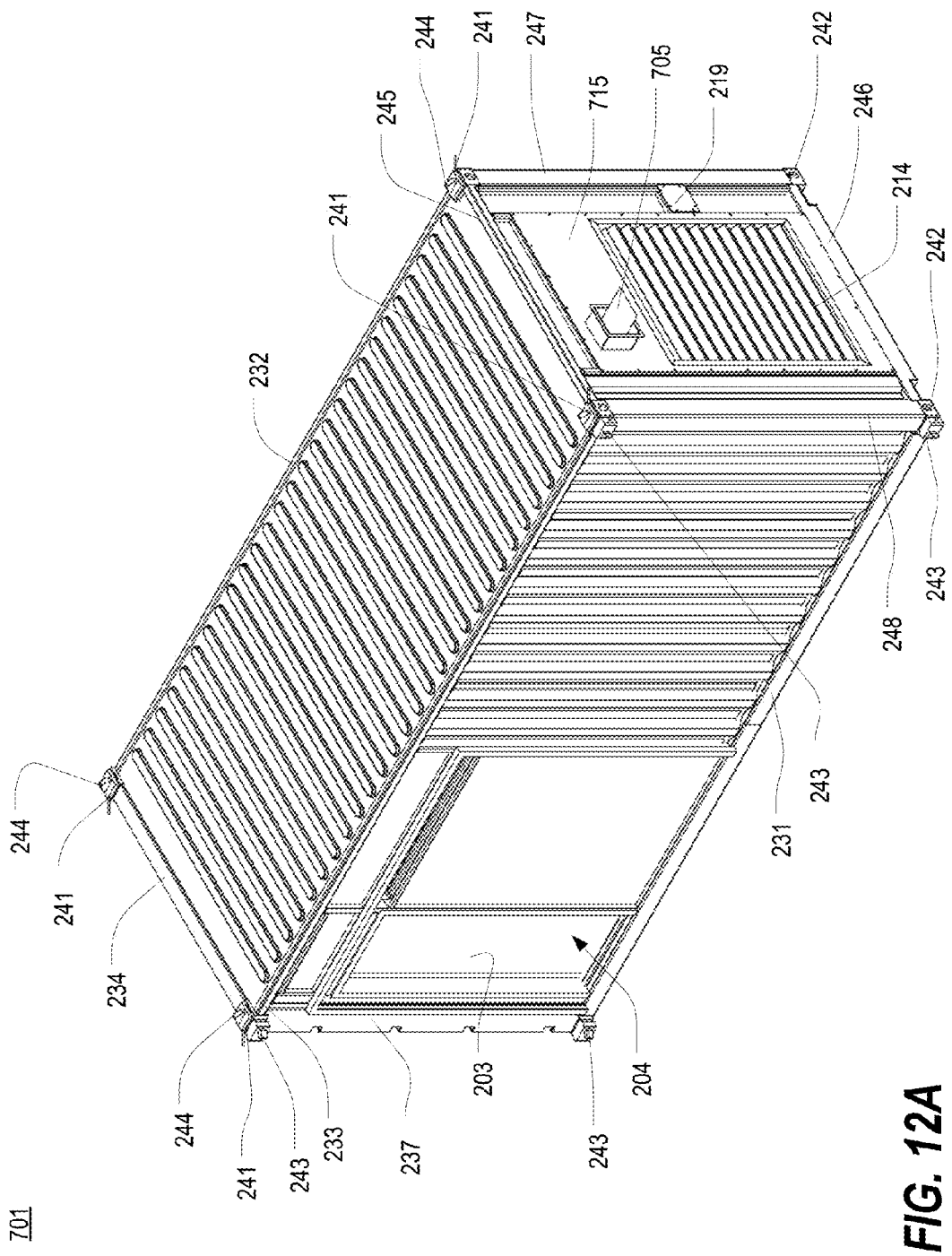
FIG. 12A is an isometric view of another one of the gen-set modules of FIG. 1.
Figure 12B:
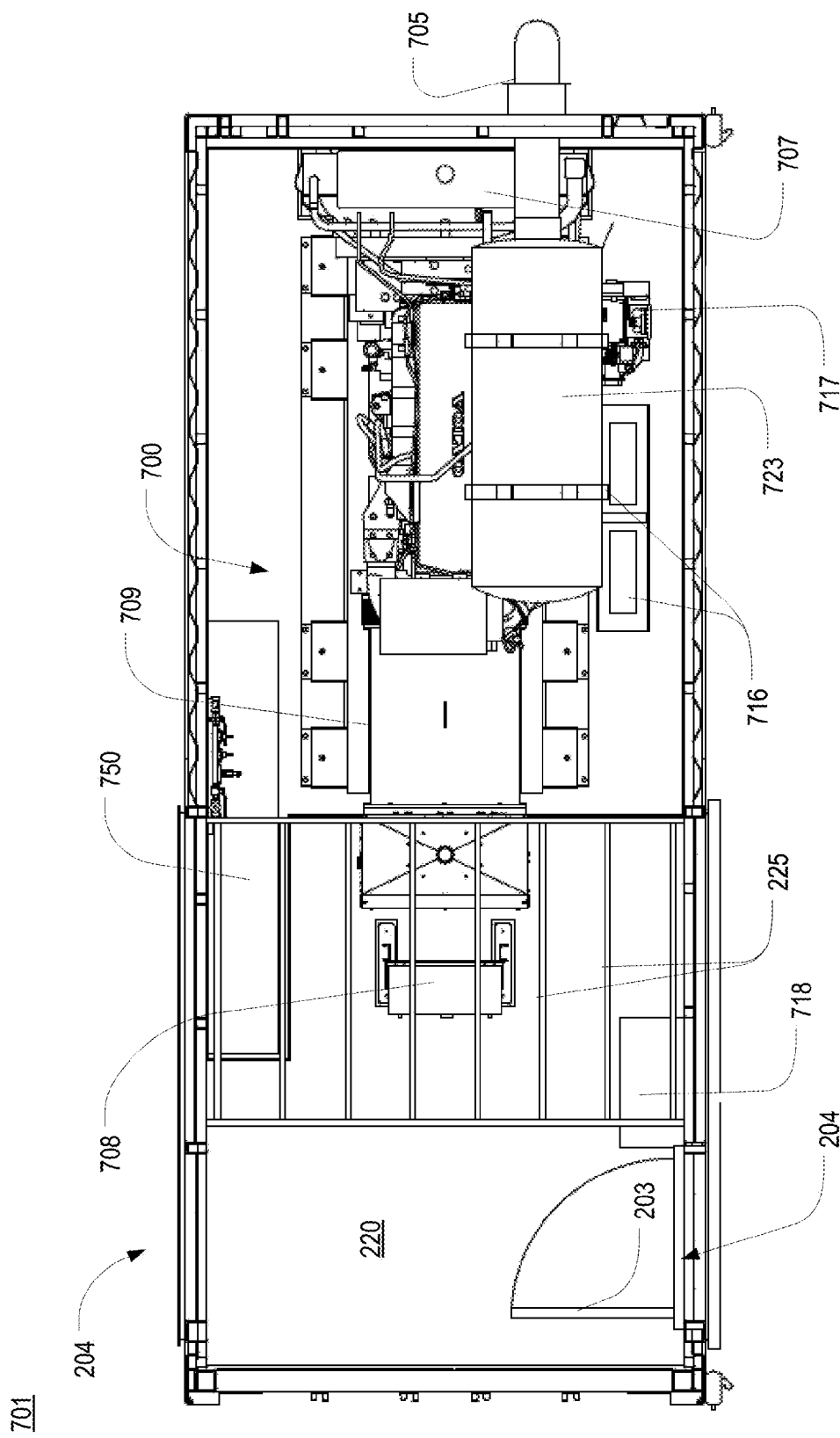
FIG. 12B is a top cross-sectional view of the gen-set module of FIG. 12A, taken along line 12B-12B of FIG. 12D.
Figure 12C:
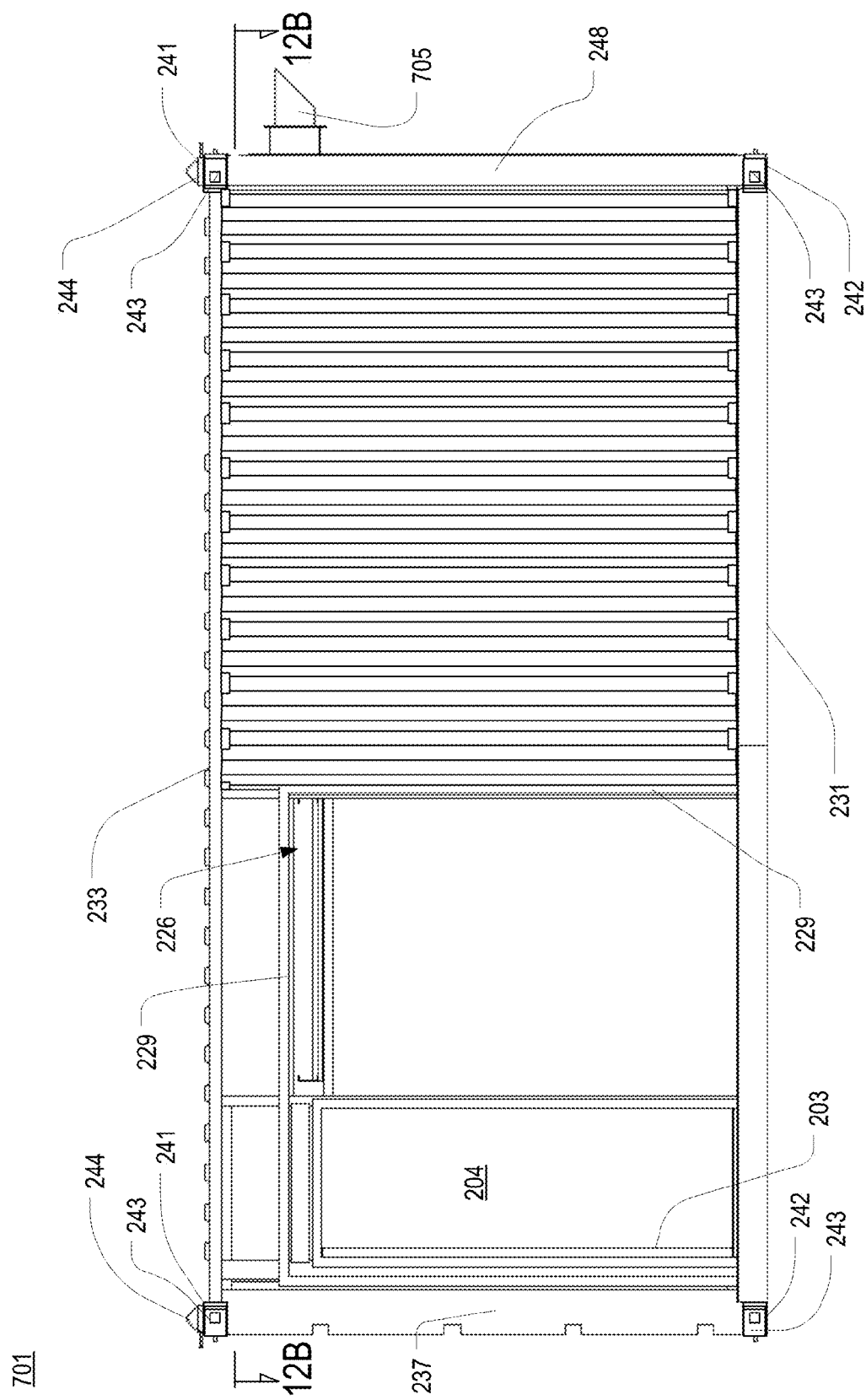
FIG. 12C is a right side view of the gen-set module of FIG. 12A.
Figure 12D:
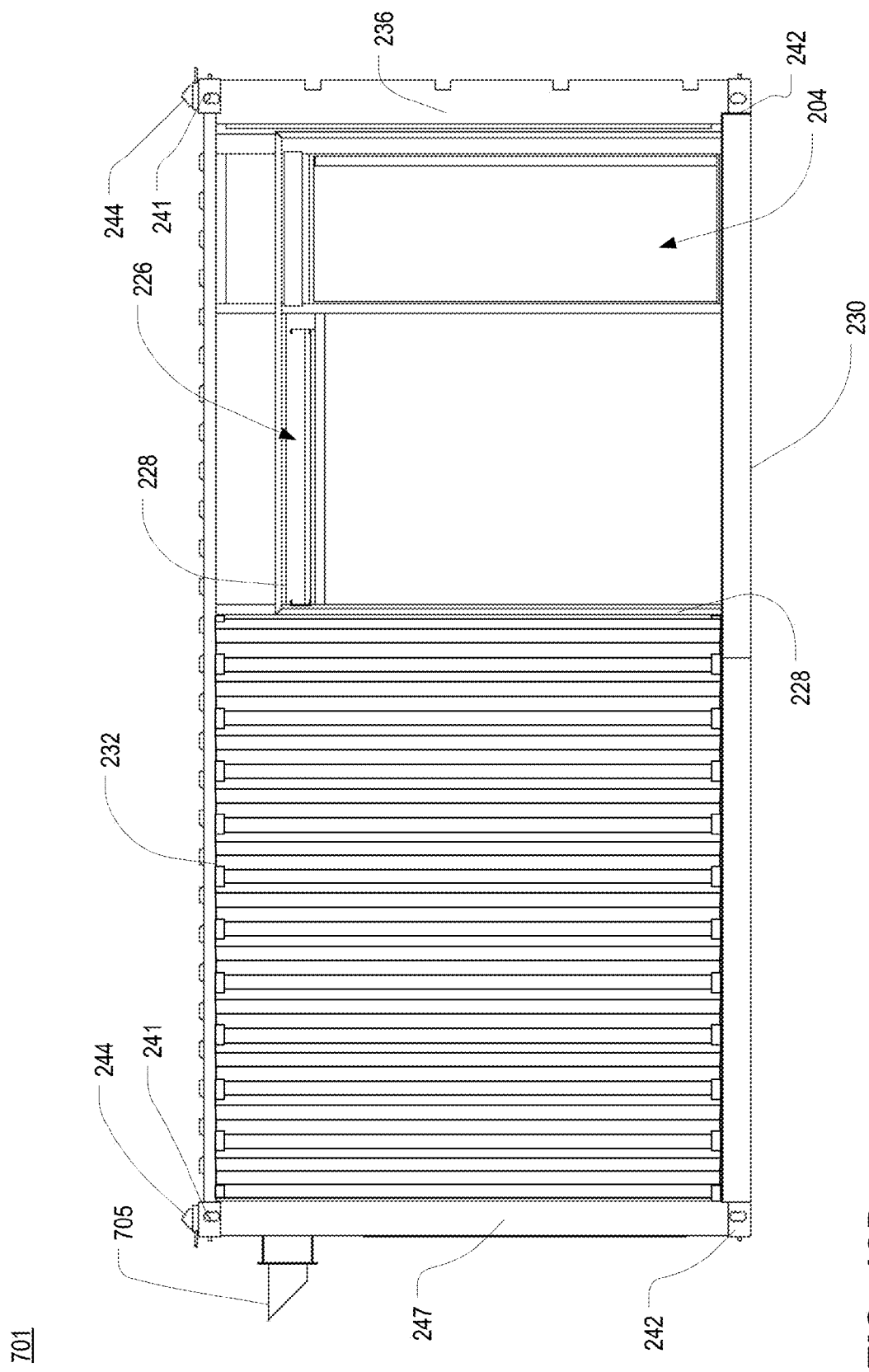
FIG. 12D is a left side view of the gen-set module of FIG. 12A.

As perhaps best shown in the top cross-sectional view of FIG. 12B, the interior of the gen-set module 701 contains a generator 700, an alternator 709, one or more batteries 716, a "hotstart" heating/starting system 717, a cooling radiator 707, a circuit breaker/switchgear panel 708, a communications (comms) box 718, a fuel tank 750, and an exhaust pipe 705. In one contemplated commercial embodiment, the generator 700 is diesel-fired and satisfies the EPA Tier 2 Final emissions standards. Equipment suitable for use includes a Tier 2 (600 kW) engine available from Volvo and a corresponding alternator available from Marathon. A silencer 723 is preferably provided in such embodiments. Also, in various embodiments, some of which are described herein, a generator may be provided that is gasoline fired, natural gas fired, propane fired, fuel oil fired, or fired by any other type of fuel. In various embodiments, the generators can be high-efficiency and rated for continuous use, or can be lower efficiency rated for non-continuous use.

The filling of the tank 750 may be accomplished by supply hoses passed through a doorway 204 or via some other opening. In an alternate embodiment, filling ports may be mounted on an external surface of the gen-set module 701 such as the surface where the louvers 211 are mounted. In another alternate embodiment, the tanks of a plurality of gen-set modules 701 can be interconnected through a manifold system, and fluid levels can be centrally monitored using a set of tank-level sensors and replenished manually by an operator or automatically under the control of a central monitoring control system.

In at least some embodiments of the present invention, one or more overhead cable trays 225 are used to carry power output and control signal cables (not shown) within the module 701. Such interconnect cables are connected to the circuit breaker/switchgear panel 708 and communications (comms) box 718 in a given gen-set module 701. In at least some embodiments, the cables are provided as part of a pre-defined power cable and control wire harnesses that are pre-manufactured, pre-installed, and factory verified prior to shipment. A cable slot 226 is arranged in the respective side wall of the container at each end of the cable tray 225 to provide entry and exit of the cables to/from the module 701. As described further elsewhere herein, the cables may be passed through the cable trays of adjacent modules, particularly including other gen-set modules 701, until the cables can be terminated at the equipment located in the transformer/switchgear module 102 and workroom module 103 located on the same level as the corresponding gen-set modules 101. Additionally or alternatively, vertical cable chases (not shown) may be provided to enable interconnect between a gen-set module 701 and the module above and/or below it. Also, in an alternate embodiments (not shown), interconnect cables that are integral to each gen-set module 701 and arranged such that they are terminated in modular connections that can be made by plugs mounted to the exterior walls of each of the gen-set modules 701.

The doorways 204 and cable slots 226 of each module are preferably surrounded by a frame that may be coupled to a corresponding frame on an adjacent module to provide environmental protection for the cable connections and the doorways. In at least some embodiments, one side of the module 701 utilizes an inner frame 228 and the other side of the module 701 utilizes an outer frame 229 such that when the module 701 is placed in side-to-side abutment with another module, the inner frame 228 of one module fits within the outer frame 229 of the other module to surround and protect the inter-module doorway and cable passages. In other embodiments (not shown), the frames on opposing sides may be identical but arranged to couple with each other in a manner providing similar protection.

FIGS. 13A-13F are an isometric view, a top cross-sectional view, a right side view, a left side view, a rear view, and a front view, respectively, of still another one of the gen-set modules 801 of FIG. 1. This gen-set module 801 is a natural gas-powered gen-set module 801. As with the first and second types of gen-set module 101,701, this gen-set module 801 includes a generator 800 housed in a purpose-built ISO intermodal shipping container with limited modifications of options, all in the same space footprint as a conventional ISO intermodal shipping container. In at least one contemplated commercial embodiment, the shipping container footprint is that of a "hi-cube" unit that is eight feet wide, 20 feet long, and 9-foot-6-inches tall; however, other conventional shipping container footprint sizes may additionally or alternatively be utilized.

The container includes a top left side rail 232, a bottom left side rail 230, a top right side rail 233, a bottom right side rail 231, a top rear rail 234, a rear sill 235, a rear left post 236, a rear right post 237, a top front rail 245, a front sill 246, a front left post 247, and a front right post 248. A plurality of walls are supported by the rails, sills, and posts to form a housing; portions or the entirety of each such wall preferably utilize conventional corrugated steel construction, like that of conventional intermodal shipping containers. Conventional (ISO where applicable) corner castings, preferably including both upper and lower corner castings 241,242, are provided to enable the modules 801 to be carried, and preferably stacked, like conventional shipping containers. The modules 801 may thus be hauled by rail, tractor-trailer, ship, and any other conventional mode of shipping container transport. Side attachment fittings 243 are also provided to enable the module 801 to be securely attached to another module placed in side-by-side abutment therewith. Preferably, the side attachment fittings 243 are connected to the conventional corner castings 241,242. In at least some embodiments, a corner casting 241,242 of one module 801 can be attached to a corresponding corner casting 241,242 on the adjacent module via a single side attachment fitting 243. In at least some of these embodiments, the side attachment fittings 243 are provided on the four fixtures 241,242 on one side of the module 801, and the side that is selected is the same for every module such that a proper set of side attachment fittings is always available for side-to-side attachment of adjacent modules.

One or more large ventilation opening in the rear doors or panel, preferably covered by louvers 211, allows ventilation air to circulate through the gen-set module 801, while one or more additional ventilation opening in the front wall, also preferably covered by louvers 814, allows cooling air to circulate to the generator 800 contained inside. The rear ventilation openings preferably occupy substantially all of the area of the rear doors or panel, while the front ventilation openings preferably occupy at least a quarter of the area of the front panel. User access to the interior is generally provided via doorways 204 and a passageway 220; a door 203 is shown in an open position in one of the doorways 204. However, in at least some embodiments, a front panel 815, front louvers 814, and/or rear louvers 211 may be removed, and/or the rear doors (if provided) may be opened, to provide additional access to the contents of the gen-set module 801, allowing access for repair, upgrade or replacement of components.

Figure 13A:
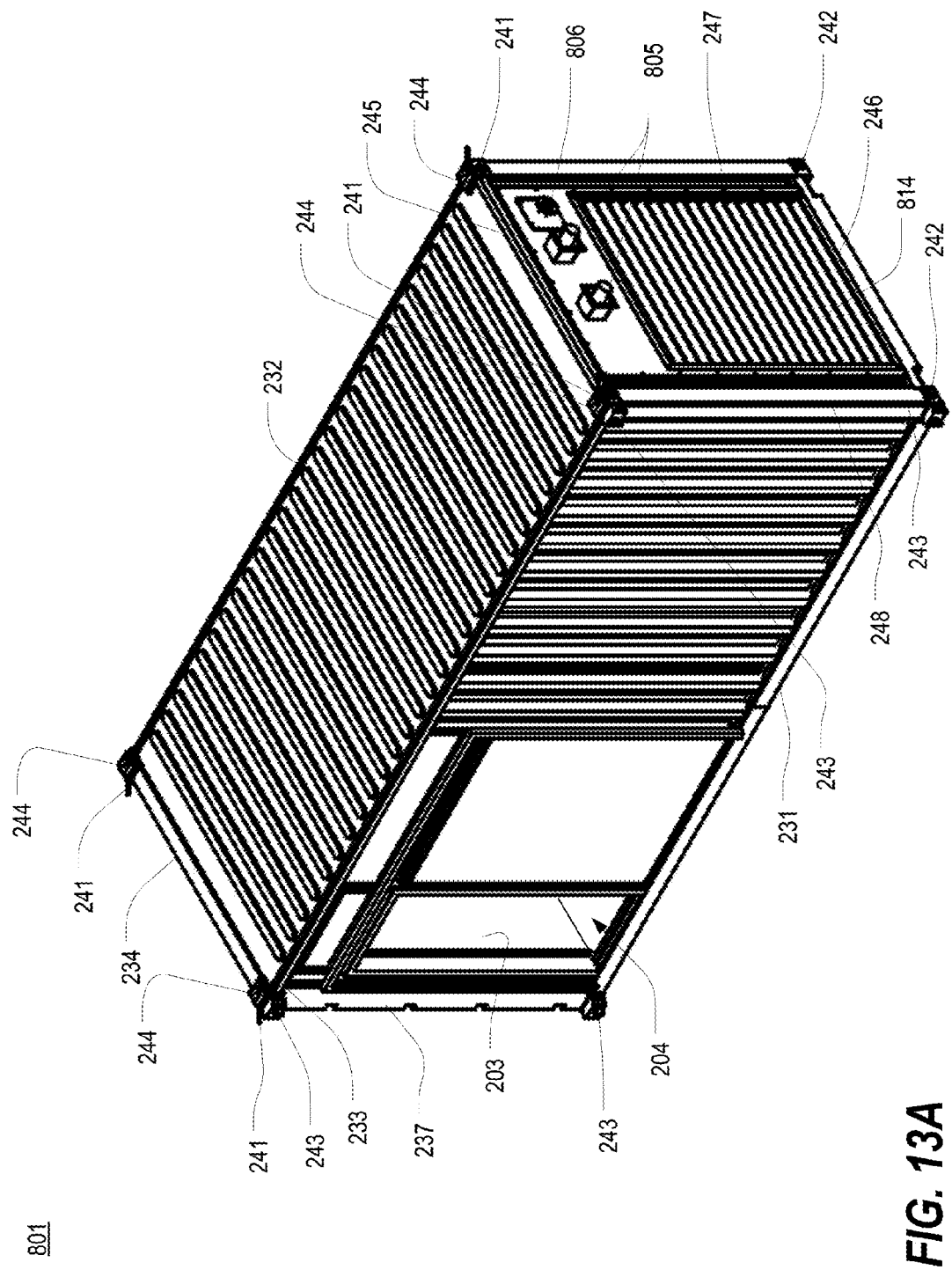
FIG. 13A is an isometric view of another one of the gen-set modules of FIG. 1.
Figure 13B:
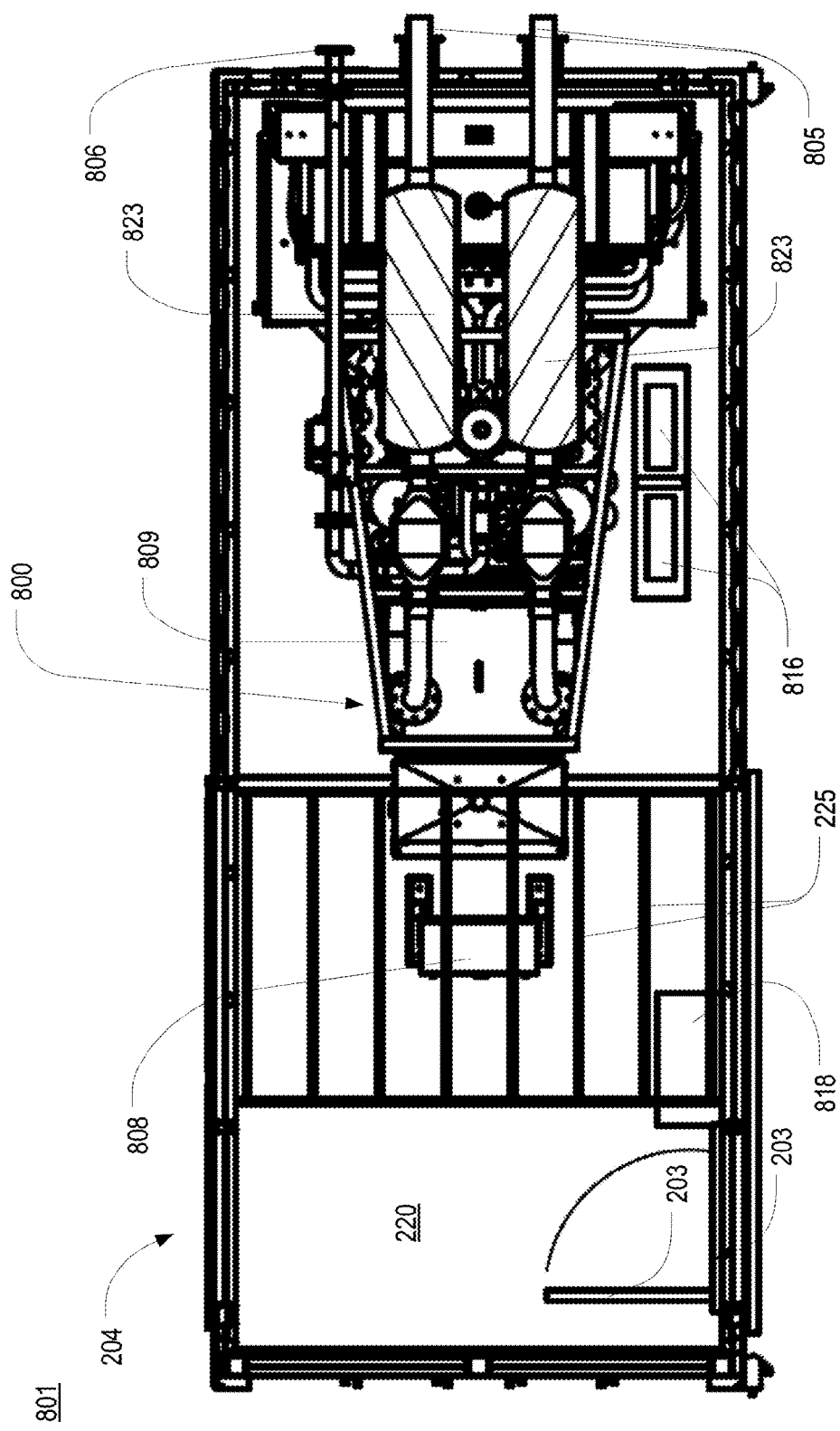
FIG. 13B is a top cross-sectional view of the gen-set module of FIG. 13A, taken along line 13B-13B of FIG. 13D.
Figure 13C:
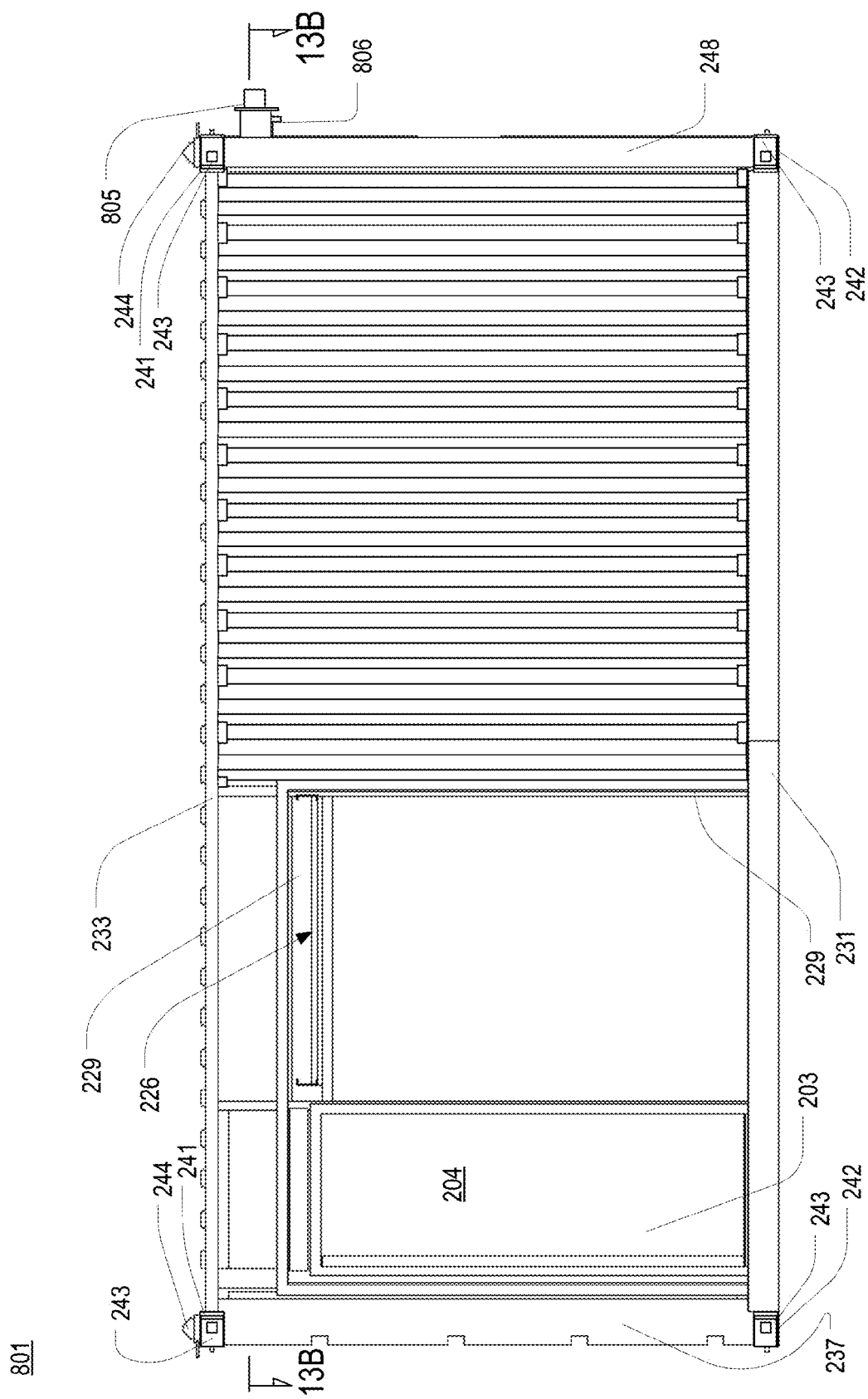
FIG. 13C is a right side view of the gen-set module of FIG. 13A.
Figure 13D:
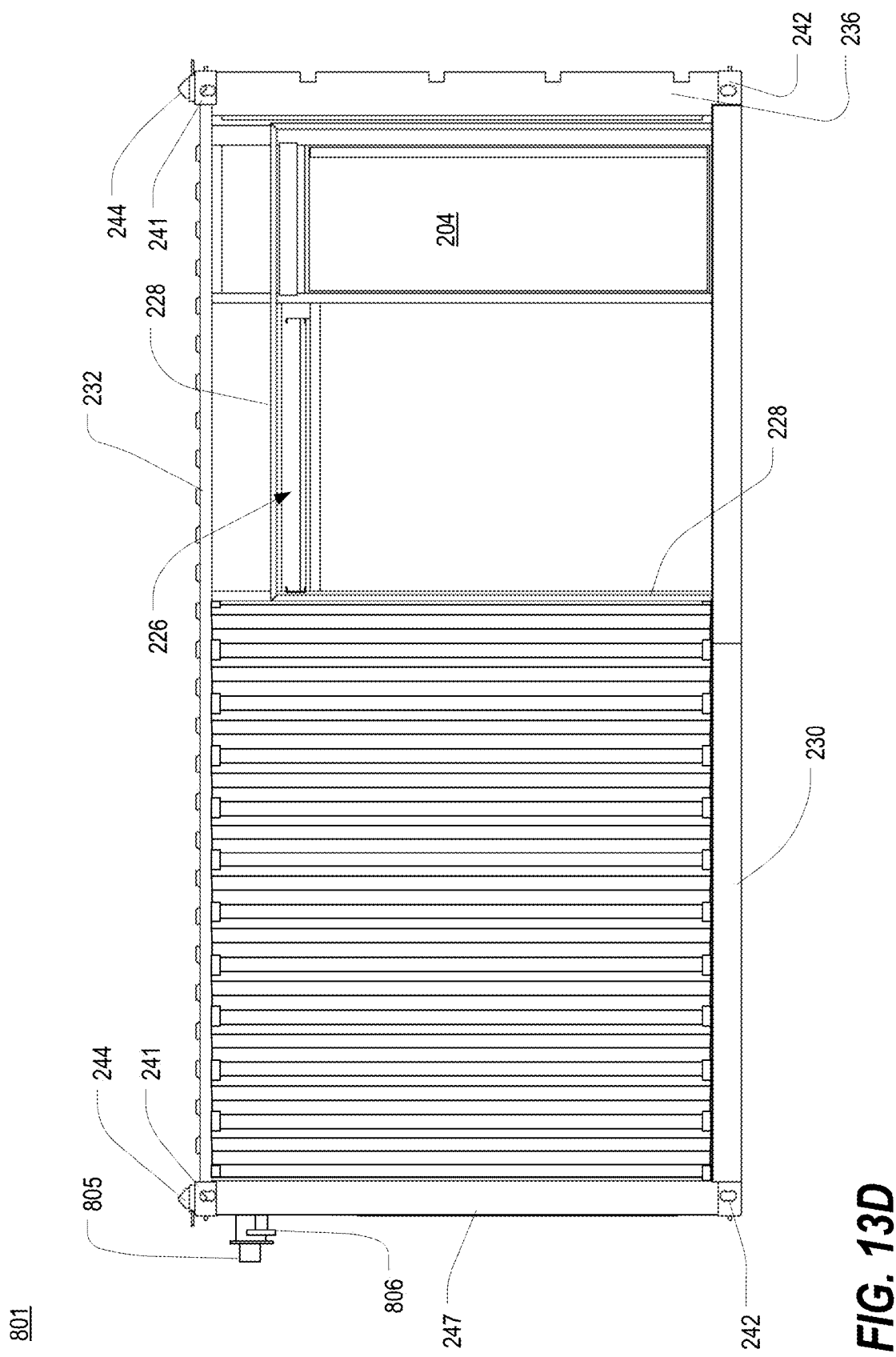
FIG. 13D is a left side view of the gen-set module of FIG. 13A.
Figures 13E, 13F:
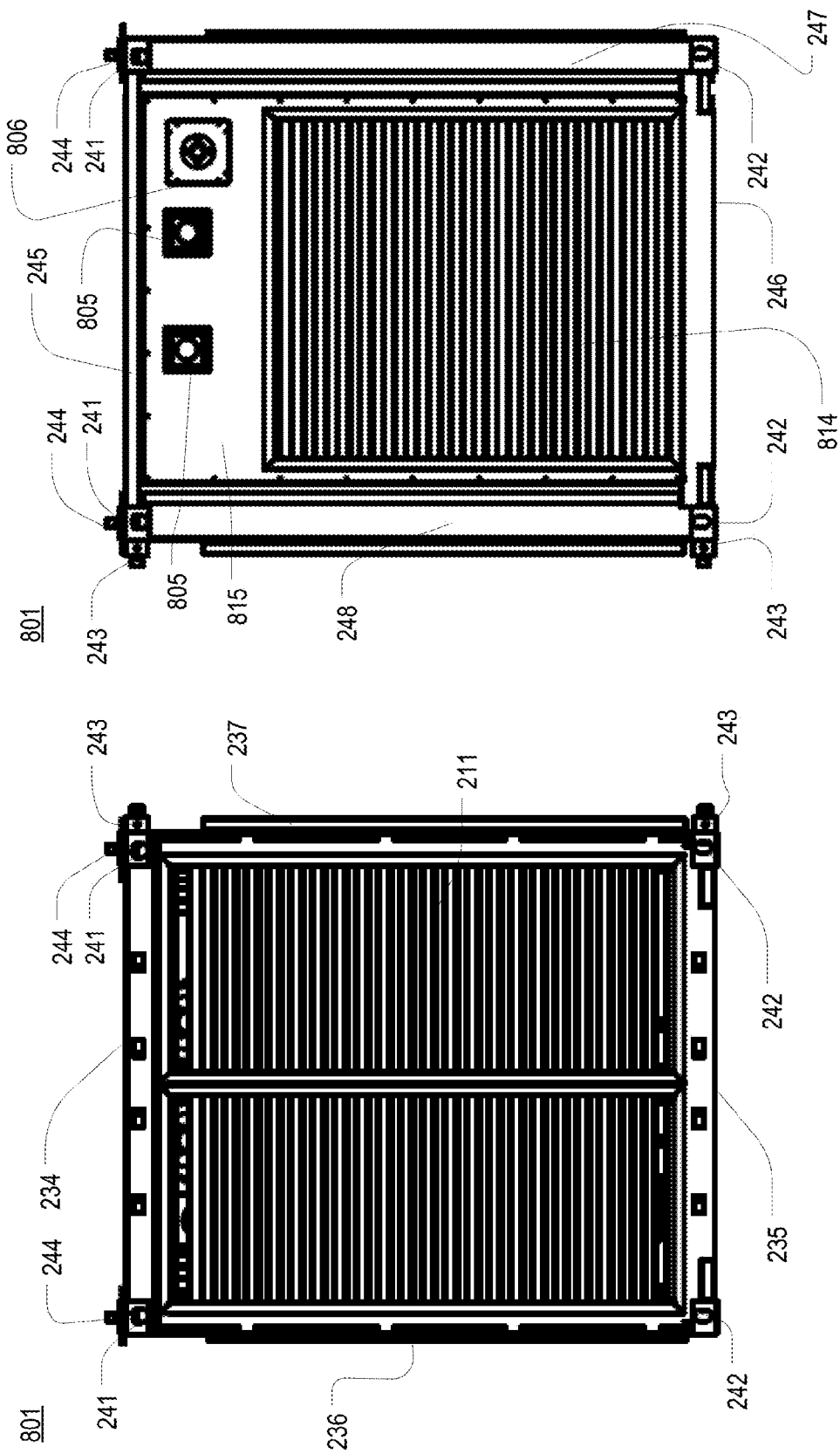
FIG. 13E is rear view of the gen-set module of FIG. 13A.
FIG. 13F is a front view of the gen-set module of FIG. 13A.

As perhaps best shown in the top cross-sectional view of FIG. 13B, the interior of the gen-set module 801 contains an engine-generator 800, an alternator 809, one or more batteries 816, a circuit breaker/switchgear panel 808, a communications (comms) box 818, exhaust pipes 805, a natural gas intake pipe 806, and a passageway 220. Equipment suitable for use includes a dual-unit compressed natural gas (CNG)-powered 400 kW engine manufactured by Power Solutions International (PSI) and a corresponding alternator available from Marathon. Silencers 823 are preferably provided for each unit in such embodiments. The fuel is fed in through the intake pipe 806 from an external tank (not illustrated). In some embodiments, a dedicated external tank for each module 801 is housed in an external fuel tank module, while in some embodiments an external tank is shared by multiple gen-set modules 801. Such a tank might, for example, be housed in the base frame or foundation 110. Also, in various embodiments, some of which are described herein, a generator may be provided that is gasoline fired, natural gas fired, propane fired, fuel oil fired, or fired by any other type of fuel. In various embodiments, the generators can be high-efficiency and rated for continuous use, or can be lower efficiency rated for non-continuous use.

In at least some embodiments of the present invention, one or more overhead cable trays 225 are used to carry power output and control signal cables (not shown) within the module 801. Such interconnect cables are connected to the circuit breaker/switchgear panel 808 and communications (comms) box 818 in a given gen-set module 801. In at least some embodiments, the cables are provided as part of a pre-defined power cable and control wire harnesses that are pre-manufactured, pre-installed, and factory verified prior to shipment. A cable slot 226 is arranged in the respective side wall of the container at each end of the cable tray 225 to provide entry and exit of the cables to/from the module 801. As described further elsewhere herein, the cables may be passed through the cable trays of adjacent modules, particularly including other gen-set modules 801, until the cables can be terminated at the equipment located in the transformer/switchgear module 102 and workroom module 103 located on the same level as the corresponding gen-set modules 101. Additionally or alternatively, vertical cable chases (not shown) may be provided to enable interconnect between a gen-set module 801 and the module above and/or below it. Also, in an alternate embodiments (not shown), interconnect cables that are integral to each gen-set module 801 and arranged such that they are terminated in modular connections that can be made by plugs mounted to the exterior walls of each of the gen-set modules 801.

The doorways 204 and cable slots 226 of each module are preferably surrounded by a frame that may be coupled to a corresponding frame on an adjacent module to provide environmental protection for the cable connections and the doorways. In at least some embodiments, one side of the module 801 utilizes an inner frame 228 and the other side of the module 801 utilizes an outer frame 229 such that when the module 801 is placed in side-to-side abutment with another module, the inner frame 228 of one module fits within the outer frame 229 of the other module to surround and protect the inter-module doorway and cable passages. In other embodiments (not shown), the frames on opposing sides may be identical but arranged to couple with each other in a manner providing similar protection.

FIGS. 14A-14F are an isometric view, a top cross-sectional view, a right side view, a left side view, a rear view, and a front view, respectively, of still another one of the gen-set modules 901 of FIG. 1. As with the first, second, and third types of gen-set module 101,701,801, this gen-set module 901 includes a generator 900 housed in a purpose-built ISO intermodal shipping container with limited modifications of options, all in the same space footprint as a conventional ISO intermodal shipping container. In at least one contemplated commercial embodiment, the shipping container footprint is that of a "hi-cube" unit that is eight feet wide, 20 feet long, and 9-foot-6-inches tall; however, other conventional shipping container footprint sizes may additionally or alternatively be utilized.

The container includes a top left side rail 232, a bottom left side rail 230, a top right side rail 233, a bottom right side rail 231, a top rear rail 234, a rear sill 235, a rear left post 236, a rear right post 237, a top front rail 245, a front sill 246, a front left post 247, and a front right post 248. A plurality of walls are supported by the rails, sills, and posts to form a housing; portions or the entirety of each such wall preferably utilize conventional corrugated steel construction, like that of conventional intermodal shipping containers. Conventional (ISO where applicable) corner castings, preferably including both upper and lower corner castings 241,242, are provided to enable the modules 901 to be carried, and preferably stacked, like conventional shipping containers. The modules 901 may thus be hauled by rail, tractor-trailer, ship, and any other conventional mode of shipping container transport. Side attachment fittings 243 are also provided to enable the module 901 to be securely attached to another module placed in side-by-side abutment therewith. Preferably, the side attachment fittings 243 are connected to the conventional corner castings 241,242. In at least some embodiments, a corner casting 241,242 of one module 901 can be attached to a corresponding corner casting 241,242 on the adjacent module via a single side attachment fitting 243. In at least some of these embodiments, the side attachment fittings 243 are provided on the four fixtures 241,242 on one side of the module 901, and the side that is selected is the same for every module such that a proper set of side attachment fittings is always available for side-to-side attachment of adjacent modules.

One or more large ventilation opening in the rear doors or panel, preferably covered by louvers 211, allows ventilation air to circulate through the gen-set module 901, while one or more additional ventilation opening in the front wall, also preferably covered by louvers 914, allows cooling air to circulate to the generator 900 contained inside. The rear ventilation openings preferably occupy substantially all of the area of the rear doors or panel, while the front ventilation openings preferably occupy at least a quarter of the area of the front panel. User access to the interior is generally provided via doorways 904 and a passageway 920; doors (not shown) may be provided for the doorways 904. However, in at least some embodiments, a front panel, front louvers 914, and/or rear louvers 211 may be removed, and/or the rear doors (if provided) may be opened, to provide additional access to the contents of the gen-set module 901, allowing access for repair, upgrade or replacement of components.

Figure 14A:
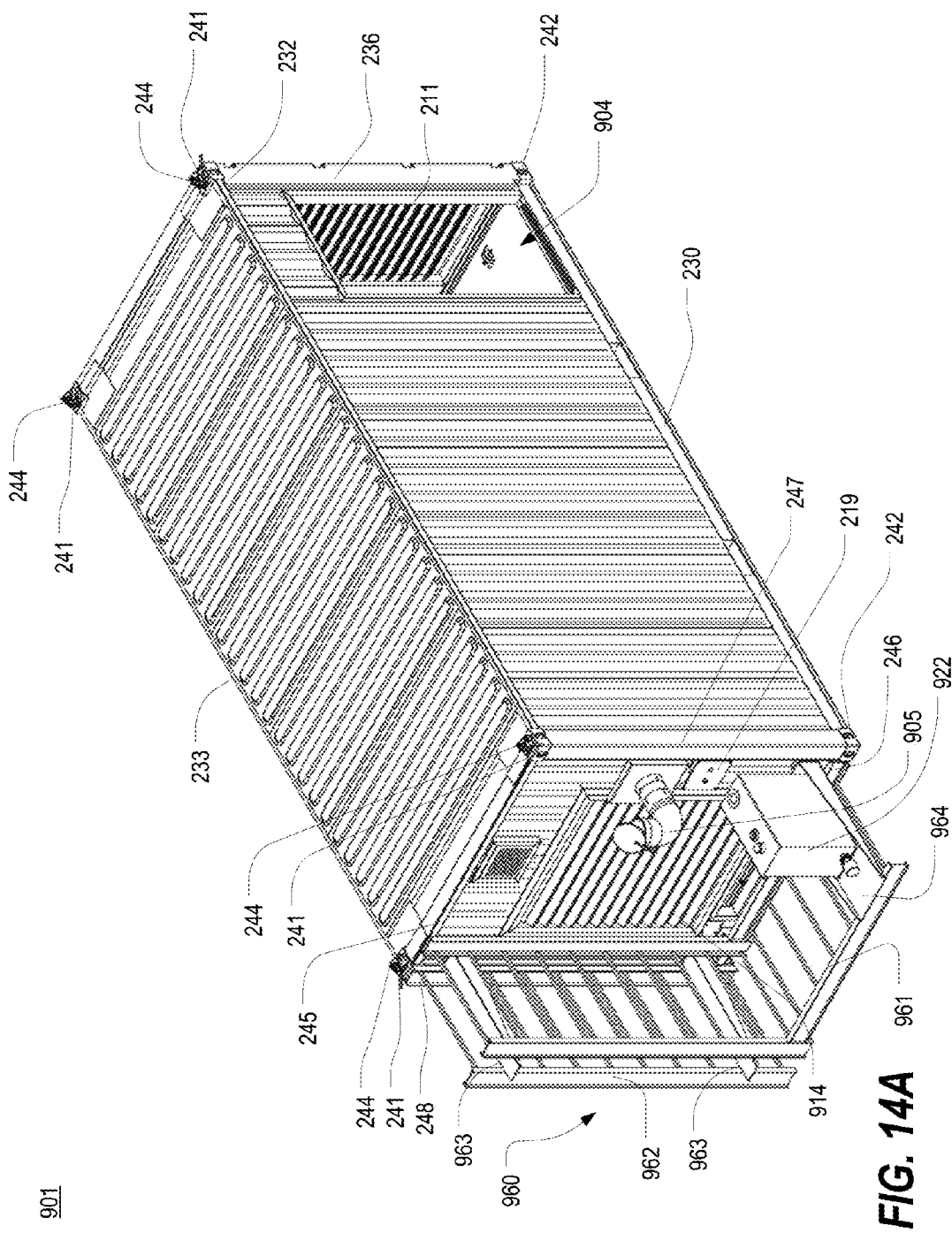
FIG. 14A is an isometric view of still another one of the gen-set modules of FIG. 1.
Figure 14B:
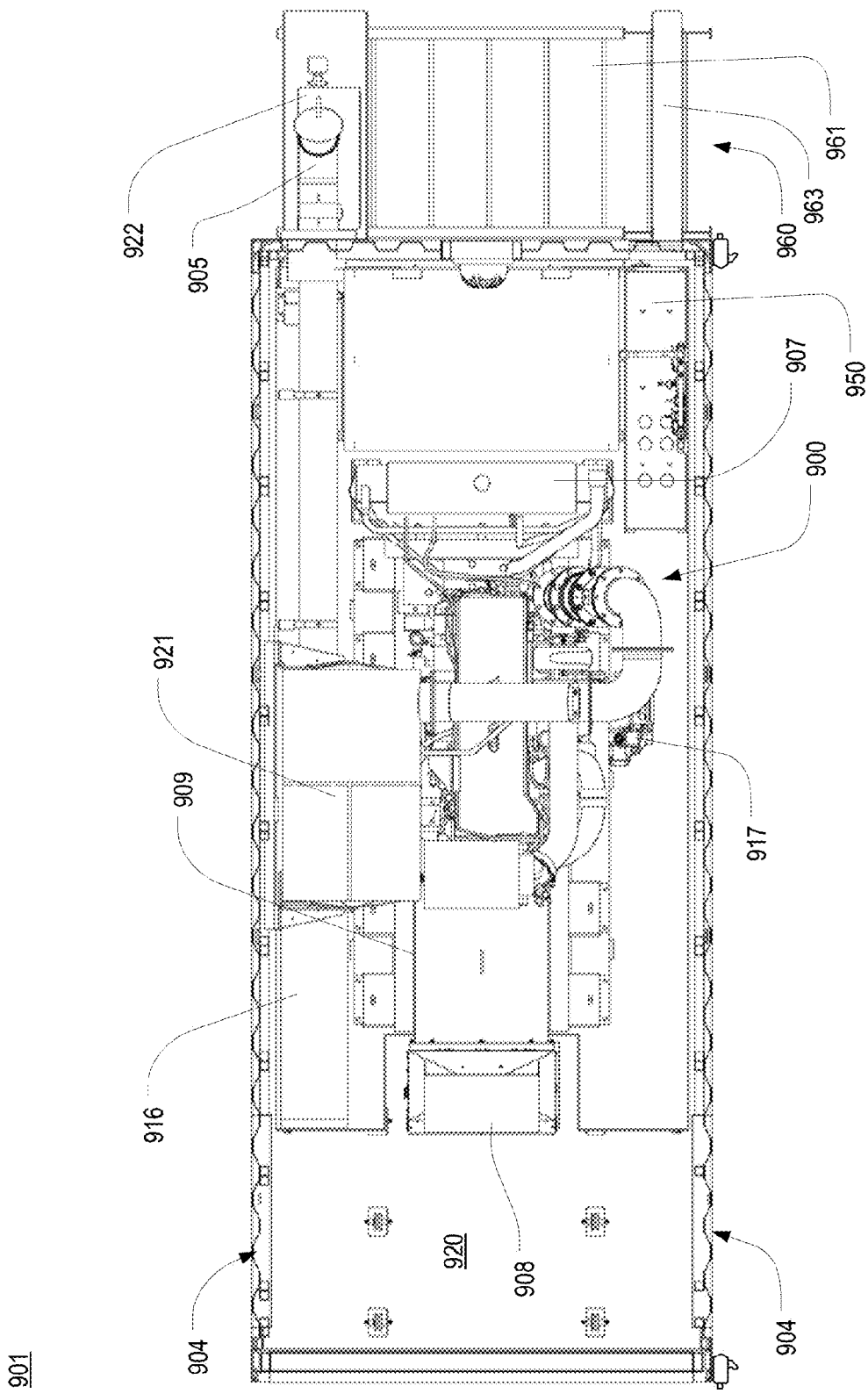
FIG. 14B is a top cross-sectional view of the gen-set module of FIG. 14A.
Figure 14C:
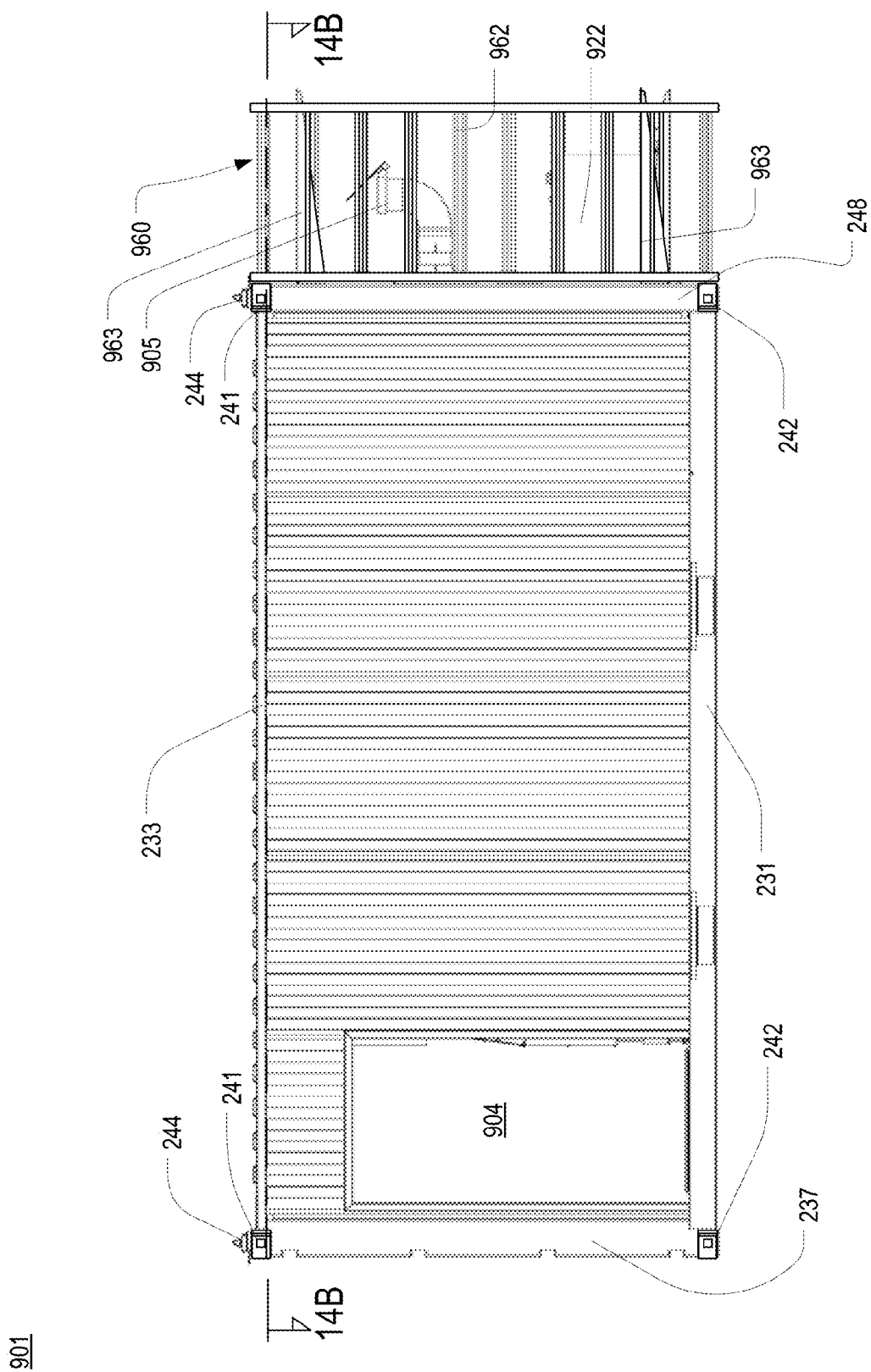
FIG. 14C is a right side view of the gen-set module of FIG. 14A.
Figure 14D:
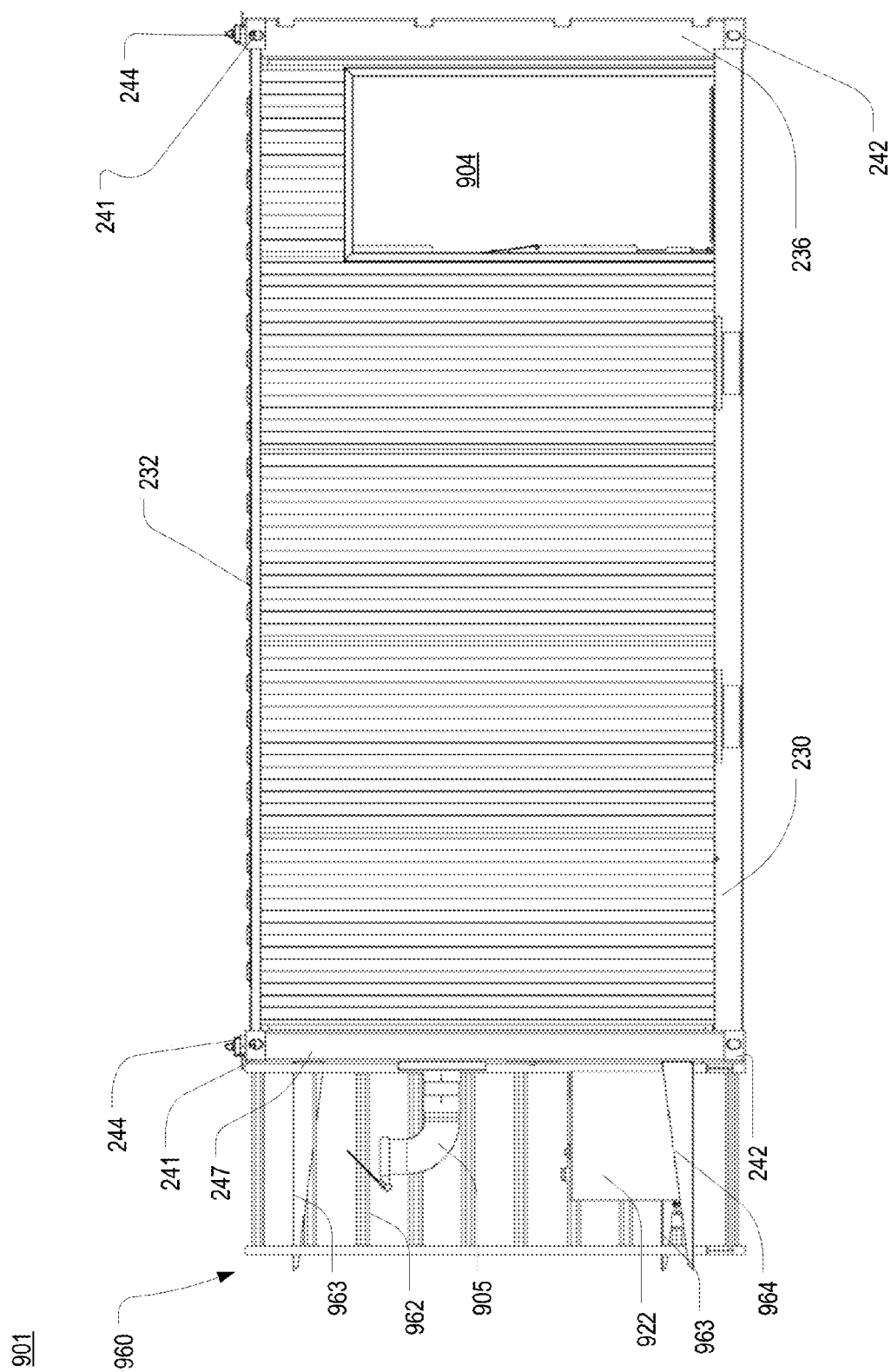
FIG. 14D is a left side view of the gen-set module of FIG. 14A.
Figures 14E, 14F:
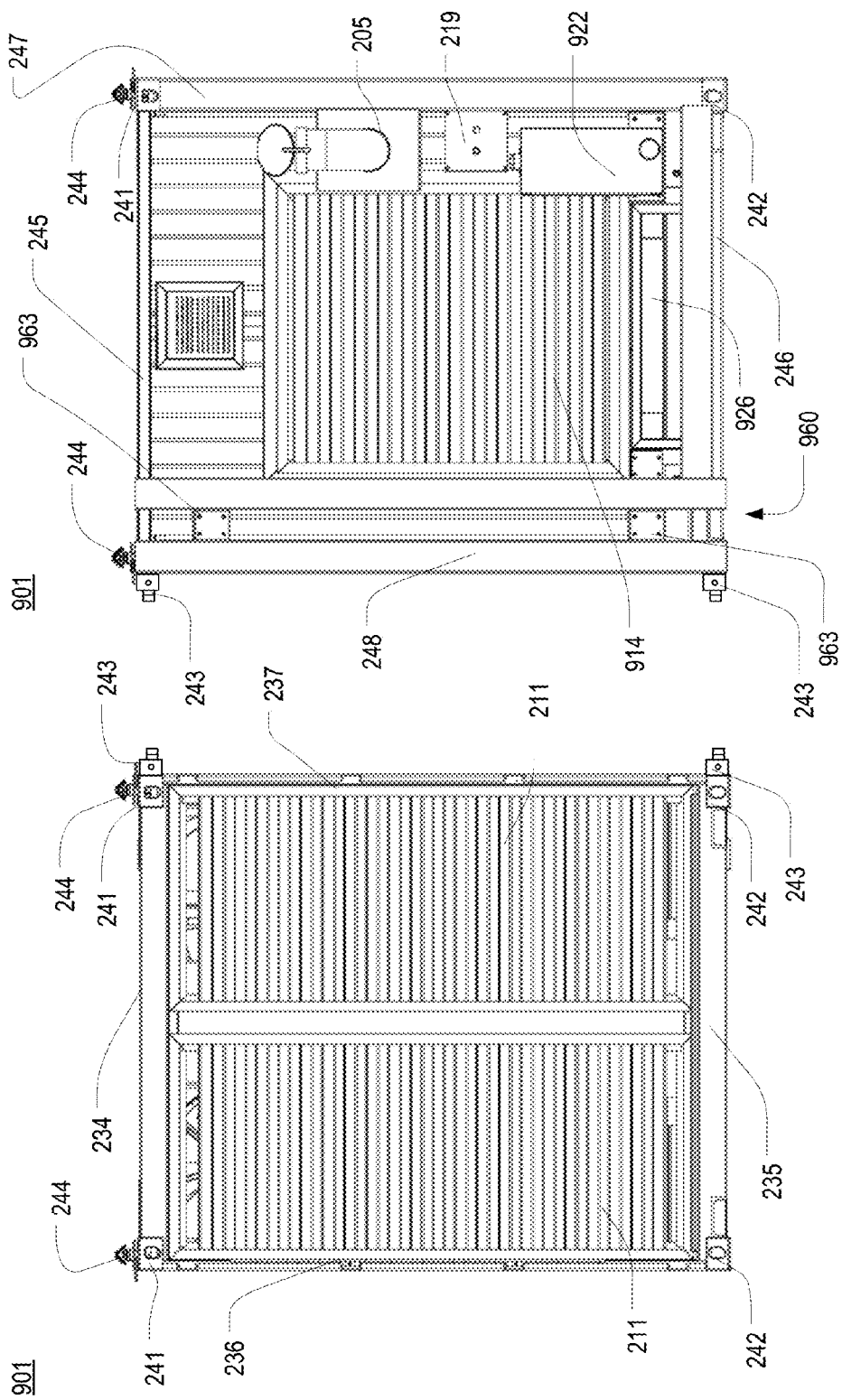
FIG. 14E is a rear view of the gen-set module of FIG. 14A.
FIG. 14F is a front view of the gen-set module of FIG. 14A.
Figure 15A:
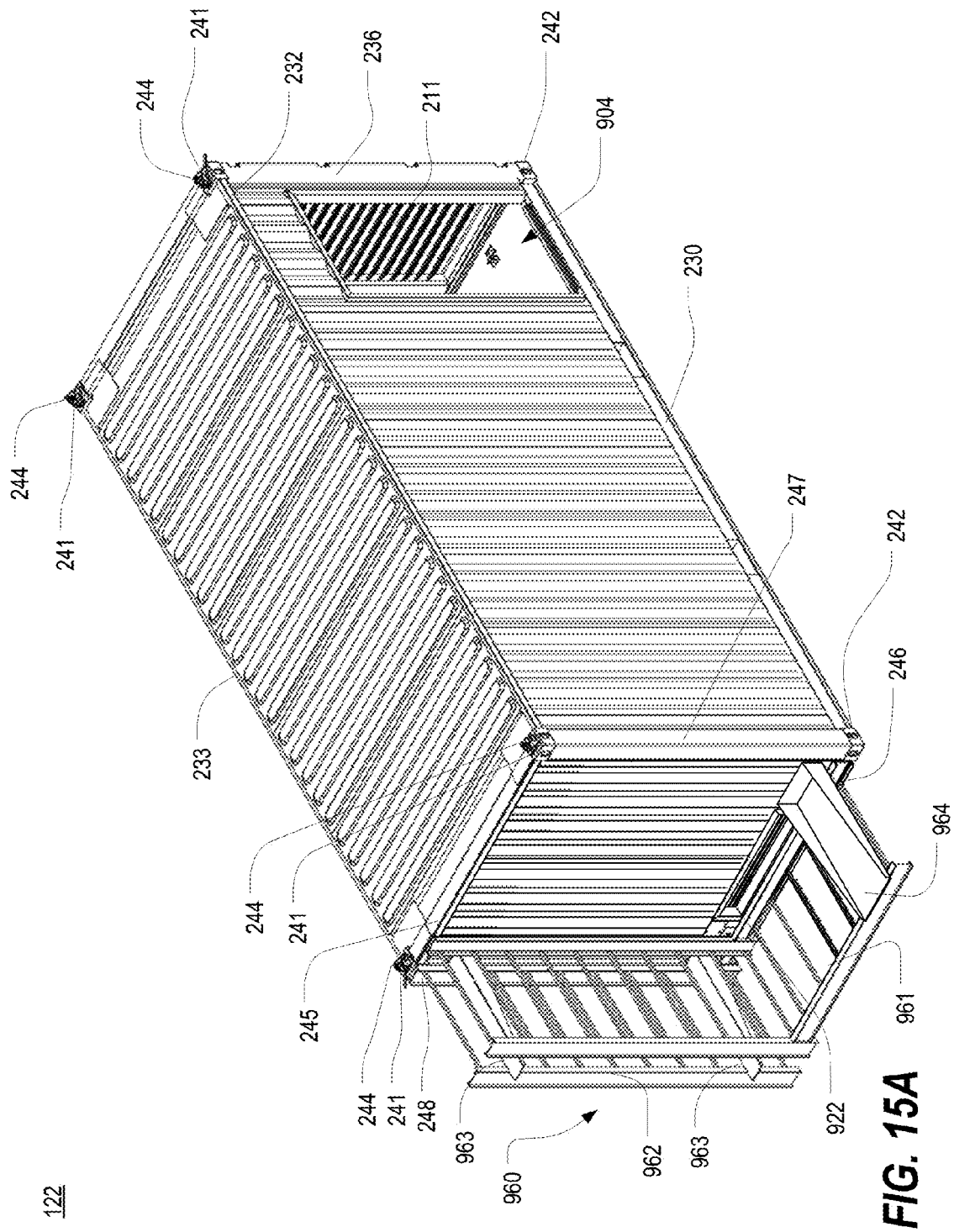
FIG. 15A is an isometric view of another switchgear/workroom module of FIG. 1.
Figure 15B:
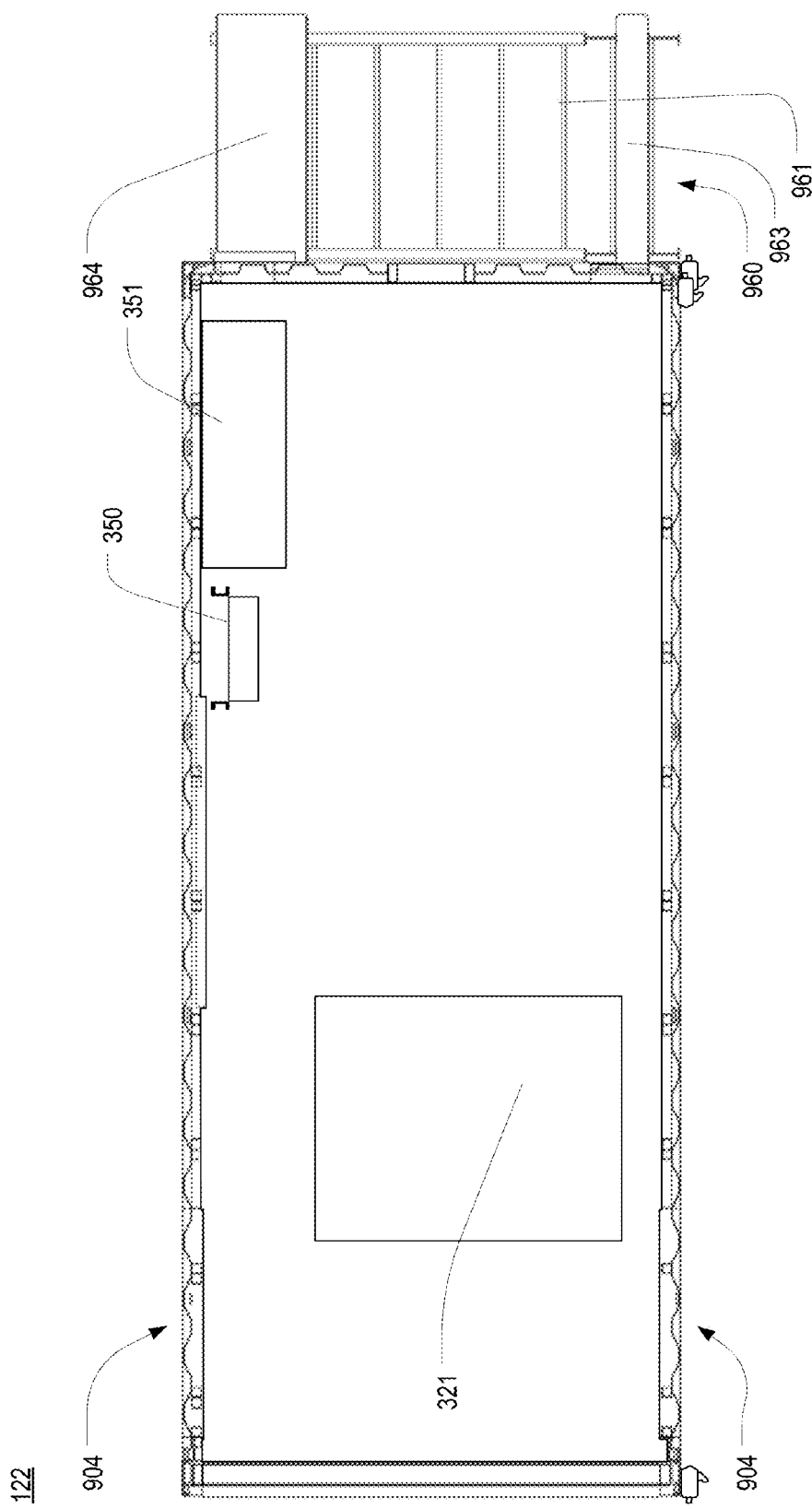
FIG. 15B is a top cross-sectional view of the switchgear/workroom module of FIG. 15A.
Figure 15C:
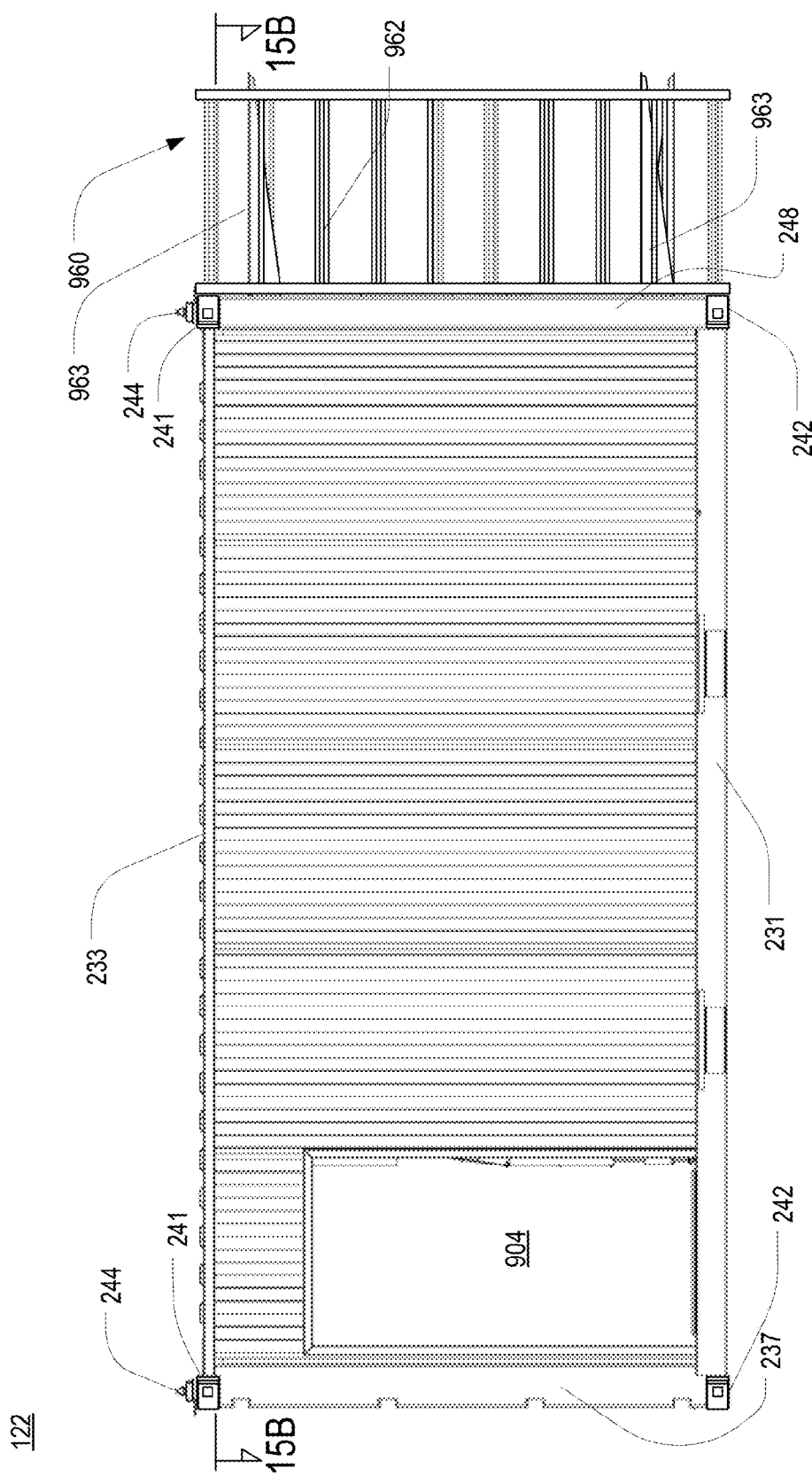
FIG. 15C is a right side view of the switchgear/workroom module of FIG. 15A.
Figure 15D:
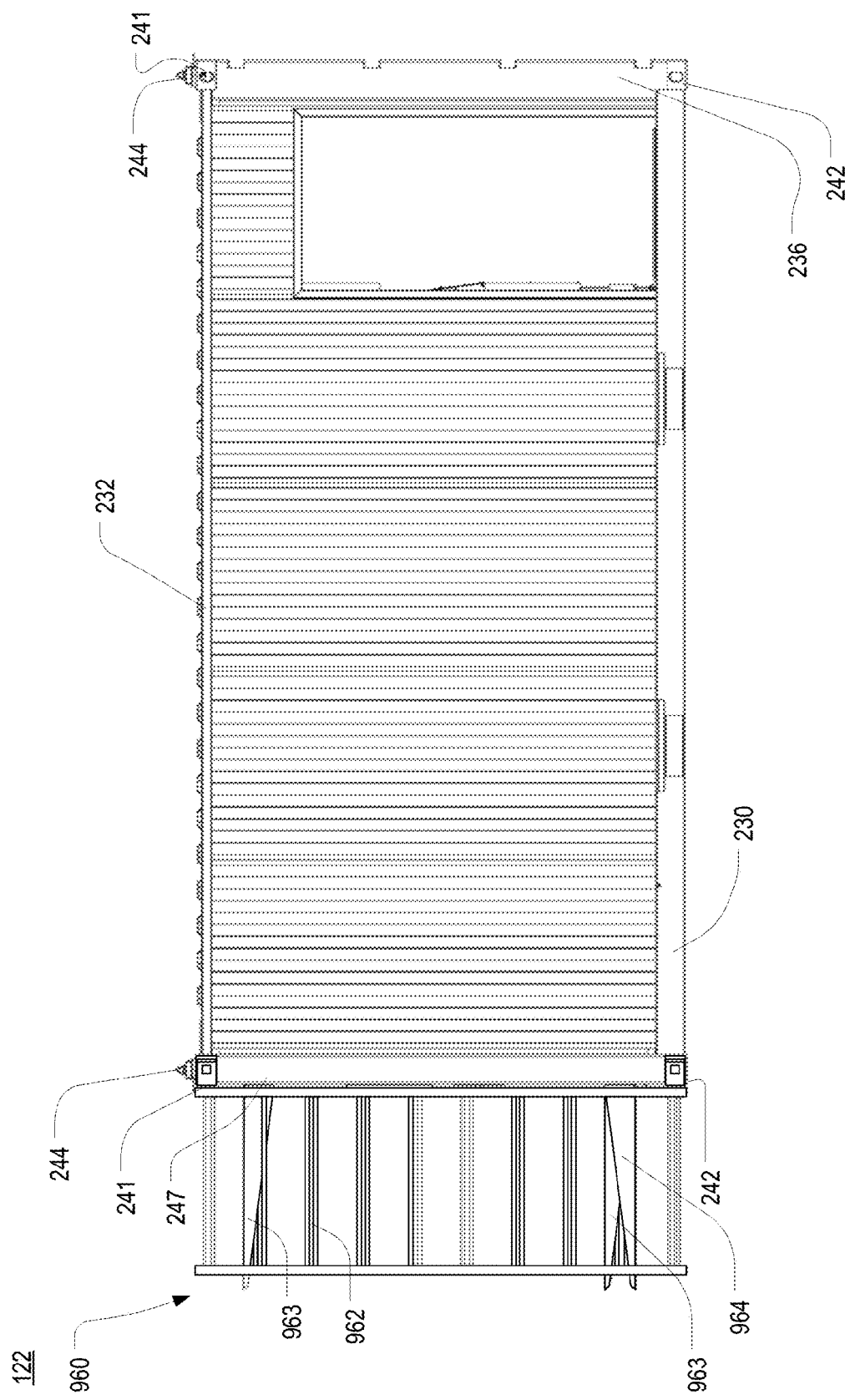
FIG. 15D is a left side view of the switchgear/workroom module of FIG. 15A.
Figures 15E, 15F:
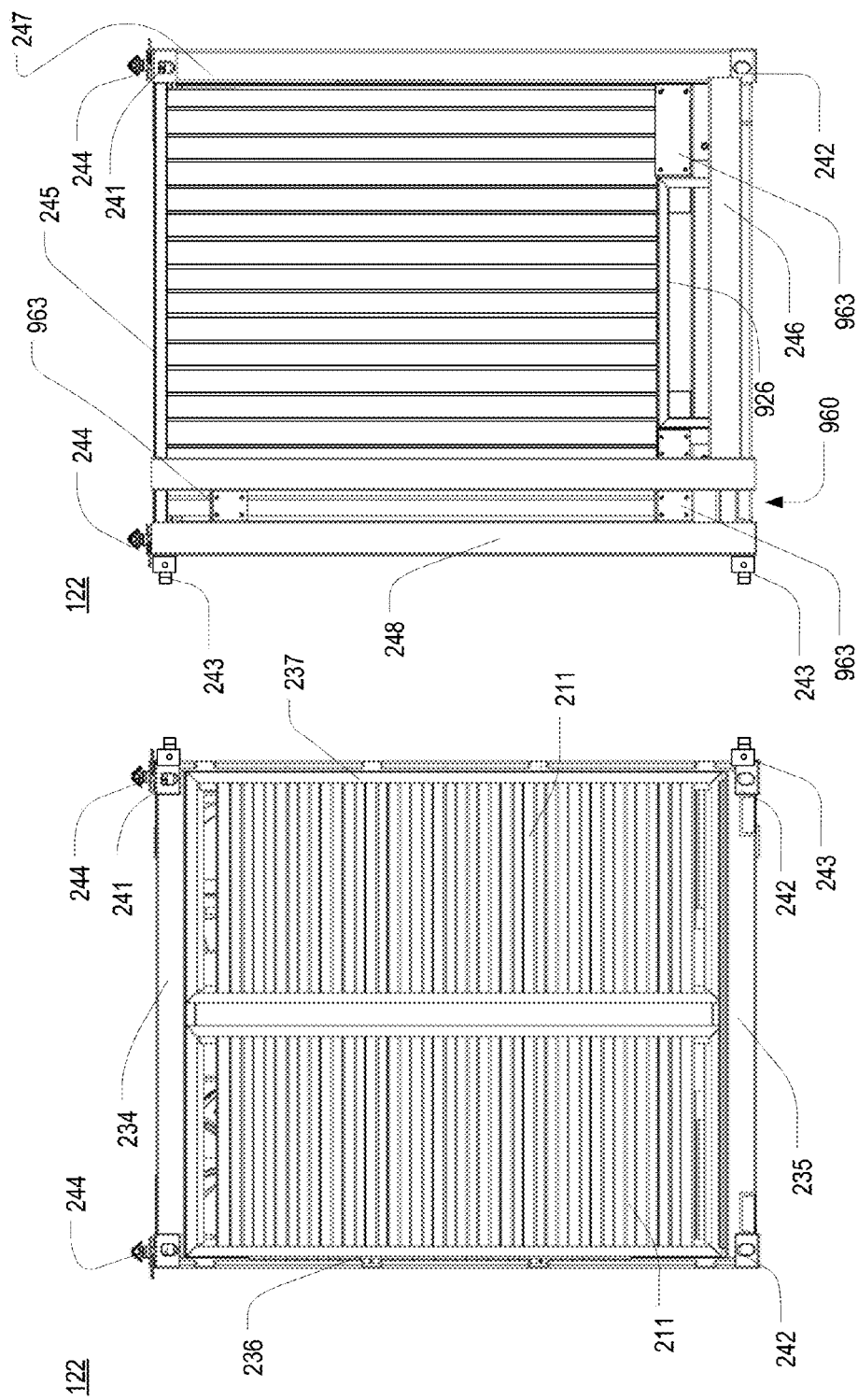
FIG. 15E is a rear view of the switchgear/workroom module of FIG. 15A.
FIG. 15F is a front view of the switchgear/workroom module of FIG. 15A.

As perhaps best shown in the top cross-sectional view of FIG. 14B, the interior of the gen-set module 901 contains a generator 900, an alternator 909, one or more batteries 916, a "hotstart" heating/starting system 917, a cooling radiator 907, a circuit breaker/switchgear panel 908, a communications (comms) box (not shown), a fuel tank 950, and an exhaust pipe 905. In at least some contemplated commercial embodiments, the generator 900 is diesel-fired and satisfies the EPA Tier 4 Final emissions standards. Equipment suitable for use includes a Tier 4 (625 kW) engine available from Volvo and a corresponding alternator available from Marathon; such engine and alternator may be similar to those of the gen-set module 201 of FIG. 2B. In at least some embodiments, a selective catalyst reduction (SCR) system 921 and diesel exhaust fluid (DEF) (urea) tank 922 are provided in order to help meet Tier 4 emission level requirements. The SCR system 921 is disposed inside the container, adjacent the generator 900, but the DEF tank 922 is located outside the ISO container in order to facilitate ease of connection to main supply infrastructure and to provide greater internal module space for operation and maintenance access. In at least some such embodiments, standard harnesses and plumbing as provided by the engine manufacturer are utilized without modification.

Unlike the other gen-set modules 101,701,801 shown in FIG. 1, the gen-set modules 901 of FIGS. 14A-14F includes an external superstructure 960 extending horizontally from the front of the module 901. The superstructure 960 may include various support elements and combinations thereof, including horizontal ladder structures 961, vertical ladder structures 962, individual cantilever beams 963 and plates 964, and the like. The superstructure 960 is preferably arranged so as not to interfere with the front louvers 914, the exhaust pipe 905, and various other access openings that may be provided in/through the front of the container. The various elements of the superstructure may be used to support various components, particularly (although not necessarily exclusively) including components connected or otherwise interfaced with components disposed within the container. Notably, use of the superstructure 960 enables some components that would otherwise be housed within the container to be located outside the container instead, thus freeing up internal module space for operation and maintenance access.

The filling of the tank 950 may be accomplished via a filling port in the front end of the container, via a supply hose installed or temporarily passed through an access opening in the front end of the container, through a doorway 904, or via some other opening. In an alternate embodiment, the tanks of a plurality of gen-set modules 901 can be interconnected through a manifold system, and fluid levels can be centrally monitored using a set of tank-level sensors and replenished manually by an operator or automatically under the control of a central monitoring control system.

In at least some embodiments of the present invention, the horizontal ladder structures 961, the vertical ladder structures 962, or both, are adapted to serve as cable trays and may be used to carry power output and control signal cables (not shown). Such cables may be routed laterally (such as to or from an adjacent module located to the side of the module 901), vertically (such as to or from an adjacent module located above or below the module 901), or both. Furthermore, such cables may or may not interconnect with the module 901 itself; they may in some cases simply pass by. Cables that interconnect with the module 901 itself are connected to the circuit breaker/switchgear panel 908, communications (comms) box, and the like. In at least some embodiments, the cables are provided as part of a predefined power cable and control wire harnesses that are pre-manufactured, pre-installed, and factory verified prior to shipment. A cable slot 926 is preferably arranged in the front end wall of the container, adjacent one or both ladder structures 961,962 (preferably just above the horizontal ladder structure 962) to provide entry and exit of the cables to/from the module 901. As described further elsewhere herein, the cables may, for example, be passed along the horizontal ladder structures 962 of adjacent modules until the cables can be terminated at the equipment located in the transformer/switchgear module 102 and workroom module 103 located on the same level as the corresponding gen-set modules 901. Alternatively, as described further elsewhere herein, the cables may, for example, be passed along the vertical ladder structures 961 of adjacent modules until the cables can be terminated at the equipment located in the switchgear module 112 located in the same stack (module column) as the corresponding gen-set modules 901. Additionally or alternatively, vertical cable chases (not shown) may be provided in the top wall, bottom wall, or both to enable interconnect between a gen-set module 901 and the module above and/or below it. Also, in an alternate embodiments (not shown), interconnect cables that are integral to each gen-set module 901 and arranged such that they are terminated in modular connections that can be made by plugs mounted to the exterior walls of each of the gen-set modules 901.

When a modular power generation facility makes use of gen-set modules that have a superstructure that includes elements like horizontal ladder structures 961, vertical ladder structures 962, and/or other support structures, and particularly support structures that are used to support cables, hoses, or other components that extend between modules, it may be preferable to utilize such a superstructure on other types of modules in the facility as well. In this regard, FIGS. 15A-15F are an isometric view, a top cross-sectional view, a right side view, a left side view, a rear view, and a front view of another switchgear/workroom module 122 of FIG. 1. This switchgear/workroom module 122 has internal components similar to those of the other switchgear/workroom module 112 of FIGS. 4A-4F, but utilizes a container and superstructure 960 that is similar in many ways to that of the gen-set module 901 of FIGS. 14A-14F.

Figure 16:
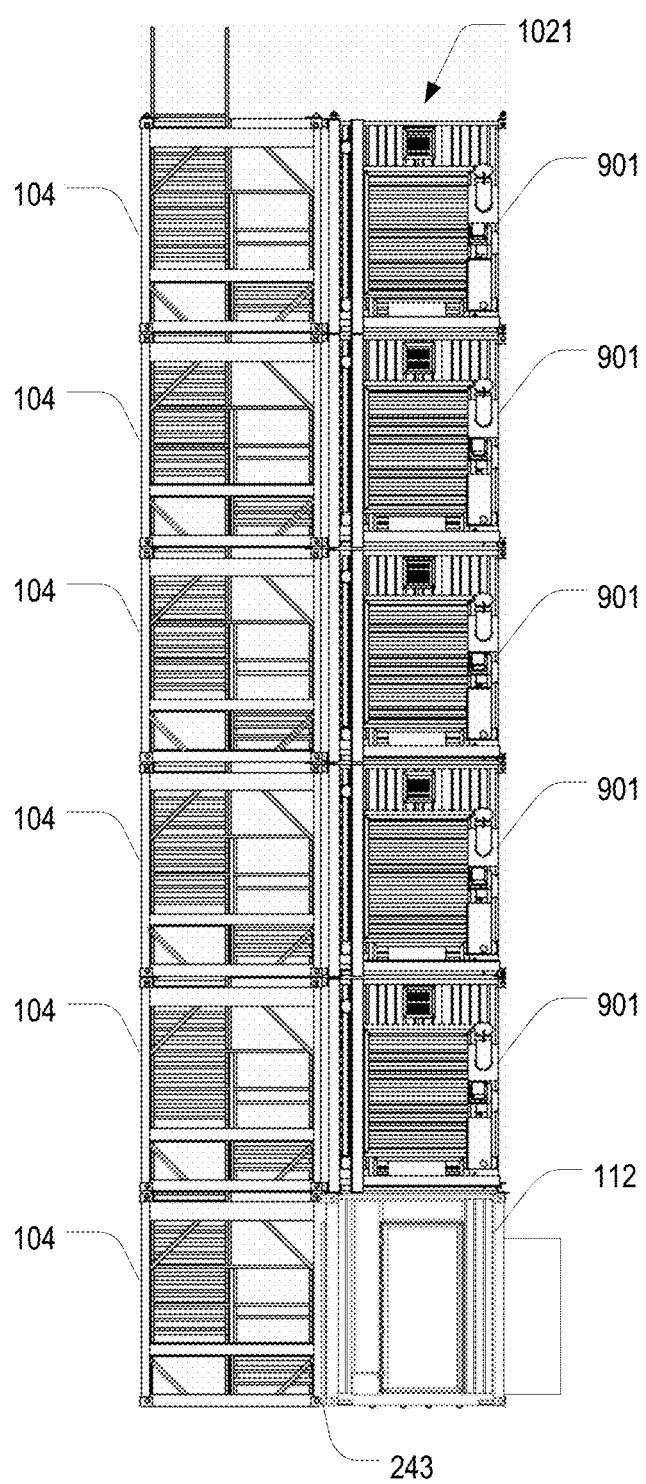
FIG. 16 is a rear view of a fifth exemplary modular power generation facility constructed using the building block modules of FIG. 1, all according to one or more preferred embodiments of the present invention.

Exemplary modular power generation facilities described thus far have utilized multiple gen-set modules positioned side-by-side and ganged together with an adjacent transformer/switchgear module 102 (or switchgear/workroom module 112) such that all of the modules are arranged in a single level. However, in other embodiments, multiple gen-set modules may be stacked on top of each other and ganged together with a switchgear module such that all of the modules are arranged in a single column. In this regard, FIG. 16 is a front view of a fifth exemplary modular power generation facility 1004 constructed using the building block modules of FIG. 1, all according to one or more preferred embodiments of the present invention. In this exemplary facility 1004, five gen-set modules 901 are stacked on top of a switchgear/workroom module 112 in a single column 1021. With the modules 901,112 positioned and leveled, twist lock fasteners or other mechanisms 244 are used to secure each module to the one below it, thus creating a substantially modular enclosure. In addition, to provide user access to the upper modules, six staircase modules 104 are stacked on top of each other immediately adjacent the stack of gen-set modules 901. Twist lock fasteners or other mechanisms 244 are likewise used to secure each staircase module 104 to the one below it, and side attachment fittings 243 are used to secure the sides of the staircase modules 104 to the stack of gen-set modules 901.

In the arrangement of FIG. 16, it is anticipated that each column of modules operates to at least some degree as a functional unit, wherein the gen-set modules 901 are ganged together with the switchgear/workroom module 112 and the switchgear forms part of the control system used to effectuate operation of the modules on that particular level in the facility. In such an arrangement, each column of modules may operate with some degree of independence from other columns of modules, and although some elements of common control may be provided (such as monitoring functions), overall control is provided on a column-by-column basis. However, in various modular power generation facility embodiments, other arrangements may alternatively be utilized, including arrangements, described elsewhere herein, wherein rows or levels of modules, rather than columns, may operate as functional units.

Figure 17A:
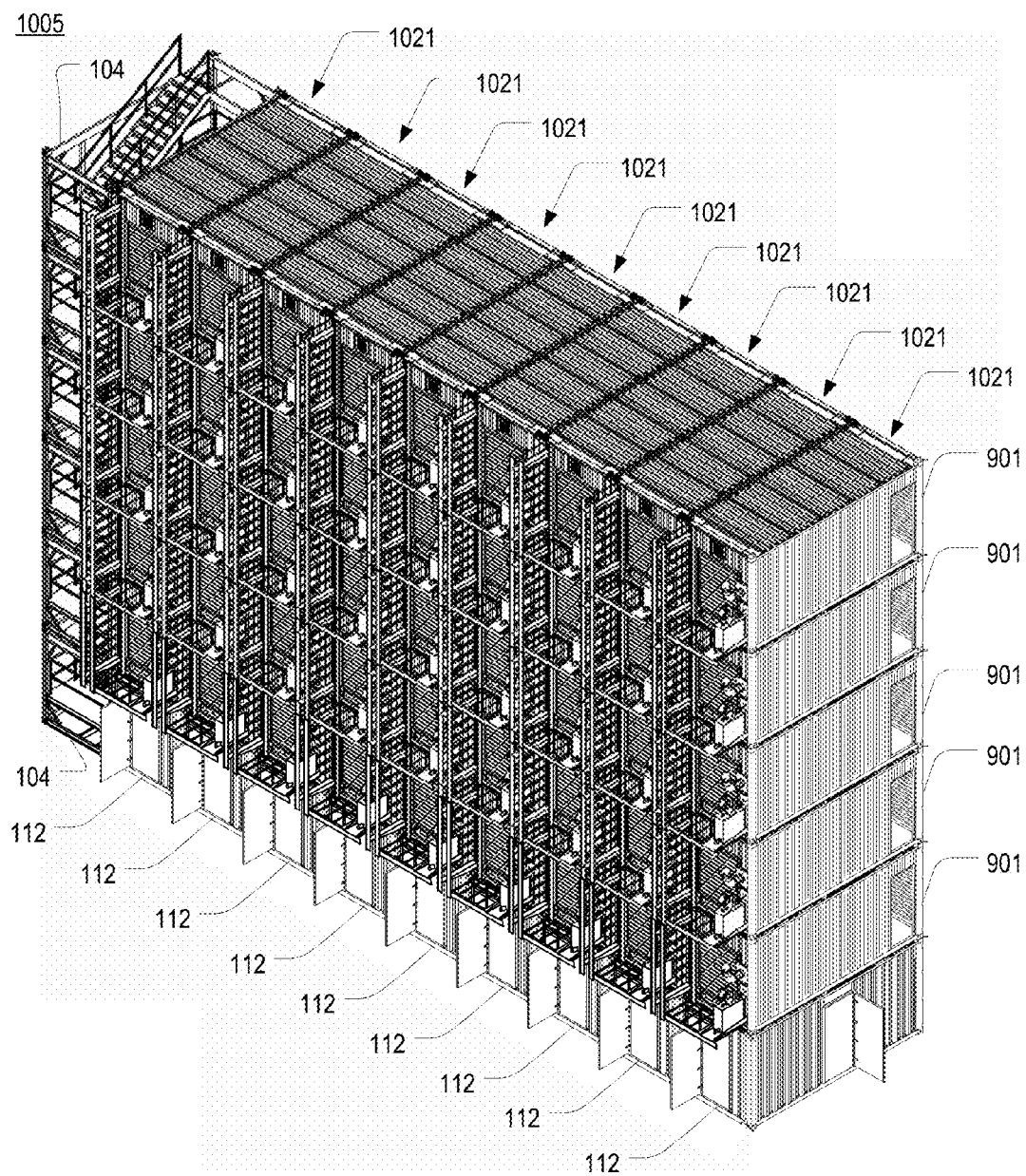
FIG. 17A is an isometric view of a sixth exemplary modular power generation facility constructed using the building block modules of FIG. 1.
Figure 17B:
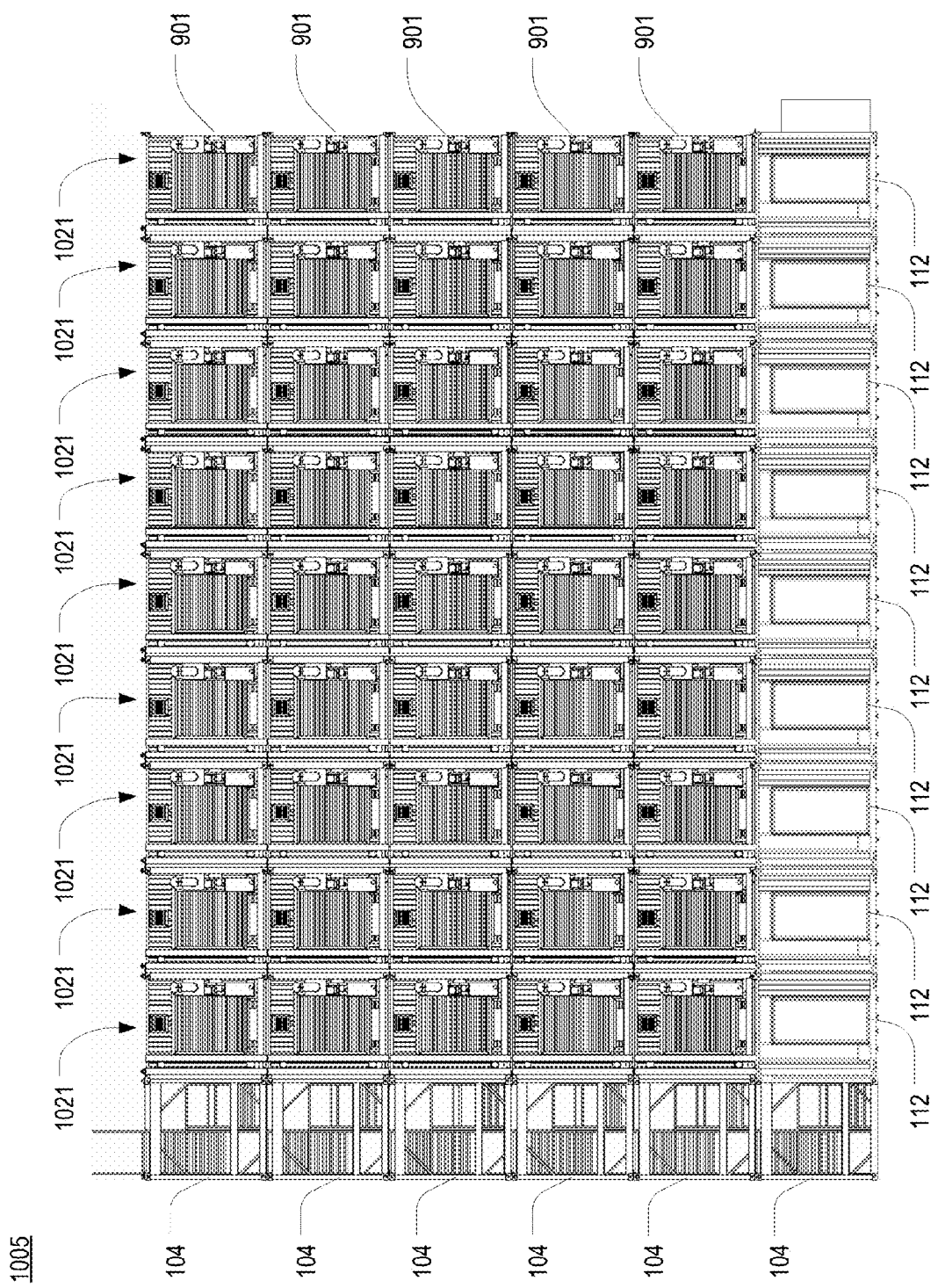
FIG. 17B is a front view of the exemplary modular power generation facility of FIG. 17A.
Figure 18A:
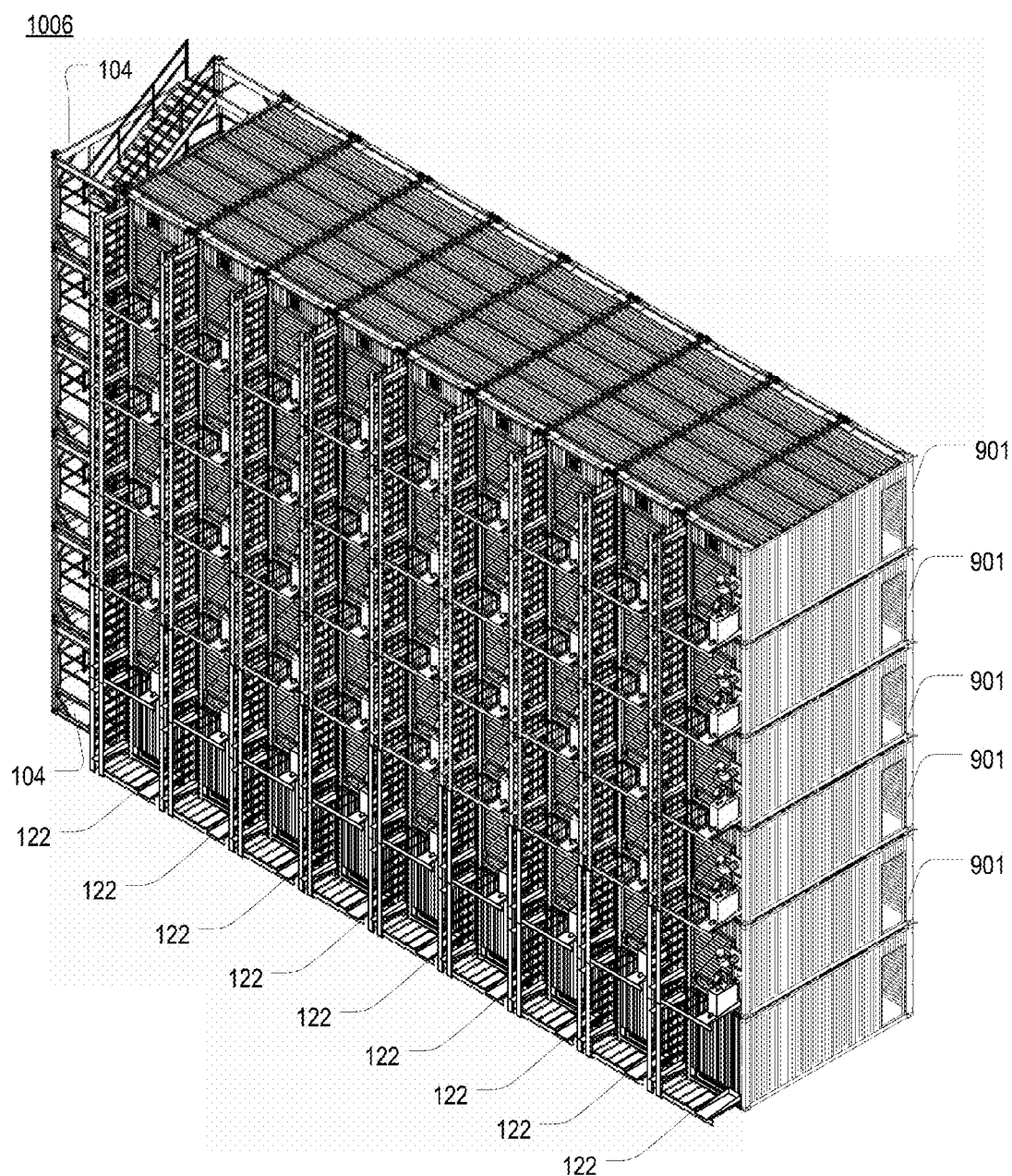
FIG. 18A is an isometric view of a seventh exemplary modular power generation facility constructed using the building block modules of FIG. 1.
Figure 18B:
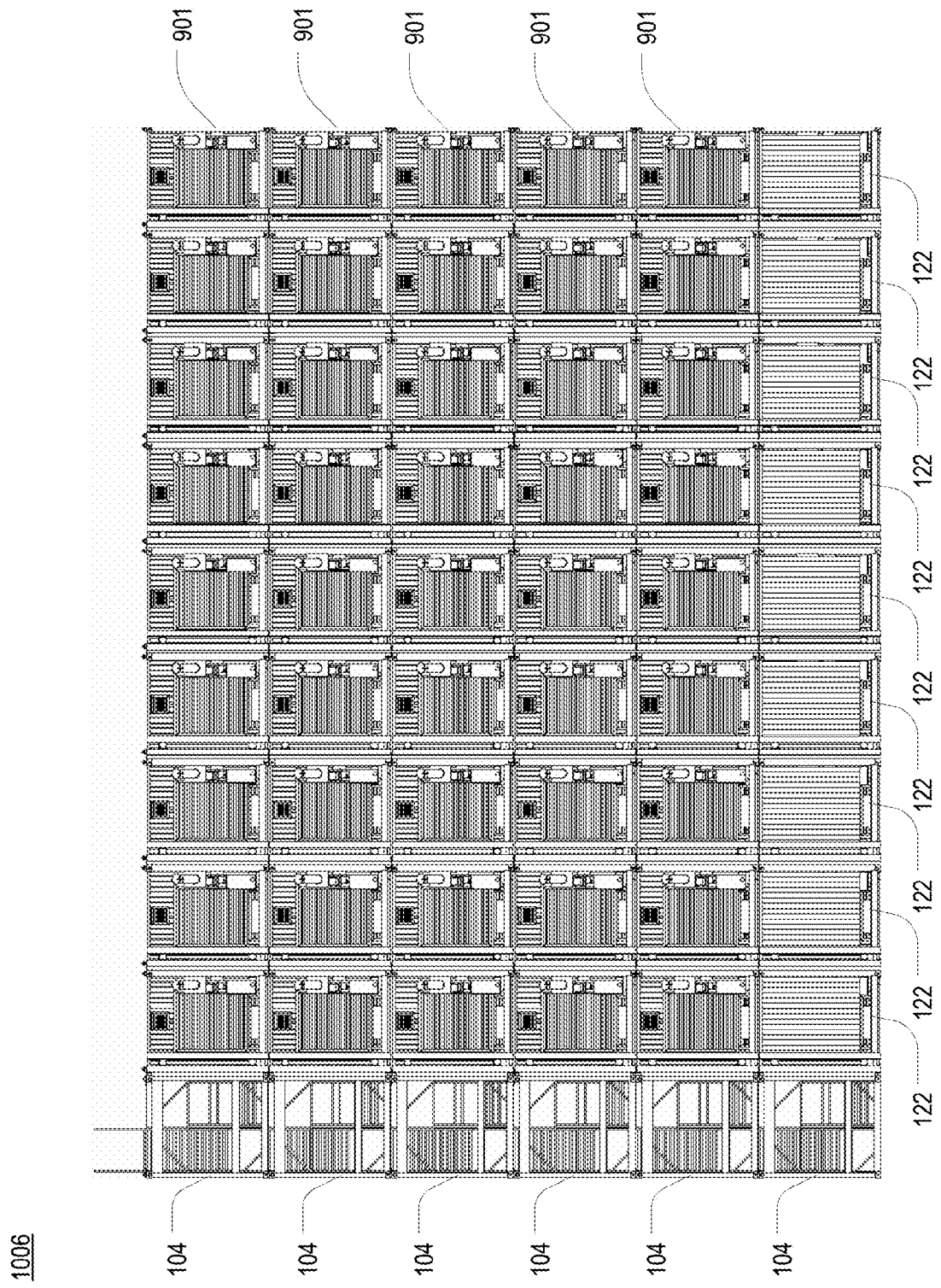
FIG. 18B is a front view of the exemplary modular power generation facility of FIG. 18A.

In at least some embodiments, stacks of gen-set modules may be lined up next to each other to create multi-stack power generation facilities. In this regard, FIGS. 17A and 17B are an isometric view and a front view, respectively, of a sixth exemplary modular power generation facility 1005 constructed using the building block modules of FIG. 1, and FIGS. 18A and 18B are an isometric view and a front view, respectively, of a seventh exemplary modular power generation facility 1006 constructed using the building block modules of FIG. 1, all according to one or more preferred embodiments of the present invention. As shown in FIGS. 17A and 17B, the gen-set/switchgear module column 1021 of FIG. 16 is used as a base building block in the creation of a ten-column matrix of modules. The column on the left is formed entirely from staircase modules 104, while each of the other columns 1021 includes the gen-set modules 901 and switchgear/workroom module 112 of FIG. 16. In FIGS. 18A and 18B, a similar matrix of modules is provided but with the switchgear/workroom module 122 of FIGS. 15A-15F substituted for the switchgear/workroom module 112 of FIGS. 4A-4F.

In the exemplary facilities of FIGS. 17A, 17B, 18A, and 18B, access to the modules on each level is provided via the staircase modules 104. Personnel may enter the switchgear/workroom module 112,122 of the desired level via the primary access door 310, which is accessible from a landing or platform portion of the staircase module 104; one or more openings in the safety rails may be provided at suitable locations to permit passage from the staircase module 104 into the switchgear/workroom module 112,122 (or, in various other facilities, some other module). Access to the various gen-set modules 901 on each level is accessible through doors and passages accessible from the switchgear/workroom module 112,122 as described previously with respect to the first exemplary facility 1000.

A given installation of a modular power generation facility having horizontal functional units, such as the single level systems 1000,1001 in FIGS. 9A and 10A or the multi-level systems 1002,1003 in FIGS. 10A and 11, may have a variety of different gen-set modules 101,701,801,901 on any given level and in any given position on such level, as well as a variety of the corresponding switchgear/workroom modules 112,122 when they are necessary. Similarly, a given installation of a modular power generation facility having vertical functional units, such as the single gen-set column system 1004 of FIG. 16 or the multi-column systems 1005,1006 in FIGS. 17A and 18A, may have a variety of different gen-set modules 101,701,801,901 in any given gen-set column and in any given position in such column as well as a variety of the corresponding switchgear/workroom modules 112,122 when they are necessary. In various embodiments, it is possible to use combinations of gen-set modules 101,701,801,901 that include a majority of high efficiency, low emission (pollution as well as noise) gas-fired gen-sets with a lesser number of lower efficiency gen-set modules for peak-shaving or back-up generation needs. With such a combination, the highest efficiency units could run at a very high duty cycle while still having lower duty cycle units available for peak demand or backup purposes. Since each gen-set module 101,701,801,901 can be installed individually, it is also possible to use a combination of gen-set modules 101,701,801,901 with a range of generation capacities to suit the generation need for a given installation.

With the capability to use a variety of gen-set modules 101,701,801,901, a given modular power generation facility can be customized based on anticipated demand, and capacity can be added by installing additional gen-set modules 101,701,801,901 to any given row or column, respectively, and/or by adding additional levels or columns. For example, a new row may comprise a transformer/switchgear module 102, a workroom module 103, one or more staircase modules 104 and the desired number of gen-set modules 101, 701,801,901 of each type. The number of levels is primarily constrained by the structural integrity of the ISO intermodal shipping containers that form the building blocks of the modular power generation facility, including the gen-set modules 101,701,801,901, the transformer/switchgear modules 102, the workroom modules 103, the switchgear/workroom modules 112,122, the staircase modules 104, the sound baffle modules 120, and the external fuel tank modules 130. Other constraints may include the overall power density of the fully populated system of the present invention, the state of the art in transformer and switchgear technology, as well as the cooling air requirements and intake air/exhaust requirements.

Various advantages may be achieved according to the teachings set forth herein. For example, a higher power density in a given space can be achieved compared to traditional power generation equipment; standardized designs with some options permit an accelerated build and construction schedule (such as 3-4 months from time of order to install compared to 9-12 months with traditional equipment models); simplified support structures can be utilized; engineering review and production queue time are reduced; future expansion can be easily accommodated; once erected, the amount of power produced by a power generation facility can be later multiplied many times (via expansion, replacement, or both) without changing the amount of space required; power generation equipment purchases may be delayed by customers until closer to time of need; reliance on third party vendors for construction, support, and related equipment is reduced because the modules are pre-tested and easily assembled; field installation and commissioning times are reduced; fuel consumption is reduced at least because the equipment can be operated more efficiently near the optimum performance range of each engine; oil capacity (and thus oil changes) is reduced, thereby reducing oil costs and related labor costs; improved fuel efficiency and reduced oil usage provide improved environmental benefits; and maximum production is achieved for a footprint in which only one end of the enclosure (here, typically the rear of the shipping container housing) is available for air intake. Furthermore, the general approach described herein still allows flexibility of delivery voltage, 480, 600, 4160 to 15 kV class, dependent on the alternator selection and the addition of a step-up transformer for those voltages above 600V AC.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A multi-stack modular power generation facility, comprising:
   (a) a first plurality of primary modules, wherein the first plurality of primary modules are positioned in a first vertical stack of modules and are attached together to form a substantially modular first vertical enclosure for the generation of electricity, wherein each primary module includes eight primary corners and an interior space at least partially enclosed by a top wall, a floor, a side wall, and an end wall, and wherein the primary modules include:
      (i) one or more gen-set modules, each having an engine-generator disposed in the interior thereof, and
      (ii) a first switchgear module having first switchgear disposed in the interior thereof, wherein the first switchgear is ganged to at least one of the one or more gen-set modules in the first vertical stack of primary modules;
   (b) a first control system in communication with each of the gen-set modules in the first vertical stack of primary modules to coordinate the engine-generators of the one or more gen-set modules as a unit and to control the loading of each of the generators in response to a power load demand, wherein the first control system is disposed in one or more of the primary modules of the first vertical stack with at least part of the first control system being disposed in the first switchgear module;
   (c) a second plurality of primary modules, wherein the second plurality of primary modules are positioned in a second vertical stack of modules and are attached together to form a substantially modular second vertical enclosure for the generation of electricity, wherein each primary module includes eight primary corners and an interior space at least partially enclosed by a top wall, a floor, a side wall, and an end wall, and wherein the primary modules include:
      (i) one or more gen-set modules, each having an engine-generator disposed in the interior thereof, and
      (ii) a second switchgear module having switchgear disposed in the interior thereof, wherein the second switchgear is ganged to at least one of the one or more gen-set modules in the second vertical stack of primary modules; and
   (d) a second control system in communication with each of the gen-set modules in the second vertical stack of primary modules to coordinate the engine-generators of the one or more gen-set modules as a unit and to control the loading of each of the generators in response to a power load demand, wherein the second control system is disposed in one or more of the primary modules of the second vertical stack with at least part of the second control system being disposed in the second switchgear module;
   (e) wherein the second plurality of primary modules are disposed immediately adjacent the first plurality of primary modules such that the second vertical enclosure abuts the first vertical enclosure.

2. The multi-stack modular power generation facility of claim 1, wherein, in each vertical stack, all of the primary modules have a common width.

3. The multi-stack modular power generation facility of claim 2, wherein a lowermost primary module, of each vertical stack of primary modules, is mounted on, and attached to, a base frame or foundation.

4. The multi-stack modular power generation facility of claim 2, wherein, in each vertical stack, each gen-set module further includes a dedicated fuel tank disposed in the interior thereof.

5. The multi-stack modular power generation facility of claim 2, further comprising one or more secondary modules, wherein each secondary module is disposed at an end of, but on the same level as, a respective primary module of the vertical stack of primary modules.

6. The multi-stack modular power generation facility of claim 5, wherein each secondary module has a width equal to the common width of the primary modules.

7. The multi-stack modular power generation facility of claim 6, wherein the one or more secondary modules include a fuel tank module, wherein each fuel tank module is disposed at the end of a respective gen-set module, and wherein each fuel tank module houses a fuel tank, in an interior thereof, that provides fuel to the engine-generator in the respective gen-set module.

8. The multi-stack modular power generation facility of claim 7, wherein each fuel tank module includes sound baffles, disposed in the interior thereof, to muffle sounds of combustion and flow of air in or out of the respective gen-set module.

9. The multi-stack modular power generation facility of claim 6, wherein the one or more secondary modules include a sound baffle module, wherein each sound baffle module is disposed at the end of a respective gen-set module, and wherein each sound baffle module houses sound baffles, in an interior thereof, to muffle sounds of combustion and flow of air in or out of the respective gen-set module.

10. The multi-stack modular power generation facility of claim 2, further comprising a staircase module having eight primary corners, wherein the staircase module is disposed alongside, and attached via the respective primary corners to, at least one primary module in the first vertical stack of primary modules.

11. The modular power generation facility of claim 10, wherein the staircase module is one of a plurality of staircase modules positioned in a vertical stack of staircase modules, wherein each staircase module is attached to a primary module beside it via side attachment fittings that are each connected to one corner on the staircase module and a corresponding corner on the primary module beside the staircase module.

12. The multi-stack modular power generation facility of claim 2, wherein in each vertical stack, each primary module is adapted from an intermodal shipping container having four posts, a pair of top side rails, a pair of bottom side rails, a front sill, a rear sill, a top front rail, and a top rear rail, all of which are connected together by shipping container corner castings, wherein the shipping container corner castings form the eight primary corners.

13. The multi-stack modular power generation facility of claim 12, wherein, in each vertical stack, each primary module is attached to a body above or below it via the corner castings and corresponding twist lock fasteners.

14. The multi-stack modular power generation facility of claim 12, wherein the primary modules in the first vertical stack are attached to the primary modules in the second vertical stack via side attachment fittings that are each connected to one corner casting on a first primary module and a corresponding corner casting on a second primary module.

15. The multi-stack modular power generation facility of claim 12, wherein portions of at least two of the walls of each primary module are corrugated shipping container walls.

16. The multi-stack modular power generation facility of claim 2, wherein each primary module includes at least one walk-through opening accessing the interior thereof, and wherein the at least one walk-through opening of each primary module in the first vertical stack is aligned with the at least one walk-through opening of the primary module immediately adjacent thereto in the second vertical stack, thereby providing access from the interior of each primary module in the first vertical stack to the interior of the immediately adjacent primary module in the second vertical stack.

17. The multi-stack modular power generation facility of claim 2, wherein each primary module in the first vertical stack is attached via the respective primary corners to the primary module immediately adjacent thereto in the second vertical stack.

18. The multi-stack modular power generation facility of claim 2, wherein the switchgear in the first switchgear module is operatively connected to the switchgear in the second switchgear module.

19. The multi-stack modular power generation facility of claim 18, wherein an exterior wall of the first switchgear module is penetrated by a cable slot through which interconnect cables may pass for connection to the second switchgear module.

20. A multi-level modular power generation facility, comprising:
  (a) a first plurality of primary modules, wherein the first plurality of primary modules are positioned side by side in a row of modules, on a first level, and are attached together to form a substantially modular first level enclosure for the generation of electricity, wherein each primary module includes eight primary corners and an interior space at least partially enclosed by a top wall, a floor, a side wall, and an end wall, and wherein the primary modules include:
    (i) one or more gen-set modules, each having an engine-generator disposed in the interior thereof, and
    (ii) a first switchgear module having first switchgear disposed in the interior thereof, wherein the first switchgear is ganged to at least one of the one or more gen-set modules on the first level;
  (b) a first control system in communication with each of the gen-set modules in the first level to coordinate the engine-generators of the one or more gen-set modules as a unit and to control the loading of each of the generators in response to a power load demand, wherein the first control system is disposed in one or more of the primary modules of the first level with at least part of the first control system being disposed in the first switchgear module;
  (c) a second plurality of primary modules, wherein the second plurality of primary modules are positioned side by side in a row of modules, on a second level, and are attached together to form a substantially modular second level enclosure for the generation of electricity, wherein each primary module includes eight primary corners and an interior space at least partially enclosed by a top wall, a floor, a side wall, and an end wall, and wherein the primary modules include:
    (i) one or more gen-set modules, each having an engine-generator disposed in the interior thereof, and
    (ii) a second switchgear module having switchgear disposed in the interior thereof, wherein the second switchgear is ganged to at least one of the one or more gen-set modules on the second level; and
  (d) a second control system in communication with each of the gen-set modules in the second level to coordinate the engine-generators of the one or more gen-set modules as a unit and to control the loading of each of the generators in response to a power load demand, wherein the second control system is disposed in one or more of the primary modules of the second level with at least part of the second control system being disposed in the second switchgear module;
  (e) wherein the second plurality of primary modules are stacked on top of the first plurality of primary modules such that the second level enclosure is disposed on top of the first level enclosure.

* * * * *